(12) United States Patent
Hara et al.

(10) Patent No.: US 11,541,962 B2
(45) Date of Patent: Jan. 3, 2023

(54) BICYCLE SEATPOST ASSEMBLY

(71) Applicant: SHIMANO INC., Sakai (JP)

(72) Inventors: Nobukatsu Hara, Sakai (JP); Hiroshi Matsuda, Sakai (JP)

(73) Assignee: SHIMANO INC., Sakai (JP)

( * ) Notice: Subject to any disclaimer, the term of this patent is extended or adjusted under 35 U.S.C. 154(b) by 281 days.

(21) Appl. No.: 17/065,473

(22) Filed: Oct. 7, 2020

(65) Prior Publication Data

US 2021/0024154 A1    Jan. 28, 2021

Related U.S. Application Data

(62) Division of application No. 15/851,694, filed on Dec. 21, 2017, now Pat. No. 10,829,173.

(51) Int. Cl.
| | |
|---|---|
| *B62M 9/122* | (2010.01) |
| *B62K 23/00* | (2006.01) |
| *B62M 25/08* | (2006.01) |
| *G08C 17/00* | (2006.01) |
| *B62J 1/08* | (2006.01) |

(Continued)

(52) U.S. Cl.
CPC ............... *B62M 9/122* (2013.01); *B62J 1/08* (2013.01); *B62K 23/00* (2013.01); *B62M 25/08* (2013.01); *G08C 17/00* (2013.01); *G08C 19/22* (2013.01); *B62J 45/41* (2020.02);

(Continued)

(58) Field of Classification Search
CPC ............... B62M 9/122; B62M 25/08; B62M 2025/006; B62J 1/08; B62J 45/41; B62J 2001/085; G08C 17/00; G08C 19/22; G08C 2201/30

See application file for complete search history.

(56) References Cited

U.S. PATENT DOCUMENTS

| | | | |
|---|---|---|---|
| 7,522,033 B2 | 4/2009 | Takamoto et al. | |
| 10,829,173 B2 * | 11/2020 | Hara | ............... B62J 1/08 |

(Continued)

FOREIGN PATENT DOCUMENTS

| | | |
|---|---|---|
| CN | 102161358 | 8/2011 |
| CN | 107042853 | 8/2017 |

(Continued)

OTHER PUBLICATIONS

Office Action with Form PTO-892 Notice of References Cited issued by the U.S. Patent and Trademark Office for the U.S. Appl. No. 15/851,694, filed Mar. 24, 2020.

*Primary Examiner* — Donald J Wallace
(74) *Attorney, Agent, or Firm* — Mori & Ward, LLP

(57) ABSTRACT

A bicycle seatpost system comprises an electric actuator, a remote controller, and a seatpost controller. The seatpost controller is configured to control the electric actuator to change a state of the bicycle seatpost assembly to an adjustable state based on one of a first control signal and a second control signal. The remote controller includes a first operating part configured to receive a first user input and a second operating part configured to receive a second user input. The remote controller is configured to generate the first control signal having a constant signal length regardless of an operation period of the first user input. The remote controller is configured to generate the second control signal having a signal length corresponding to the operation period of the second user input.

2 Claims, 63 Drawing Sheets

(51) Int. Cl.
*G08C 19/22* (2006.01)
*B62M 25/00* (2006.01)
*B62J 45/41* (2020.01)

(52) U.S. Cl.
CPC ............... *B62J 2001/085* (2013.01); *B62M 2025/006* (2013.01); *G08C 2201/30* (2013.01)

(56) References Cited

U.S. PATENT DOCUMENTS

| | | | |
|---|---|---|---|
| 10,889,346 B2 * | 1/2021 | Kurokawa | ............. B62K 25/28 |
| 2011/0204201 A1 | 8/2011 | Kodama et al. | |
| 2012/0253600 A1 | 10/2012 | Ichida et al. | |
| 2013/0138302 A1 | 5/2013 | Hara et al. | |
| 2013/0221713 A1 | 8/2013 | Pelot et al. | |
| 2014/0102237 A1 * | 4/2014 | Jordan | ................. H04W 74/08 74/473.12 |
| 2014/0209439 A1 | 7/2014 | Kosaka et al. | |
| 2016/0152302 A1 * | 6/2016 | Nishino | ................. B62M 25/08 701/2 |
| 2016/0304146 A1 | 10/2016 | Teixeira et al. | |
| 2016/0311499 A1 | 10/2016 | Kasai | |
| 2017/0096184 A1 | 4/2017 | Hara et al. | |
| 2017/0203814 A1 | 7/2017 | Kurokawa et al. | |
| 2017/0225734 A1 | 8/2017 | Shirai | |
| 2018/0072374 A1 | 3/2018 | Kishita | |
| 2018/0186419 A1 | 7/2018 | Shipman et al. | |
| 2018/0194418 A1 | 7/2018 | Bowers | |
| 2018/0334212 A1 | 11/2018 | Bowers et al. | |
| 2019/0054968 A1 | 2/2019 | Kurokawa | |

FOREIGN PATENT DOCUMENTS

| | | | |
|---|---|---|---|
| DE | 102017000470 | | 8/2017 |
| DE | 102017100585 A1 * | 7/2018 | ......... G07C 9/00182 |
| TW | 201713539 | | 4/2017 |

* cited by examiner

BICYCLE SEATPOST ASSEMBLY

CROSS-REFERENCE TO RELATED APPLICATIONS

The present application is a divisional application of the U.S. patent application Ser. No. 15/851,694 filed Dec. 21, 2017. The contents of this application are incorporated herein by reference in their entirety.

BACKGROUND OF THE INVENTION

Field of the Invention

The present invention relates to a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a seatpost assembly.

SUMMARY OF THE INVENTION

In accordance with a first aspect of the present invention, a bicycle seatpost system comprises an electric actuator, a remote controller, and a seatpost controller. The electric actuator is to change a state of a bicycle seatpost assembly between a lock state where a total length of the bicycle seatpost assembly is invariable, and an adjustable state where the total length of the bicycle seatpost assembly is variable. The remote controller is configured to transmit a first control signal and a second control signal different from the first control signal. The seatpost controller is configured to control the electric actuator to change the state of the bicycle seatpost assembly to the adjustable state based on one of the first control signal and the second control signal.

With the bicycle seatpost system according to the first aspect, the remote controller allows the user to operate the bicycle seatpost assembly using at least two types of controls in accordance with a running state of a bicycle and/or the user's preference.

In accordance with a second aspect of the present invention, the bicycle seatpost system according to the first aspect is configured so that the remote controller includes a first operating part configured to receive a first user input having an operation period. The remote controller is configured to generate the first control signal in response to the first user input in a case where the operation period of the first user input is shorter than a determination period. The remote controller is configured to generate the second control signal in response to the first user input in a case where the operation period of the first user input is longer than the determination period.

With the bicycle seatpost system according to the second aspect, it is possible to change the control signal by changing the operation period of the first user input which is input to the remote controller.

In accordance with a third aspect of the present invention, the bicycle seatpost system according to the first or second aspect is configured so that the remote controller includes a first operating part configured to receive a first user input having a first operation direction and a second operation direction different from the first operation direction. The remote controller is configured to generate the first control signal in response to the first user input in a case where the first operating part is operated in the first operation direction. The remote controller is configured to generate the second control signal in response to the first user input in a case where the first operating part is operated in the second operation direction.

With the bicycle seatpost system according to the third aspect, it is possible to change the control signal by changing the operation direction of the remote controller.

In accordance with a fourth aspect of the present invention, the bicycle seatpost system according to any one of the first to third aspects is configured so that the remote controller includes a first operating part configured to receive a first user input and a second operating part configured to receive a second user input. The remote controller is configured to generate the first control signal in response to the first user input. The remote controller is configured to generate the second control signal in response to the second user input.

With the bicycle seatpost system according to the fourth aspect, it is possible to assign different control signals to the first operating part and the second operating part.

In accordance with a fifth aspect of the present invention, the bicycle seatpost system according to any one of the first to fourth aspects is configured so that the remote controller includes a first operating part configured to receive a first user input. The remote controller is configured to generate the first control signal in response to the first user input in a case where the first operating part is operated by a first operation amount. The remote controller is configured to generate the second control signal in response to the first user input in a case where the first operating part is operated by a second operation amount different from the first operation amount.

With the bicycle seatpost system according to the fifth aspect, it is possible to change the control signal by changing the operation amount of the remote controller.

In accordance with a sixth aspect of the present invention, the bicycle seatpost system according to any one of the first to fifth aspects is configured so that the remote controller includes a first operating part configured to receive a first user input. The remote controller is configured to generate the first control signal in response to the first user input in a case where the first operating part is operated by a first number of operation times within a predetermined period. The remote controller is configured to generate the second control signal in response to the first user input in a case where the first operating part is operated by a second number of operation times within the predetermined period. The second number of operation times is different from the first number of operation times.

With the bicycle seatpost system according to the sixth aspect, it is possible to change the control signal by changing the operation method of the remote controller.

In accordance with a seventh aspect of the present invention, the bicycle seatpost system according to the second aspect is configured so that the seatpost controller is configured to control the electric actuator to maintain the adjustable state during a first adjustment period based on the first control signal.

With the bicycle seatpost system according to the seventh aspect, it is possible to maintain the adjustable state during the first adjustment period based on the first control signal.

In accordance with an eighth aspect of the present invention, the bicycle seatpost system according to the seventh aspect is configured so that the first control signal has a constant signal length regardless of the operation period of the first user input. The second control signal has a signal length corresponding to the operation period.

With the bicycle seatpost system according to the eighth aspect, it is possible to use separately a predetermined period and an arbitrary period in accordance with the running state and/or the user's preference.

In accordance with a ninth aspect of the present invention, the bicycle seatpost system according to the seventh aspect is configured so that the seatpost controller is configured to control the electric actuator to maintain the adjustable state during a second adjustment period that is longer than the first adjustment period based on the second control signal.

With the bicycle seatpost system according to the ninth aspect, it is possible to use separately at least two types of different periods in accordance with the running state and/or the user's preference.

In accordance with a tenth aspect of the present invention, the bicycle seatpost system according to any one of the first to ninth aspects is configured so that the remote controller has a first mode in which the first control signal is transmitted and a second mode in which the second control signal is transmitted. The remote controller is configured to change a mode of the remote controller between the first mode and the second mode.

With the bicycle seatpost system according to the tenth aspect, it is possible to change the control signal between the first control signal and the second control signal in accordance with the user's preference.

In accordance with an eleventh aspect of the present invention, the bicycle seatpost system according to the tenth aspect is configured so that the seatpost controller is configured to control the electric actuator to maintain the adjustable state during a first adjustment period based on the first control signal. The seatpost controller is configured to control the electric actuator to maintain the adjustable state during a second adjustment period that is longer than the first adjustment period based on the second control signal.

With the bicycle seatpost system according to the eleventh aspect, it is possible to change an adjustment period between the first adjustment period and the second adjustment period in accordance with the user's preference.

In accordance with a twelfth aspect of the present invention, the bicycle seatpost system according to the eleventh aspect is configured so that the remote controller includes a first operating part to receive a first user input. The remote controller is configured to generate the first control signal in response to the first user input regardless of an operation period of the first user input in the first mode. The remote controller is configured to generate the second control signal in response to the first user input regardless of the operation period of the first user input in the second mode.

With the bicycle seatpost system according to the twelfth aspect, it is possible to use separately at least two types of different periods in accordance with the running state and/or the user's preference.

In accordance with a thirteenth aspect of the present invention, the bicycle seatpost system according to the tenth aspect is configured so that the remote controller includes a first operating part to receive a first user input. The remote controller is configured to generate the first control signal to maintain the adjustable state during a first adjustment period regardless of an operation period of the first user input in the first mode. The remote controller is configured to generate the second control signal to maintain the adjustable state during a second adjustment period corresponding to the operation period of the first user input in the second mode.

With the bicycle seatpost system according to the thirteenth aspect, it is possible to change the actuation method of the electric actuator in accordance with the running state and/or the user's preference.

In accordance with a fourteenth aspect of the present invention, the bicycle seatpost system according to any one of the tenth to thirteenth aspects is configured so that the remote controller includes a mode switch to receive a mode user input. The remote controller is configured to change the mode of the remote controller between the first mode and the second mode based on the mode user input.

With the bicycle seatpost system according to the fourteenth aspect, the remote controller allows the user to change the mode of the remote controller.

In accordance with a fifteenth aspect of the present invention, the bicycle seatpost system according to any one of the tenth to thirteenth aspects is configured so that the remote controller is configured to communicate with an external device. The remote controller is configured to change the mode of the remote controller between the first mode and the second mode based on an input from the external device.

With the bicycle seatpost system according to the fifteenth aspect, it is possible to set the mode of the remote controller using the external device.

In accordance with a sixteenth aspect of the present invention, a bicycle seatpost system comprises an electric actuator, a remote controller, and a seatpost controller. The electric actuator is to change a state of a bicycle seatpost assembly between a lock state where a total length of the bicycle seatpost assembly is invariable and an adjustable state where the total length of the bicycle seatpost assembly is variable. The remote controller is configured to generate a seatpost control signal to control the electric actuator. The seatpost controller has a first actuation mode in which the adjustable state is maintained during a first adjustment period regardless of a signal length of the seatpost control signal and a second actuation mode in which the adjustable state is maintained during a second adjustment period corresponding to the signal length of the seatpost control signal.

With the bicycle seatpost system according to the sixteenth aspect, it is possible to change the actuation method of the electric actuator in accordance with a running state of a bicycle and/or the user's preference.

In accordance with a seventeenth aspect of the present invention, the bicycle seatpost system according to the sixteenth aspect is configured so that the remote controller is configured to generate a mode signal in response to a mode user input. The seatpost controller is configured to change the mode of the seatpost controller between the first actuation mode and the second actuation mode based on the mode signal.

With the bicycle seatpost system according to the seventeenth aspect, the remote controller allows the user to change the mode of the seatpost controller.

In accordance with an eighteenth aspect of the present invention, the bicycle seatpost system according to the sixteenth aspect is configured so that the seatpost controller is configured to communicate with an external device. The seatpost controller is configured to change the mode of the seatpost controller between the first actuation mode and the second actuation mode based on an input from the external device.

With the bicycle seatpost system according to the eighteenth aspect, it is possible to set the mode of the seatpost controller using the external device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
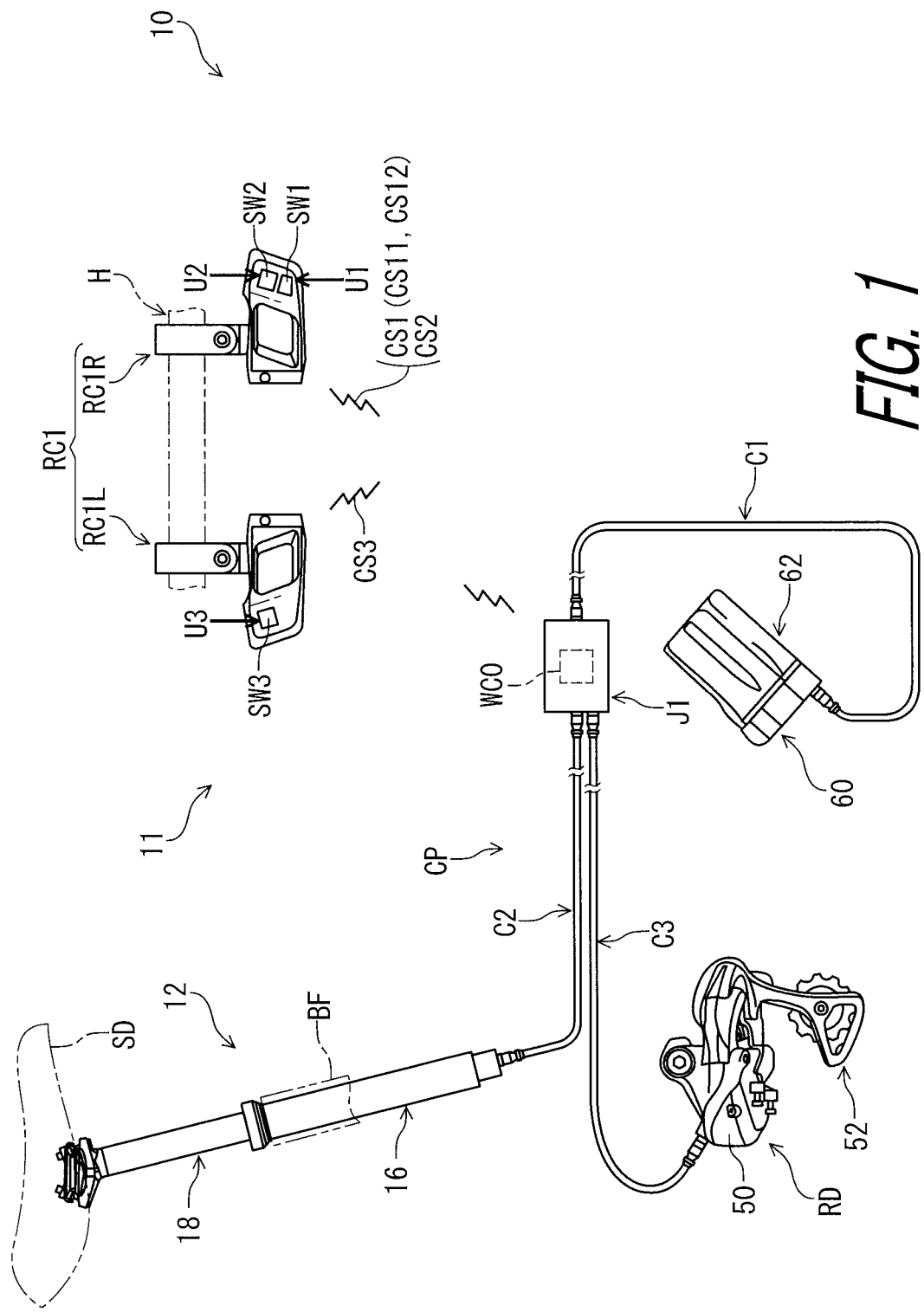
FIG. 1 is a schematic diagram of a bicycle control system including a bicycle seatpost system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle control system 10 includes a bicycle seatpost system 11 in accordance with a first embodiment. The bicycle seatpost system 11 comprises a bicycle seatpost assembly 12 and a remote controller RC1. The bicycle control system 10 includes a rear derailleur RD and an electric communication path CP. A saddle SD is attached to the bicycle seatpost assembly 12. The remote controller RC1 is configured to be mounted on a bicycle body such as a bicycle handlebar H to allow a user (e.g., a rider) to operate the remote controller RC1. The remote controller RC1 is configured to be wirelessly connected to the bicycle seatpost assembly 12 to operate the bicycle seatpost assembly 12 in response to a first user input U1. The remote controller RC1 is configured to be wirelessly connected to the rear derailleur RD to operate the rear derailleur RD in response to one of an upshift user input U2 and a downshift user input U3.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle SD of a bicycle with facing the bicycle handlebar H. Accordingly, these terms, as utilized to describe the bicycle seatpost assembly 12, should be interpreted relative to the bicycle equipped with the bicycle seatpost assembly 12 as used in an upright riding position on a horizontal surface.

Figure 2:
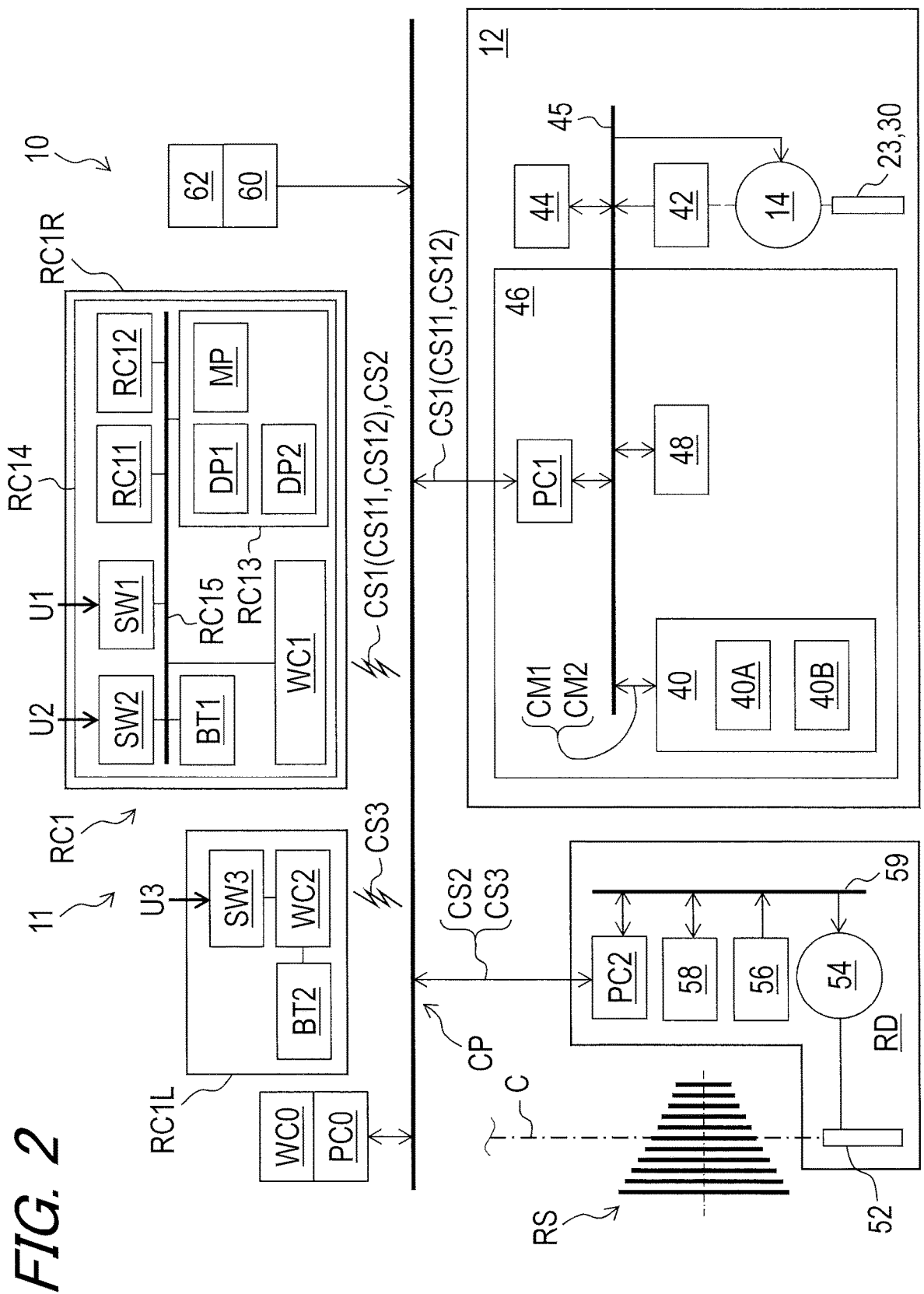
FIG. 2 is a block diagram of the bicycle seatpost system illustrated in FIG. 1.
Figure 3:
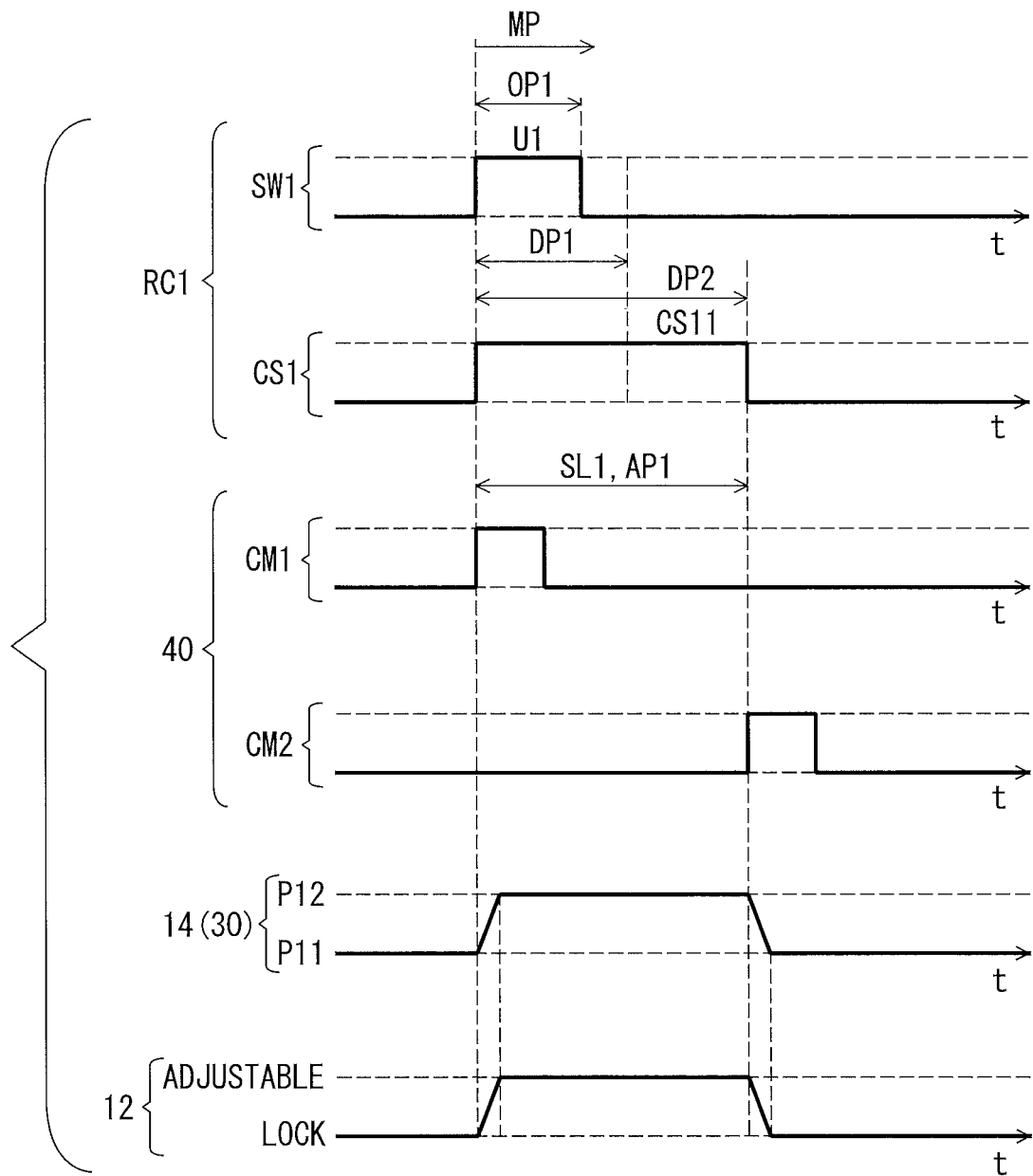
FIGS. 3 and 4 are timing charts of the bicycle seatpost system illustrated in FIG. 1.
Figure 4:
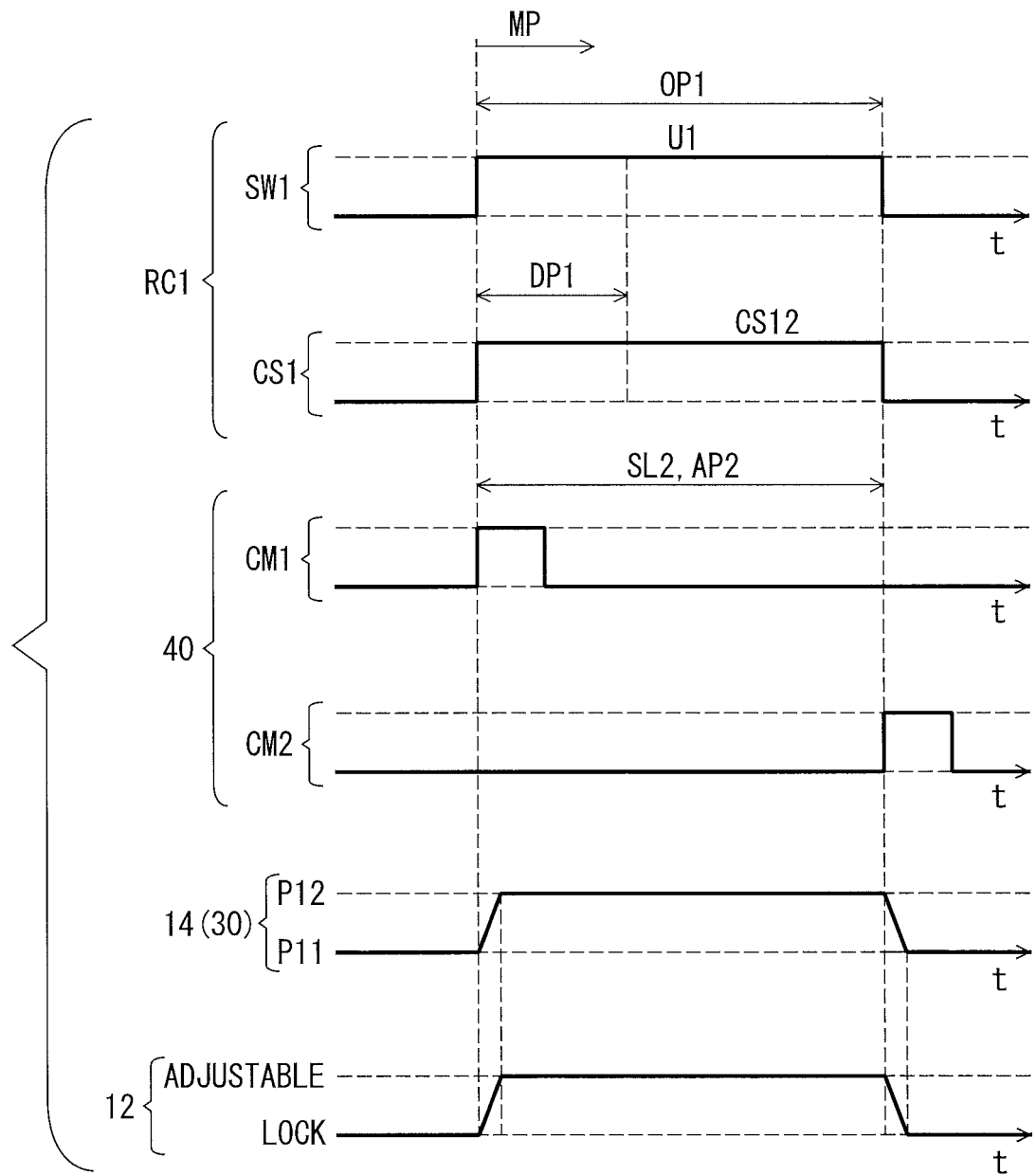

As seen in FIG. 2, the remote controller RC1 is configured to transmit a first control signal CS11 and a second control signal CS12 different from the first control signal CS11. In this embodiment, the remote controller RC1 is configured to transmit a seatpost control signal CS1 in response to the first user input U1. The seatpost control signal CS1 includes the first control signal CS11 and the second control signal CS12. The seatpost control signal includes information to control an electric actuator 14 of the seatpost assembly 12, for example. In this embodiment, the remote controller RC1 includes a first operating part SW1 configured to receive the first user input U1 having an operation period OP1 (FIGS. 3 and 4). For example, the first operating part SW1 includes an electric switch such as a push-button switch. The first operating part SW1 can also be referred to as a seatpost operating switch SW1. The first user input U1 includes a normal press of the first operating part SW1 and a long press of the first operating part SW1. The remote controller RC1 is configured to determine an operation period of the remote controller RC1 (the operation period of the first operating part SW1). Specifically, the remote controller RC1 is configured to determine whether the remote controller RC1 (the first operating part SW1) receives the normal press or the long press as the first user input U1.

As seen in FIG. 3, the remote controller RC1 includes a central processing unit (CPU) 13A, a memory controller 13B, a remote memory 13C, and a circuit board 13D. The CPU 13A, the memory controller 13B, and the remote memory 13C are mounted on the circuit board 13D and are electrically connected to an internal conductor of the circuit board 13D. The circuit board 13D and the first operating part SW1 are electrically connected to a bus 13E. The first operating part SW1 is electrically connected to the CPU 13A and the memory controller 13B with the bus 13E and the circuit board 13D.

The remote memory 13C includes a read-only memory (ROM) and a random-access memory (RAM). For example, the ROM includes a non-transitory computer-readable storage medium, and the RAM includes a transitory computer-readable storage medium. However, the structure of the remote memory 13C is not limited to this embodiment. The remote memory 13C includes storage areas each having an address in the ROM and the RAM. The remote controller RC1 controls the remote memory 13C to store data in the storage areas of the remote memory 13C and reads data from the storage areas of the remote memory 13C.

At least one program is stored in the remote memory 13C (e.g., the ROM). The at least one program is read into the remote controller RC1, and thereby the configuration and/or algorithm of the remote controller RC1 is performed.

As seen in FIG. 3, the remote controller RC1 is configured to generate the first control signal CS11 in response to the first user input U1 in a case where the operation period OP1 of the first user input U1 is shorter than a determination period DP1. The first control signal CS11 has a constant signal length SL1 regardless of the operation period OP1 of the first user input U1. As seen in FIG. 2, the remote memory 13C stores the determination period DP1.

As seen in FIG. 4, the remote controller RC1 is configured to generate the second control signal CS12 in response to the first user input U1 in a case where the operation period OP1 of the first user input U1 is longer than the determination period DP1. In this embodiment, the remote controller RC1 is configured to generate the second control signal CS12 in a case where the operation period OP1 of the first user input U1 is equal to or longer than the determination period DP1. However, the remote controller RC1 can be configured to generate the first control signal CS11 in a case where the operation period OP1 of the first user input U1 is equal to the determination period DP1. The second control signal CS12 has a signal length SL2 corresponding to the operation period OP1 of the first user input U1. The signal length SL2 is variable based on the operation period OP. Thus, the first control signal CS11 and the second control signal CS12 are distinguishable with each other.

As seen in FIG. 2, the remote controller RC1 includes an upshift operating switch SW2 and a downshift operating switch SW3. The upshift operating switch SW2 is configured to generate an upshift control signal CS2 in response to the upshift user input U2. The downshift operating switch SW3 is configured to generate a downshift control signal CS3 in response to the downshift user input U3.

In this embodiment, the remote controller RC1 includes a first operating device RC1R and a second operating device RC1L. The first operating device RC1R and the second operating device RC1L are mounted on the bicycle handlebar H (FIG. 1). The first operating part SW1 and the upshift operating switch SW2 are provided in the first operating device RC1R. The downshift operating switch SW3 is provided in the second operating device RC1L. However, the arrangement of these switches is not limited to this embodiment. As seen in FIG. 1, the first operating device RC1R is a right-hand operating device, and the second operating device RC1L is a left-hand operating device. However, the arrangement and/or the structure of the first operating device RC1R and the second operating device RC1L is not limited to this embodiment.

Figure 5:
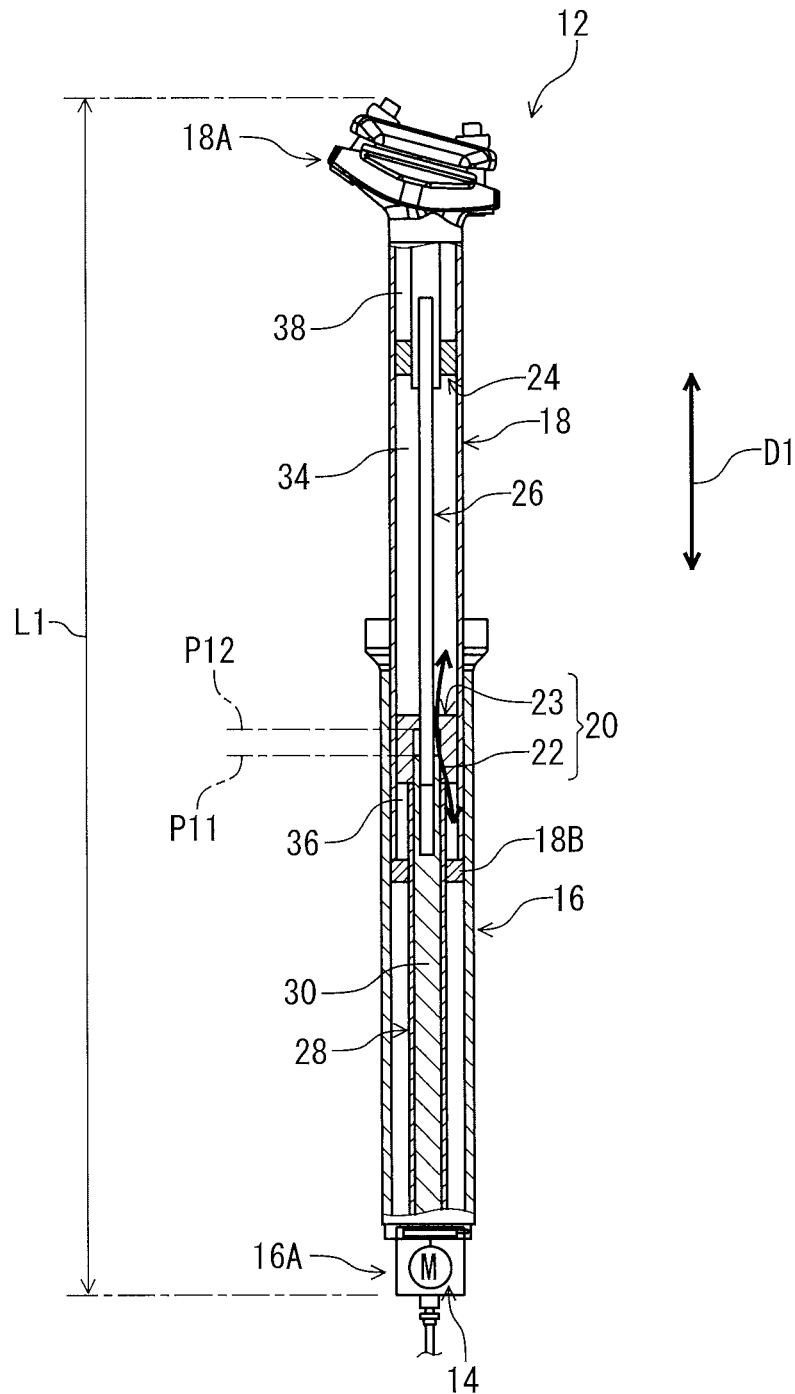
FIG. 5 is a cross-sectional view of a bicycle seatpost assembly of the bicycle seatpost system illustrated in FIG. 1.

As seen in FIG. 5, the bicycle seatpost system 11 comprises an electric actuator 14 to change a state of the bicycle seatpost assembly 12 between a lock state where a total length L1 of the bicycle seatpost assembly 12 is invariable and an adjustable state where the total length L1 of the bicycle seatpost assembly 12 is variable. In this embodiment, the bicycle seatpost assembly 12 comprises the electric actuator 14, a first tube 16, and a second tube 18. The second tube 18 is provided in the first tube 16 movably in a telescopic direction D1. The first tube 16 includes a first end 16A. The second tube 18 includes a second end 18A. The first end 16A and the second end 18A define the total length L1 of the bicycle seatpost assembly 12. The first tube 16 is secured to a bicycle frame BF (FIG. 1) by a conventional clamping arrangement (not shown). The saddle SD is attached to the second end 18A of the second tube 18. In this embodiment, the electric actuator 14 is attached to the first tube 16. However, the electric actuator 14 can be attached to the second tube 18.

As seen in FIG. 5, the bicycle seatpost assembly 12 further comprises a positioning structure 20. The positioning structure 20 includes a passageway 22 and a hydraulic valve 23 to open and close the passageway 22. The positioning structure 20 has an open state where the hydraulic valve 23 opens the passageway 22, and a closed state where the hydraulic valve 23 closes the passageway 22.

In this embodiment, the bicycle seatpost assembly 12 comprises a floating piston 24, a rod 26, a guide member 28, and a flow control part 30. The hydraulic valve 23 divides an interior bore of the first tube 16 into a first fluid chamber 34 and a second fluid chamber 36. The flow control part 30 is provided in the guide member 28 so that the hydraulic valve 23 moves relative to the flow control part 30 between a closed position P11 and an open position P12 in the telescopic direction D1. The hydraulic valve 23 is biased by a biasing element (not shown) toward the closed position P11.

In this embodiment, the electric actuator 14 is mechanically coupled to the hydraulic valve 23 to move the hydraulic valve 23 between the closed position P11 and the open position P12. In this embodiment, the electric actuator 14 includes a direct current (DC) motor. The electric actuator 14 includes a rotational shaft (not shown) to output a rotational force. The rotational shaft is coupled to the hydraulic valve 23 via a gear reducer (not shown). Other examples of the electric actuator 14 include a stepper motor, an alternating current (AC) motor, and an electromagnetic solenoid.

The passageway 22 is closed by the hydraulic valve 23 when the hydraulic valve 23 is positioned at the closed position P11. The passageway 22 is open by the hydraulic valve 23 when the hydraulic valve 23 is positioned at the open position P12. When the hydraulic valve 23 is closed, the second tube 18 is positioned relative to the first tube 16 in the telescopic direction D1. In other words, when the hydraulic valve 23 is closed, position of the second tube 18 is fixed relative to the first tube 16 in the telescopic direction D1. When the hydraulic valve 23 is open, the second tube 18 is movable relative to the first tube 16 in the telescopic direction D1. In other words, when the hydraulic valve 23 is open, position of the second tube 18 can be changed relative to the first tube 16 in the telescopic direction D1. Thus, the closed position P11 of the flow control part 30 corresponds to the closed state of the positioning structure 20 and the lock state of the bicycle seatpost assembly 12. The open position P12 of the flow control part 30 corresponds to the open state of the positioning structure 20 and the adjustable state of the bicycle seatpost assembly 12. Namely, moving the hydraulic valve 23 changes the state of the bicycle seatpost assembly 12 between the lock state and the adjustable state.

The hydraulic valve 23 is coupled to the first tube 16 via the guide member 28 to move together relative to the second tube 18. The first fluid chamber 34 is disposed between the hydraulic valve 23 and the floating piston 24. The second fluid chamber 36 is disposed between the hydraulic valve 23 and a lower end 18B of the second tube 18. The flow control part 30 cooperates with the guide member 28 and the hydraulic valve 23 to control flow of fluid between the first fluid chamber 34 and the second fluid chamber 36 to change a position of the first tube 16 relative to the second tube 18.

The floating piston 24 is disposed in the interior bore of the second tube 18 and forms a gas chamber 38 disposed between the floating piston 24 and an upper end of the second tube 18. The shorter total length of the bicycle seatpost assembly 12 increases an inner pressure of the gas chamber 38. When the hydraulic valve 23 is open in a state where the rider's weight applies to the second tube 18, the second tube 18 is movable relative to the first tube 16 to decrease the total length L1 against the inner pressure of the gas chamber 38. When the hydraulic valve 23 is open in a state where the rider's weight does not apply to the second tube 18, the second tube 18 is movable relative to the first tube 16 to increase the total length L1 because of the inner pressure of the gas chamber 38. The bicycle seatpost assembly 12 includes structures which have been known in the bicycle field, they will not be described and/or illustrated in detail here for the sake of brevity.

As seen in FIG. 2, the bicycle seatpost system 11 comprises a seatpost controller 40. The seatpost controller 40 is configured to control the electric actuator 14 to change the state of the bicycle seatpost assembly 12 to the adjustable state based on one of the first control signal CS11 and the second control signal CS12. The seatpost controller 40 is configured to control the electric actuator 14 to maintain the adjustable state during a first adjustment period AP1 (FIG. 3) based on the first control signal CS11. The seatpost controller 40 is configured to control the electric actuator 14 to maintain the adjustable state (the open state) during a second adjustment period AP2 (FIG. 4) based on the second control signal CS12. As seen in FIG. 3, the first adjustment period AP1 is a constant period corresponding to the constant signal length SL1 of the first control signal CS11 regardless of the operation period OP1. As seen in FIG. 4, the second adjustment period AP2 is a variable period corresponding to the operation period OP1 and the signal length SL2 of the second control signal CS12. For example, the second adjustment period AP2 is proportional to the operation period OP1.

In this embodiment, the remote controller RC1 is configured to change an adjustment period between the first adjustment period AP1 and the second adjustment period AP2 using the first control signal CS1 and the second control signal CS12. However, the remote controller RC1 is configured to change an adjustment period between the first adjustment period AP1 and the second adjustment period AP2 by changing a mode of the remote controller RC1 between different modes. The same modification can apply to other embodiments.

As seen in FIG. 2, the bicycle seatpost assembly 12 includes a position sensor 42 and an actuator driver 44. The electric actuator 14, the seatpost controller 40, the position sensor 42, and the actuator driver 44 are connected to each other with a bus 45.

The position sensor 42 is configured to sense a position of the flow control part 30 via the electric actuator 14. In this embodiment, the position sensor 42 is a contact rotational position sensor such as a potentiometer. The position sensor 42 is configured to sense an absolute rotational position of the rotational shaft of the electric actuator 14 as the position of the hydraulic valve 23. Other examples of the position sensor 42 include a non-contact rotational position sensor such as an optical sensor (e.g., a rotary encoder) and a magnetic sensor (e.g., a hall sensor).

The position sensor 42 is electrically connected to the actuator driver 44. The actuator driver 44 is configured to control the electric actuator 14 based on the position sensed by the position sensor 42 and a command generated by the seatpost controller 40. Specifically, the actuator driver 44 is electrically connected to the electric actuator 14 and the seatpost controller 40. The seatpost controller 40 is configured to generate an adjustment command CM1 in response to the seatpost control signal CS1. The seatpost controller 40 is configured to generate a lock command CM2 after the adjustment period AP elapses from the generation of the adjustment command CM1. The actuator driver 44 is configured to control the electric actuator 14 to move the hydraulic valve 23 from the closed position P11 (FIG. 5) to the open position P12 (FIG. 5) in response to the adjustment command CM1. The actuator driver 44 is configured to control the electric actuator 14 to move the hydraulic valve 23 from the open position P12 (FIG. 5) to the closed position P11 (FIG. 5) in response to the lock command CM2. The actuator driver 44 is configured to control the electric actuator 14 to stop the hydraulic valve 23 at the open position P12 (FIG. 5) based on the position sensed by the position sensor 42 when moving the hydraulic valve 23 from the closed position P1 (FIG. 5) to the open position P12 (FIG. 5). The actuator driver 44 is configured to control the electric actuator 14 to stop the hydraulic valve 23 at the closed position P11 (FIG. 5) based on the position sensed by the position sensor 42 when moving the hydraulic valve 23 from the open position P12 (FIG. 5) to the closed position P11 (FIG. 5).

As seen in FIG. 2, the seatpost controller 40 includes a CPU 40A and a memory controller 40B. The bicycle seatpost assembly 12 includes a circuit board 46. The CPU 40A and the memory controller 40B are mounted on the circuit board 46 and are electrically connected to an internal conductor of the circuit board 46. The circuit board 46 is electrically connected to the bus 45. The CPU 40A and the memory controller 40B are electrically connected to the electric actuator 14, the position sensor 42, and the actuator driver 44 with the bus 45 and the circuit board 46.

The bicycle seatpost assembly 12 further comprises a seatpost memory 48. The seatpost memory 48 is mounted on the circuit board 46 and is electrically connected to the internal conductor of the circuit board 46. The seatpost controller 40 is electrically connected to the seatpost memory 48 with the circuit board 46 and the bus 45. The seatpost controller 40 is configured to communicate with the seatpost memory 48 via the circuit board 46 and the bus 45.

The seatpost memory 48 includes a ROM and a RAM. For example, the ROM includes a non-transitory computer-readable storage medium, and the RAM includes a transitory computer-readable storage medium. However, the structure of the seatpost memory 48 is not limited to this embodiment. The seatpost memory 48 includes storage areas each having an address in the ROM and the RAM. The seatpost controller 40 controls the seatpost memory 48 to store data in the storage areas of the seatpost memory 48 and reads data from the storage areas of the seatpost memory 48.

At least one program is stored in the seatpost memory 48 (e.g., the ROM). The at least one program is read into the seatpost controller 40, and thereby the configuration and/or algorithm of the seatpost controller 40 is performed.

As seen in FIG. 2, the rear derailleur RD is configured to move a bicycle chain C relative to a rear sprocket RS in response to one of the upshift control signal CS2 and the downshift control signal CS3. The rear derailleur RD includes a base 50 (FIG. 1), a chain guide 52, a motor 54, a shift position sensor 56, and a motor driver 58. The motor 54, the shift position sensor 56, and the motor driver 58 are connected to each other with a bus 59. The motor 54 is mechanically coupled to the chain guide 52. The motor 54 is configured to move the chain guide 52 to shift a bicycle chain C relative to a rear sprocket RS. In this embodiment, the motor 54 includes a DC motor. The motor 54 includes a rotational shaft (not shown) to output a rotational force. The rotational shaft is coupled to the chain guide 52 via a gear reducer (not shown). Other examples of the motor 54 include a stepper motor and an AC motor.

The rear derailleur RD has a plurality of available shift positions as the shift position of the rear derailleur RD. In this embodiment, the rear derailleur RD has eleven available shift positions respectively corresponding to eleven sprocket wheels of the rear sprocket RS.

The shift position sensor 56 is configured to sense a position of the motor 54 as the shift position of the rear derailleur RD. In this embodiment, the shift position sensor 56 is a contact rotational position sensor such as a potentiometer. The shift position sensor 56 is configured to sense an absolute rotational position of the rotational shaft of the motor 54 as the shift position of the rear derailleur RD. Other examples of the shift position sensor 56 include a non-contact rotational position sensor such as an optical sensor (e.g., a rotary encoder) and a magnetic sensor (e.g., a hall sensor).

The shift position sensor 56 is electrically connected to the motor driver 58. The motor driver 58 is configured to control the motor 54 based on the rear shift position sensed by the shift position sensor 56. Specifically, the motor driver 58 is electrically connected to the motor 54. The motor driver 58 is configured to control a rotational direction and a rotational speed of the rotational shaft based on the shift position and each of the upshift and downshift control signals CS2 and CS3. Furthermore, the motor driver 58 is configured to stop rotation of the rotational shaft to position the chain guide 52 at one of the low to top gear positions based on the shift position and each of the upshift and downshift control signals CS2 and CS3.

As seen in FIGS. 1 and 2, the bicycle control system 10 includes a battery holder 60 and a battery 62. The battery holder 60 is mounted to the bicycle frame BF (FIG. 1) and is configured to detachably receive the battery 62. The battery 62 is electrically connected to the battery holder 60 in a state where the battery 62 is mounted to the battery holder 60. Examples of the battery 62 include a primary battery (e.g., a dry-cell battery) and a secondary battery (e.g., a rechargeable battery such as a rechargeable lithium-ion battery).

Power line communication (PLC) carries data on a conductor that is also used simultaneously for electric power transmission or electric power distribution to electric components. In this embodiment, the electric power is supplied from the battery 62 to the bicycle seatpost assembly 12, and the rear derailleur RD via the battery holder 60 and the electric communication path CP. Furthermore, the bicycle seatpost assembly 12 and the rear derailleur RD send and receive control signals via the electric communication path CP using the PLC.

As seen in FIG. 1, the electric communication path CP includes a junction J1, and first to third cables C1 to C3. Each of the first to third cables C1 to C3 includes electric connectors at both ends thereof. The junction J1 is electrically connected to the battery holder 60 with the first cable C1. The junction J1 is electrically connected to the bicycle seatpost assembly 12 with the second cable C2. The junction J1 is electrically connected to the rear derailleur RD with the third cable C3.

Each of the first to third cables C1 to C3 includes a ground line and a voltage line that are detachably connected to a serial bus that is formed by communication interfaces and the junction J1. Electric power is supplied from the battery 62 to the bicycle seatpost assembly 12 and the rear derailleur RD via the voltage line. In this embodiment, the bicycle seatpost assembly 12 and the rear derailleur RD can all communicate with each other through the voltage line using the power line communication technology.

The PLC uses unique identifying information such as a unique identifier that is assigned to each of the bicycle seatpost assembly 12 and the rear derailleur RD. Each of the bicycle seatpost assembly 12 and the rear derailleur RD includes a PLC controller in which the unique identifying information is stored. Based on the unique identifying information, each of the bicycle seatpost assembly 12 and the rear derailleur RD can recognize control signals which are necessary for itself among control signals transmitted via the electric communication path CP.

The bicycle seatpost system 11 includes a wireless communicator WC0 configured to wirelessly communicate with the remote controller RC. In this embodiment, the wireless communicator WC0 is provided in the junction J1 and is connected to the bicycle seatpost assembly 12 and the rear derailleur RD with the electric communication path CP. The wireless communicator WC0 can be provided at other locations such as the bicycle seatpost assembly 12, the rear derailleur RD, and the battery holder 60.

As seen in FIG. 3, the first operating device RC1R includes a first wireless communicator WC1 and a first battery BT1. The first wireless communicator WC1 is configured to wirelessly communicate with the wireless communicator WC0. The first battery BT1 is connected to the first wireless communicator WC1 to supply electric power to the first wireless communicator WC1.

The second operating device RC1R includes a second wireless communicator WC2 and a second battery BT2. The second wireless communicator WC2 is configured to wirelessly communicate with the wireless communicator WC0. The second battery BT2 is connected to the second wireless communicator WC2 to supply electric power to the second wireless communicator WC2.

The first wireless communicator WC1 is connected to the first operating part SW1 to wirelessly transmit the seatpost control signal CS1 to the bicycle seatpost assembly 12 via the wireless communicator WC0 and the electric communication path CP. The first wireless communicator WC1 is connected to the upshift operating switch SW2 to wirelessly transmit the upshift control signal CS2 to the bicycle seatpost assembly 12 via the wireless communicator WC0 and the electric communication path CP. The second wireless communicator WC2 is connected to the downshift operating switch SW3 to wirelessly transmit the downshift control signal CS3 to the bicycle seatpost assembly 12 via the wireless communicator WC0 and the electric communication path CP.

The first wireless communicator WC1 includes a signal transmitting circuit, a signal receiving circuit, and an antenna. Thus, the first wireless communicator WC1 can also be referred to as a first wireless communication circuit or circuitry WC1. The first wireless communicator WC1 is configured to superimpose digital signals such as the seatpost control signal CS1 and the upshift control signal CS2 on carrier wave using a predetermined wireless communication protocol to wirelessly transmit the seatpost control signal CS1 and the upshift control signal CS2.

Furthermore, the first wireless communicator WC1 is configured to receive a wireless signal from other bicycle components such as the wireless communicator WC0. In this embodiment, the first wireless communicator WC1 is configured to receive a pairing completion signal from the wireless communicator WC0. The first wireless communicator WC1 is configured to decode the wireless signal to recognize information wirelessly transmitted from the wireless communicator WC0. The first wireless communicator WC1 may decrypt the encrypted wireless signal using the cryptographic key.

In this embodiment, the first wireless communicator WC1 is provided as a wireless transmitter and a wireless receiver. The first wireless communicator WC1 is integrally provided as a single module or unit. However, the first wireless communicator WC1 can be constituted of a wireless transmitter and a wireless receiver which are provided as separate modules or units arranged at different positions from each other. The function of the wireless receiver can be omitted from the first wireless communicator WC1.

The second wireless communicator WC2 includes a signal transmitting circuit, a signal receiving circuit, and an antenna. Thus, the second wireless communicator WC2 can also be referred to as a second wireless communication circuit or circuitry WC2. The second wireless communicator WC2 is configured to superimpose digital signals such as the downshift control signal CS3 on carrier wave using a predetermined wireless communication protocol to wirelessly transmit the downshift control signal CS3. The second wireless communicator WC2 has substantially the same structure and/or configuration as that of the first wireless communicator WC1. Thus, it will not be described in detail here for the sake of brevity.

The wireless communicator WC0 includes a signal transmitting circuit, a signal receiving circuit, and an antenna. Thus, the wireless communicator WC0 can also be referred to as a wireless communication circuit or circuitry WC0. The wireless communicator WC0 is configured to wirelessly receive the seatpost control signal CS1, the upshift control signal CS2, and the downshift control signal CS3 transmitted from the remote controller RC1. The wireless communicator WC0 has substantially the same structure and/or configuration as that of the first wireless communicator WC1. Thus, it will not be described in detail here for the sake of brevity.

The bicycle seatpost system 11 includes a PLC controller PC0 connected to the wireless communicator WC0. The PLC controller PC0 is connected to the electric communication path CP. The PLC controller PC is configured to separate input signals to a power source voltage and control signals. The PLC controller PC is configured to regulate the power source voltage to a level at which the wireless communicator WC0 can properly operate. The PLC controller PC is further configured to superimpose output signals such as the seatpost control signal CS1, the upshift control signal CS2, and the downshift control signal CS3 on the power source voltage applied to the electric communication path CP from the battery 62.

As seen in FIG. 3, the bicycle seatpost assembly 12 includes a first PLC controller PC1. The first PLC controller PC1 is connected to the wireless communicator WC0 with the electric communication path CP and the PLC controller PC0. The first PLC controller PC1 is connected to the seatpost controller 40 and the memory 48 with the bus 45. The rear derailleur RD includes a second PLC controller PC2. The second PLC controller PC2 is connected to the motor 54, the shift position sensor 56, and the motor driver 58 with the bus 59.

The first PLC controller PC1 is configured to separate input signals to a power source voltage and control signals such as the seatpost control signal CS1, the upshift control signal CS2, and the downshift control signal CS3. The first PLC controller PC1 is configured to regulate the power source voltage to a level at which the bicycle seatpost assembly 12 can properly operate. The first PLC controller PC1 is further configured to superimpose output signals on the power source voltage applied to the electric communication path CP from the battery 62.

The second PLC controller PC2 has substantially the same structure and/or configuration as that of the first PLC controller PC1. Specifically, the second PLC controller PC2 is configured to separate input signals to the power source voltage and control signals such as the seatpost control signal CS1, the upshift control signal CS2, and the downshift control signal CS3. The second PLC controller PC2 is configured to regulate the power source voltage to a level at which the rear derailleur RD can properly operate. The second PLC controller PC2 is further configured to superimpose the downshift control signal CS3 on the power source voltage applied to the electric communication path CP from the battery 62.

As seen in FIGS. 3 and 4, the seatpost controller 40 controls the electric actuator 14 to maintain the lock state while the seatpost controller 40 does not receive the seatpost control signal CS1. As seen in FIG. 3, the seatpost controller 40 controls the electric actuator 14 to maintain the adjustment state during the first adjustment period AP1 (the constant period) when the first operating part SW1 receives the normal press provided as the first user input U1. As seen in FIG. 4, the seatpost controller 40 controls the electric actuator 14 to maintain the adjustment state during the second adjustment period AP2 (the variable period) when the first operating part SW1 receives the long press provided as the first user input U1.

Figure 6:
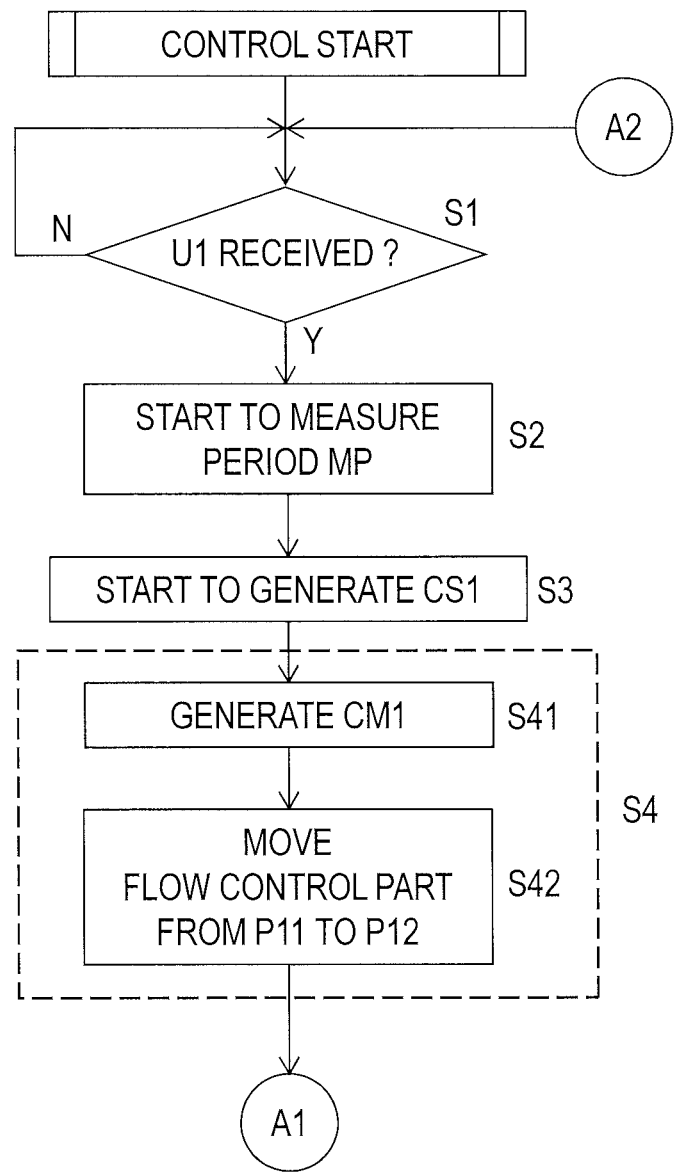
FIGS. 6 and 7 are flow charts of operation of the bicycle seatpost system illustrated in FIG. 1.

As seen in FIG. 6, the remote controller RC1 starts to measure a period MP when the remote controller RC1 receives the first user input U1 (steps S1 and S2). The remote controller RC1 starts to generate the seatpost control signal CS1 in response to the first user input U1 (step S3). The seatpost controller 40 controls the electric actuator 14 to change the state of the bicycle seatpost assembly 12 from the lock state to the adjustable state when the seatpost controller 40 receives the seatpost control signal CS1 (step S4). In this embodiment, the seatpost controller 40 generates the adjustment command CM1 when the seatpost controller 40 receives the seatpost control signal CS1 (step S41). The actuator driver 44 is configured to control the electric actuator 14 to move the hydraulic valve 23 from the closed position P11 to the open position P12 in response to the adjustment command CM1 (step S42). As seen in FIGS. 3 and 4, the seatpost controller 40 controls the electric actuator 14 to maintain the adjustable state until the seatpost controller 40 detects termination of the seatpost control signal CS1.

Figure 7:
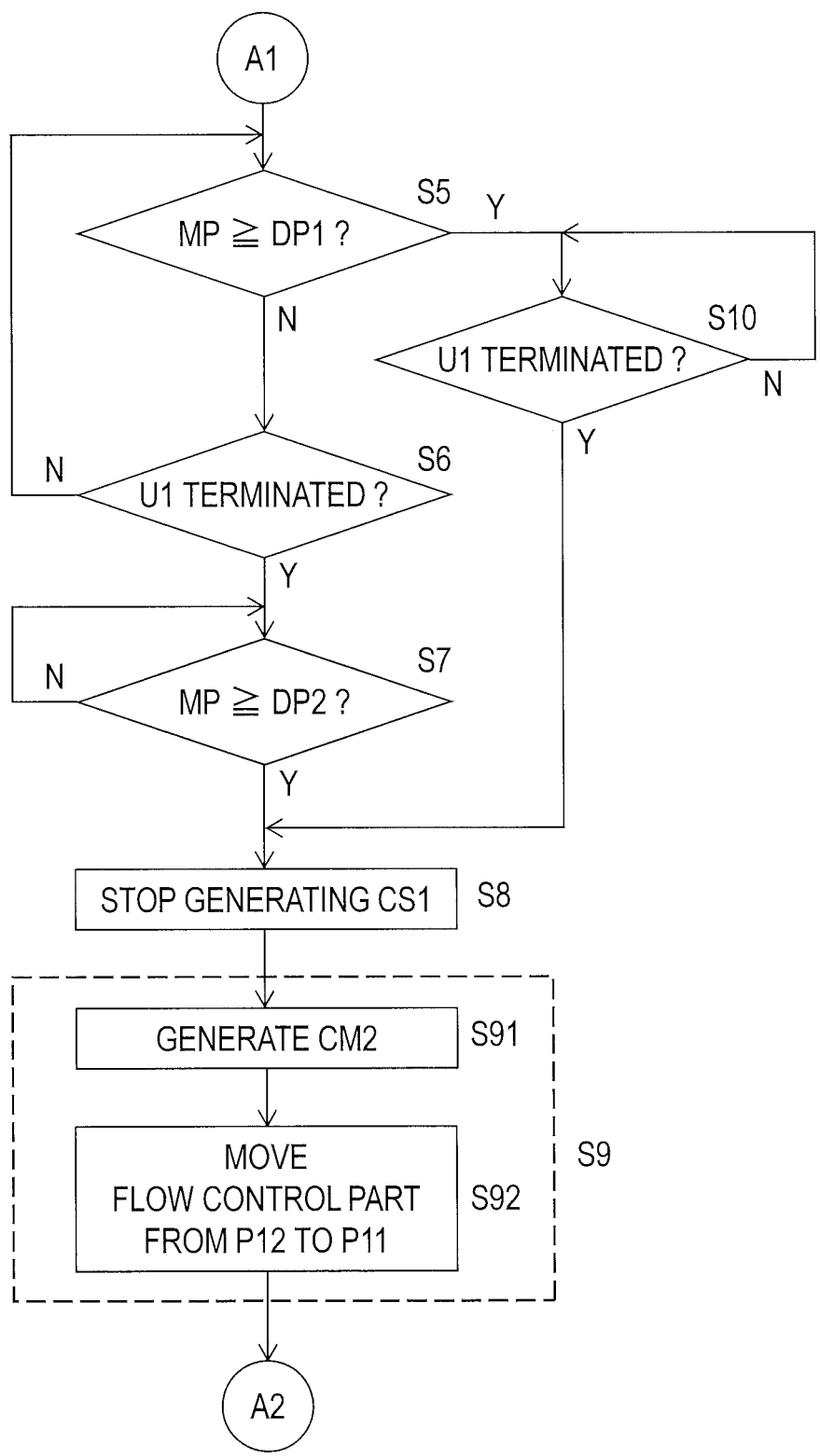

As seen in FIG. 7, the remote controller RC1 compares the measured period MP with the determination period DP1 (step S5). The remote controller RC1 determines whether the first user input U1 is terminated when the remote controller RC1 concludes that the measured period MP is shorter than the determination period DP1 (steps S5 and S6). The remote controller RC1 repeatedly compares the measured period MP with the determination period DP1 until the remote controller RC1 detects the termination of the first user input U1 (steps S5 and S6). The remote controller RC1 compares the measured period MP with an additional determination period DP2 when the remote controller RC1 detects the termination of the first user input U1 before concluding that the measured period MP reaches the determination period DP1 (steps S5 to S7). The remote controller RC1 stops generating the seatpost control signal CS1 to provide the first control signal CS11 having the constant signal length SL1 (FIG. 3) when the remote controller RC1 concludes that the measured period MP is equal to or longer than the additional determination period DP2 (steps S7 and S8). As seen in FIG. 2, the remote memory 13C stores the additional determination period DP2.

As seen in FIG. 7, the remote controller RC1 keeps determining whether the first user input U1 is terminated when the remote controller RC1 concludes that the measured period MP is equal to or larger than the determination period DP1 (steps S5 and S10). The remote controller RC1 stops generating the seatpost control signal CS1 to provide the second control signal CS12 having the variable signal length SL2 (FIG. 4) without comparing the measured period MP with the additional determination period DP2 when the remote controller RC1 detects the termination of the first user input U1 (steps S8 and S10).

As seen in FIG. 7, the seatpost controller 40 controls the electric actuator 14 to return the state of the bicycle seatpost assembly 12 from the adjustable state to the lock state when the seatpost controller 40 detects termination of the seatpost control signal CS1 (one of the first control signal CS11 and the second control signal CS12) (step S9). In this embodiment, the seatpost controller 40 generates the lock command CM2 when the seatpost controller 40 detects the termination of the seatpost control signal CS1 (one of the first control signal CS11 and the second control signal CS12) (step S91). The actuator driver 44 controls the electric actuator 14 to move the hydraulic valve 23 from the open position P12 to the closed position P1 in response to the lock command CM2 (step S92). Thus, the process returns to the step S1 of FIG. 6.

Second Embodiment

A bicycle seatpost system 211 in accordance with a second embodiment will be described below referring to FIGS. 8 to 12. The bicycle seatpost system 211 has the same structure and/or configuration as that of the bicycle seatpost system 11 except for the remote controller RC1 and the bicycle seatpost assembly 12. Thus, elements having substantially the same function as those in the first embodiment will be numbered the same here, and will not be described and/or illustrated again in detail here for the sake of brevity.

Figure 8:
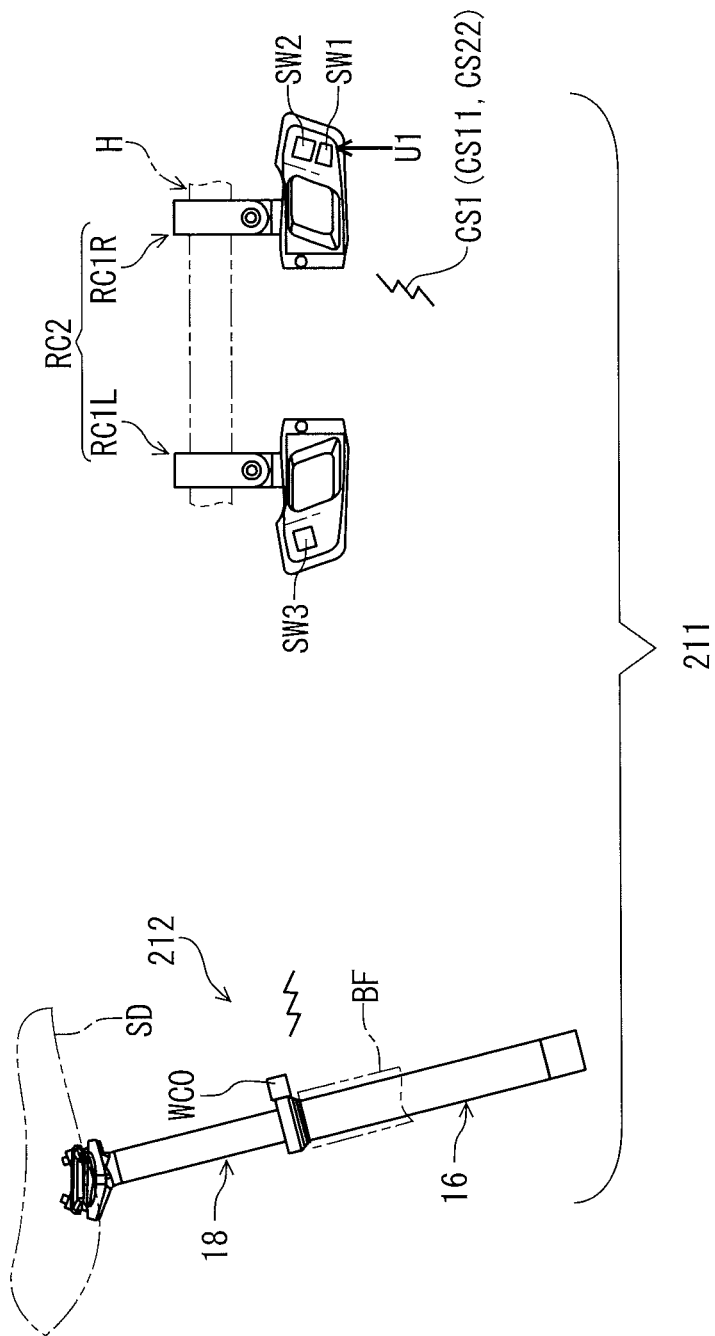
FIG. 8 is a schematic diagram of a bicycle seatpost system in accordance with a second embodiment.
Figure 9:
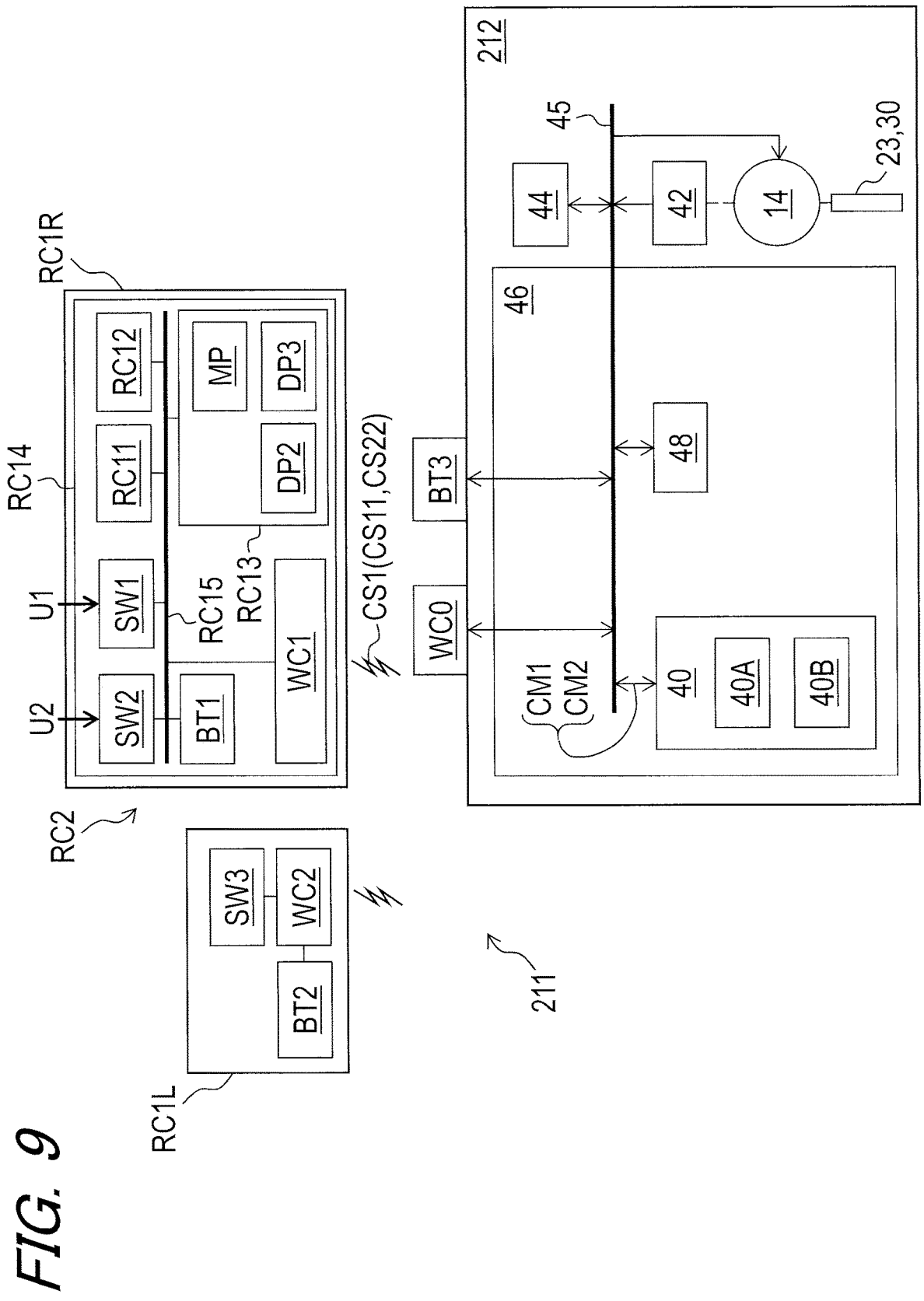
FIG. 9 is a block diagram of the bicycle seatpost system illustrated in FIG. 8.

As seen in FIGS. 8 and 9, the bicycle seatpost system 211 comprises the electric actuator 14, a remote controller RC2, and the seatpost controller 40. The bicycle seatpost system 211 comprises a bicycle seatpost assembly 212 including the seatpost controller 40. In this embodiment, the rear derailleur RD, the battery holder 60, and the battery 62 are omitted. The wireless communicator WC0 is mounted to the bicycle seatpost assembly 212 and is connected to the seatpost controller 40 and the seatpost memory 48. The bicycle seatpost assembly 212 comprises a battery BT3. The battery BT3 is connected to the bus 45 to supply electric power to the wireless communicator WC0, the seatpost controller 40, the seatpost memory 48, and other components.

The remote controller RC2 has substantially the same structure and/or configuration as that of the remote controller RC1 of the first embodiment. In this embodiment, the remote controller RC2 is configured to transmit the first control signal CS11 and a second control signal CS22 different from the first control signal CS11. The seatpost control signal CS1 includes the first control signal CS11 and the second control signal CS22. The seatpost controller 40 is configured to control the electric actuator 14 to change the state of the bicycle seatpost assembly 212 to the adjustable state based on one of the first control signal CS11 and the second control signal CS22.

Figure 10:
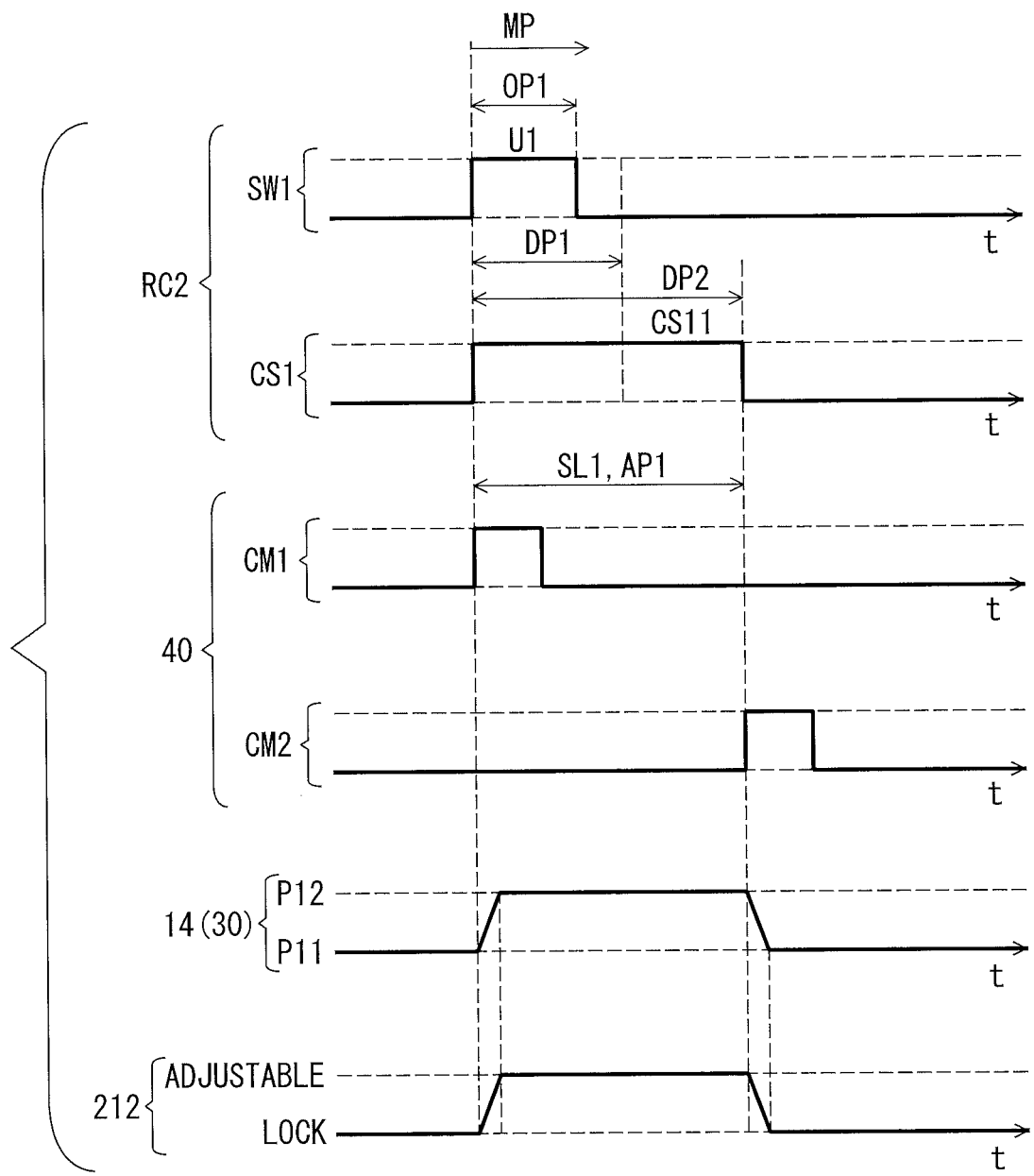
FIGS. 10 and 11 are timing charts of the bicycle seatpost system illustrated in FIG. 8.
Figure 11:
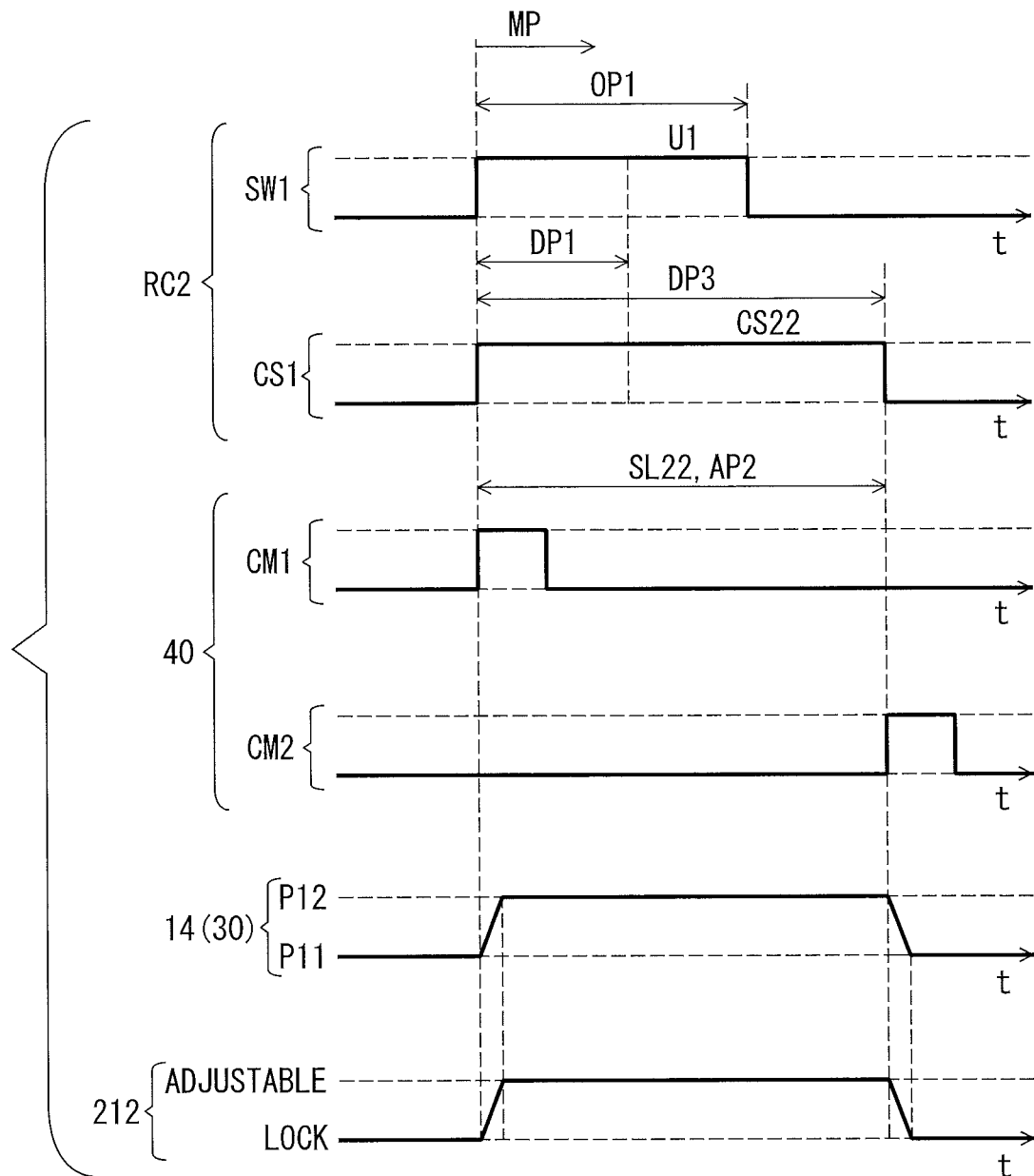

As seen in FIG. 10, in this embodiment, the first control signal CS11 has the constant signal length SL1 as well as the first embodiment. As seen in FIG. 11, however, the second control signal CS22 has a constant signal length SL22 instead of the variable signal length SL2. The constant signal length SL22 of the second control signal CS22 is different from the constant signal length SL1 of the first control signal CS1. In this embodiment, the constant signal length SL22 of the second control signal CS22 is longer than the constant signal length SL1 of the first control signal CS11. However, the constant signal length SL22 of the second control signal CS22 can be shorter than the constant signal length SL1 of the first control signal CS11.

As seen in FIG. 10, the seatpost controller 40 is configured to control the electric actuator 14 to maintain the adjustable state during the first adjustment period AP1 based on the first control signal CS11. The first adjustment period AP1 is a constant period corresponding to the constant signal length SL1 of the first control signal CS11 regardless of the operation period OP1.

As seen in FIG. 11, the seatpost controller 40 is configured to control the electric actuator 14 to maintain the adjustable state during a second adjustment period AP22 that is longer than the first adjustment period AP1 based on the second control signal CS22. The second adjustment period AP22 is a constant period corresponding to the constant signal length SL22 of the second control signal CS22 regardless of the operation period OP1.

Figure 12:
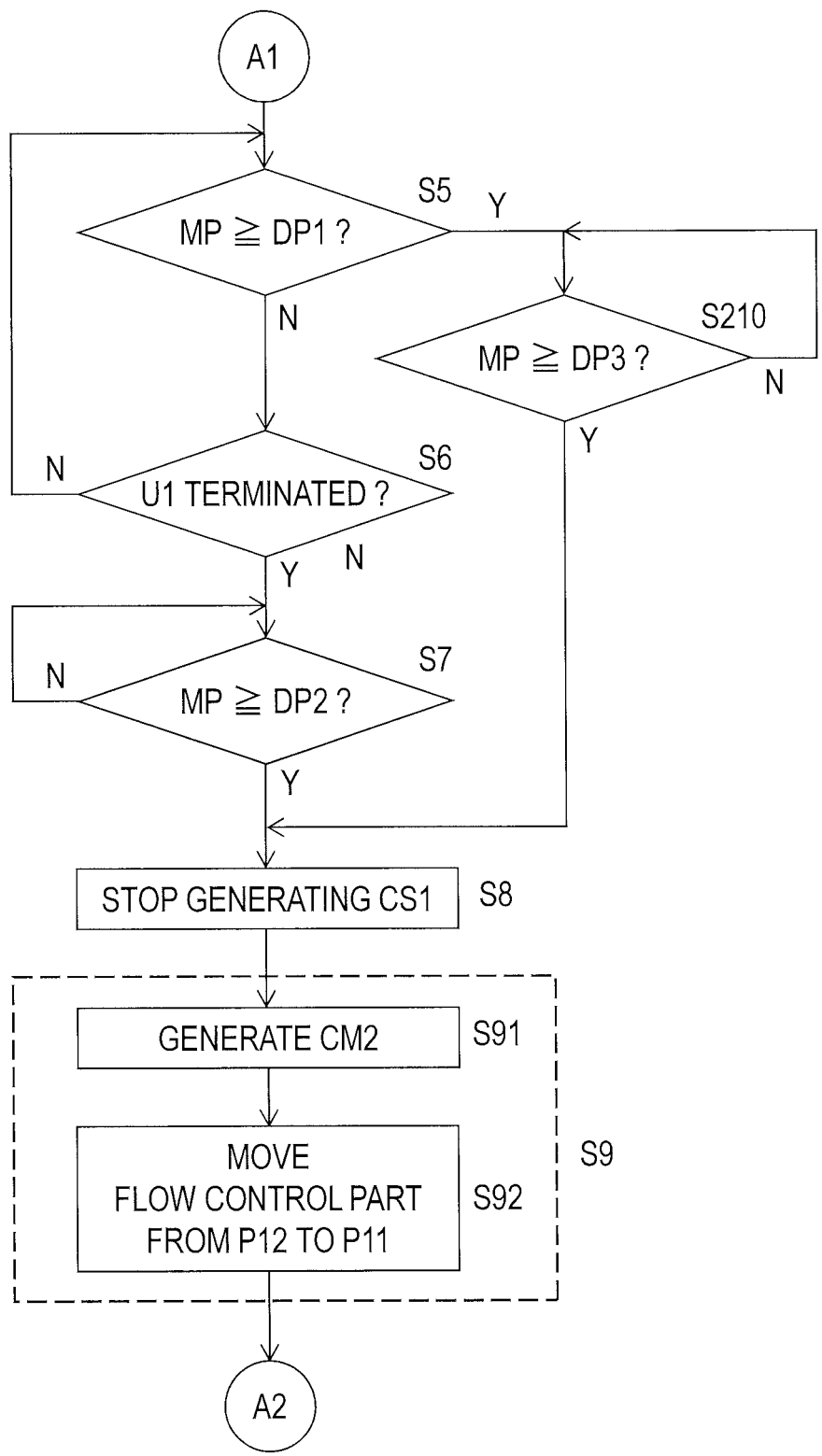
FIG. 12 is a flow chart of operation of the bicycle seatpost system illustrated in FIG. 8.

As seen in FIG. 12, in the flow chart of the second embodiment, the step S10 of FIG. 6 is replaced with step S210. In this embodiment, the remote controller RC2 compares the measured period MP with an additional determination period DP3 when the measured period MP reaches the determination period DP1 before the remote controller RC2 detects the termination of the first user input U1 (steps S5 and S210). The remote controller RC2 stops generating the seatpost control signal CS1 to provide the second control signal CS22 having the constant signal length SL22 (FIG. 11) when the remote controller RC2 concludes that the measured period MP is equal to or longer than the additional determination period DP3 (steps S8 and S210). As seen in FIG. 9, the remote memory 13C stores the additional determination period DP3.

As seen in FIG. 12, the seatpost controller 40 controls the electric actuator 14 to return the state of the bicycle seatpost assembly 212 from the adjustable state to the lock state when the seatpost controller 40 detects termination of the seatpost control signal CS1 (one of the first control signal CS11 and the second control signal CS22) (step S9). In this embodiment, the seatpost controller 40 generates the lock command CM2 when the seatpost controller 40 detects the termination of the seatpost control signal CS1 (one of the first control signal CS11 and the second control signal CS22) (step S91). The actuator driver 44 controls the electric actuator 14 to move the hydraulic valve 23 from the open position P12 to the closed position P11 in response to the lock command CM2 (step S92). Thus, the process returns to the step S1 of FIG. 6.

Third Embodiment

A bicycle control system 310 including a bicycle seatpost system 311 in accordance with a third embodiment will be described below referring to FIGS. 13 and 17. The bicycle seatpost system 311 has the same structure and/or configuration as that of the bicycle seatpost system 211 except for the remote controller RC2. Thus, elements having substantially the same function as those in the above embodiments will be numbered the same here, and will not be described and/or illustrated again in detail here for the sake of brevity.

Figure 13:
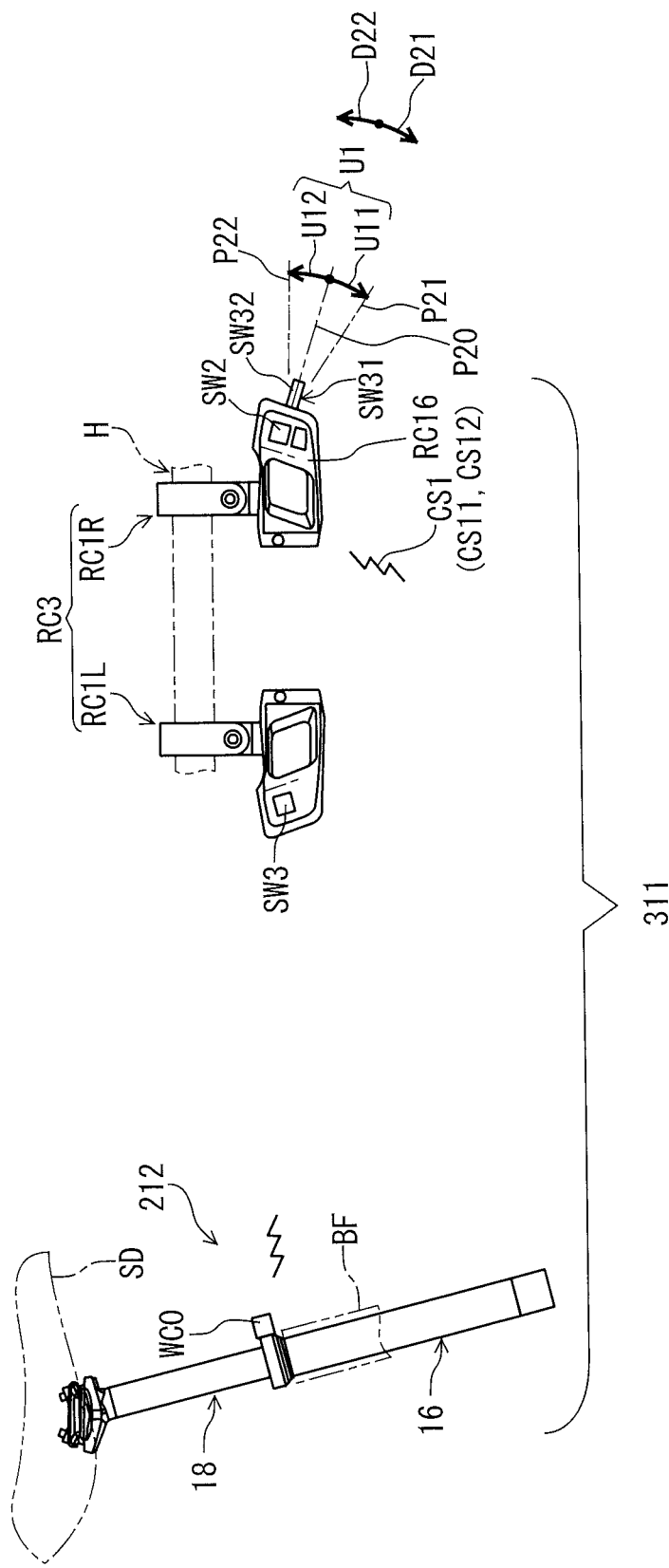
FIG. 13 is a schematic diagram of a bicycle seatpost system in accordance with a third embodiment.
Figure 14:
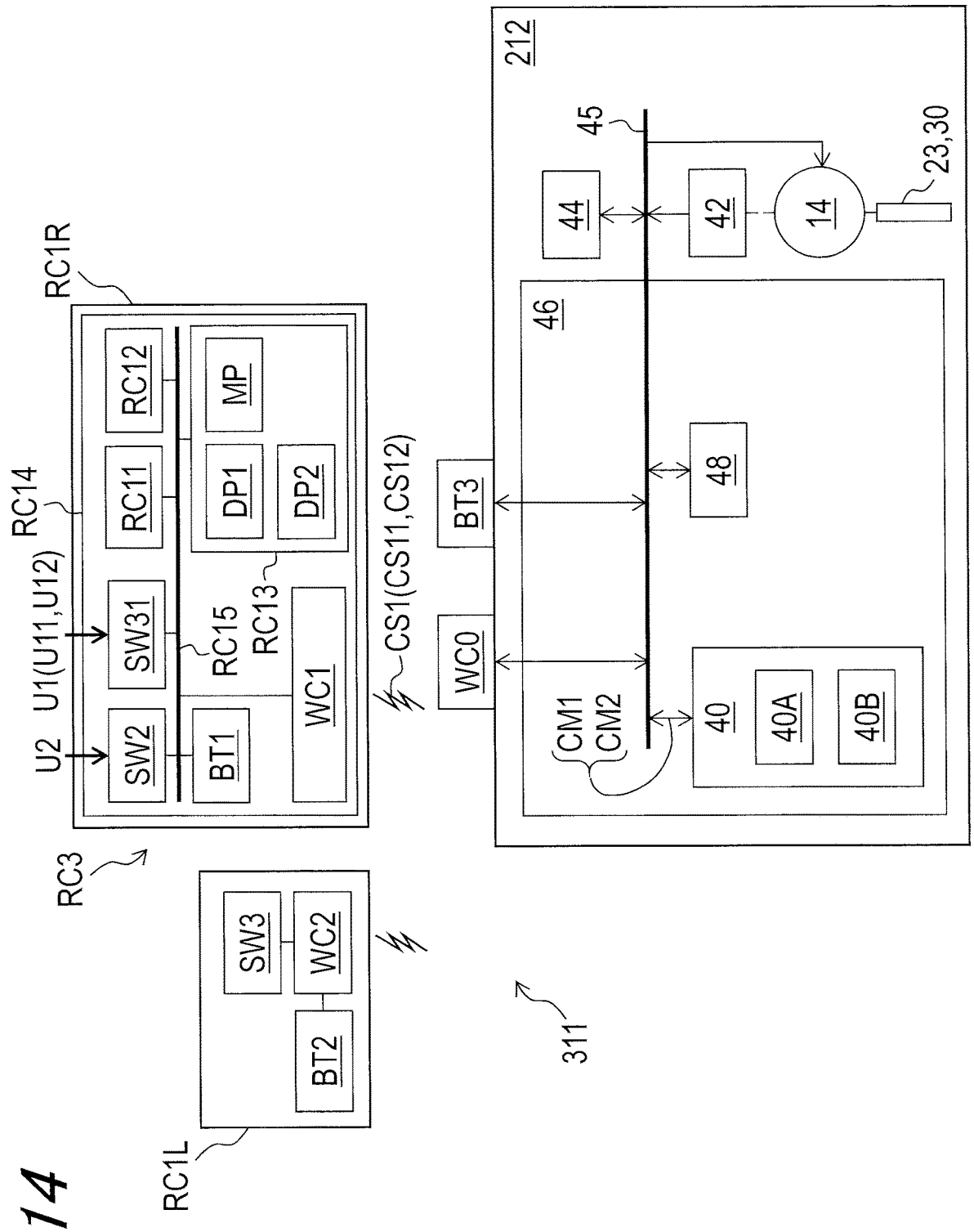
FIG. 14 is a block diagram of the bicycle seatpost system illustrated in FIG. 13.

As seen in FIGS. 13 and 14, the bicycle seatpost system 311 comprises the electric actuator 14, a remote controller RC3, and the seatpost controller 40. The remote controller RC3 is configured to transmit the first control signal CS11 and the second control signal CS12 different from the first control signal CS11. The seatpost controller 40 configured to control the electric actuator 14 to change the state of the bicycle seatpost assembly 212 to the adjustable state based on one of the first control signal CS11 and the second control signal CS12.

The remote controller RC3 has substantially the same structure and/or configuration as that of the remote controller RC1 of the first embodiment. In this embodiment, the remote controller RC3 includes a first operating part SW31 configured to receive the first user input U1 having a first operation direction D21 and a second operation direction D22 different from the first operation direction D21. The remote controller RC3 is configured to generate the first control signal CS11 in response to the first user input U1 in a case where the first operating part SW31 is operated in the first operation direction D21. The remote controller RC3 is configured to generate the second control signal CS12 in response to the first user input U1 in a case where the first operating part SW31 is operated in the second operation direction D22.

As seen in FIG. 13, in this embodiment, the remote controller RC3 is configured to detect the first operation direction D21 and the second operation direction D22 of the first user input U1 which is input to the first operating part SW31. The first operating part SW31 includes an electric switch such as a lever switch. For example, the first operating part SW31 includes a lever SW32 configured to receive the first user input U1. The lever SW32 is pivotally coupled to a base member RC16 of the first operating device RC1R. The lever SW32 is held in a rest position P20 without the first user input U1. The lever SW32 is moved relative to the base member RC16 from the rest position P20 to a first operated position P21 in the first operation direction D21. The lever SW32 is moved relative to the base member RC16 from the rest position P20 to a second operated position P22 in the second operation direction D22.

The first user input U1 includes a first seatpost input U11 and a second seatpost input U12. The lever SW32 is moved relative to the base member RC16 from the rest position P20 to the first operated position P21 in the first operation direction D21 in response to the first seatpost input U11. The lever SW32 is moved relative to the base member RC16 from the rest position P20 to the second operated position P22 in the second operation direction D22 in response to the second seatpost input U12. The remote controller RC3 is configured to generate the first control signal CS11 in response to the first seatpost input U11 having the first operation direction D21. The remote controller RC3 is configured to generate the second control signal CS12 in response to the second seatpost input U12 having the second operation direction D22. The first seatpost input U11 includes a normal press and along press of the lever SW32. The second seatpost input U12 includes a normal press and a long press of the lever SW32.

Figure 15:
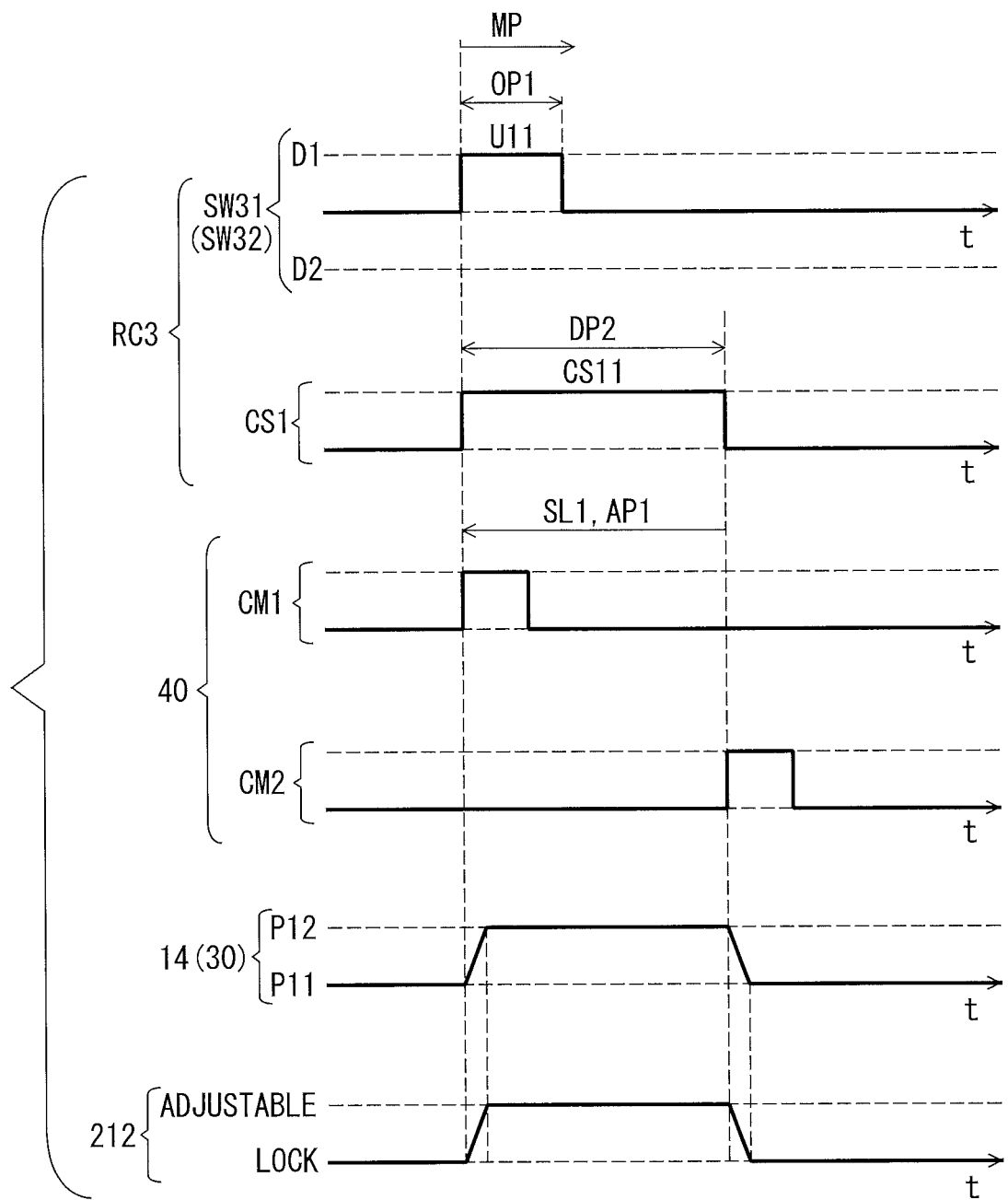
FIGS. 15 and 16 are timing charts of the bicycle seatpost system illustrated in FIG. 13.

As seen in FIG. 15, the seatpost controller 40 is configured to control the electric actuator 14 to maintain the adjustable state during the first adjustment period AP1 based on the first control signal CS11. The first adjustment period AP1 is a constant period corresponding to the constant signal length SL1 of the first control signal CS11 regardless of the operation period OP1 of the first seatpost input U11. Namely, the remote controller RC3 is configured to generate the first control signal CS11 having the constant signal length SL1 when the first operating part SW31 is operated in the first operation direction D21.

Figure 16:
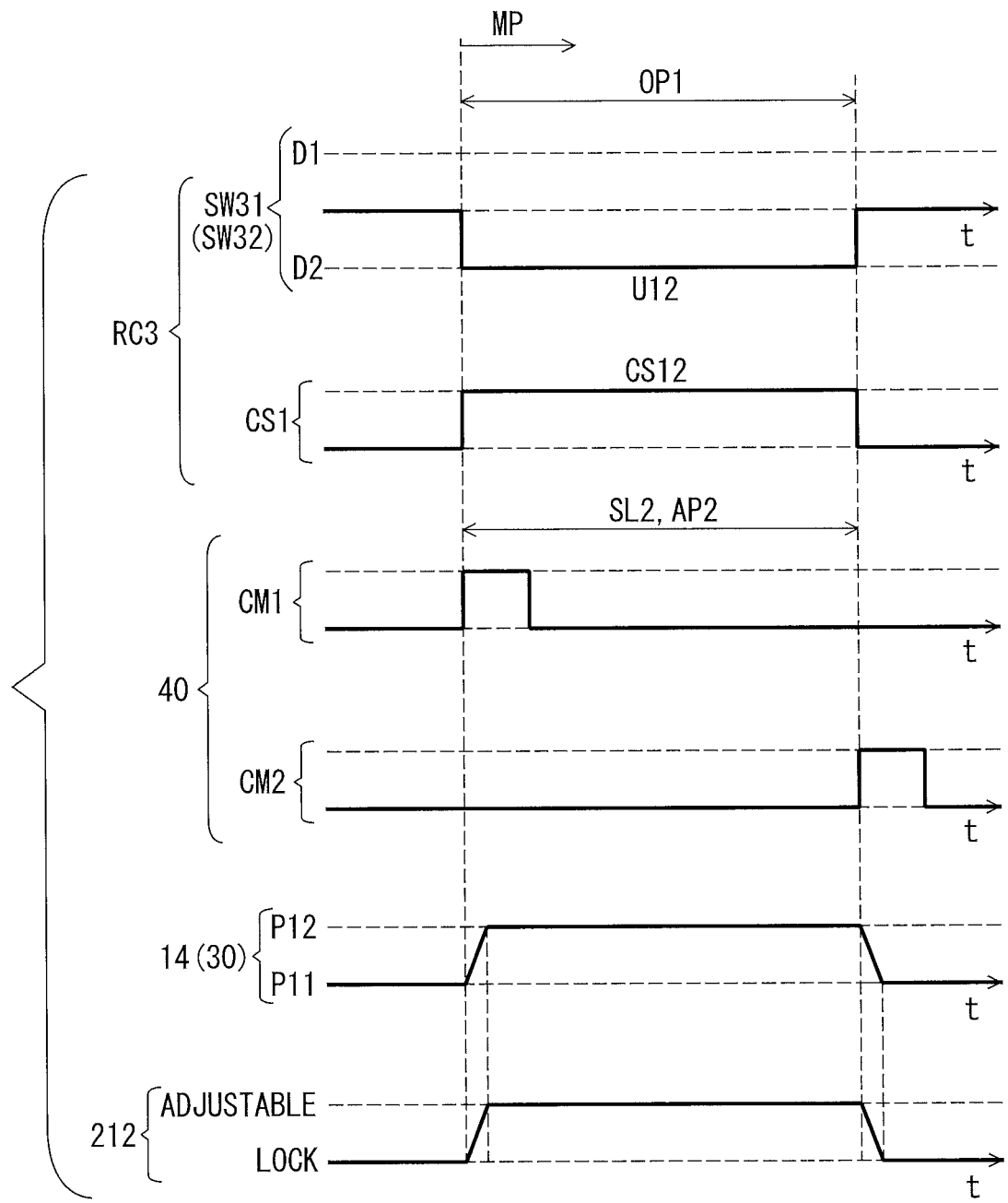

As seen in FIG. 16, the first control signal CS1 has the constant signal length SL1 regardless of the operation period OP1 of the first user input U1. The second adjustment period AP2 is a variable period corresponding to the operation period OP1 and the signal length SL2 of the second control signal CS12. For example, the second adjustment period AP2 is proportional to the operation period OP1. The second control signal CS12 has the signal length SL2 corresponding to the operation period OP1 of the second seatpost input U12. Namely, the remote controller RC3 is configured to generate the second control signal CS12 having the variable signal length SL2 corresponding to the operation period OP1 when the first operating part SW31 is operated in the second operation direction D22. For example, the signal length SL2 is proportional to the operation period OP1.

Figure 17:
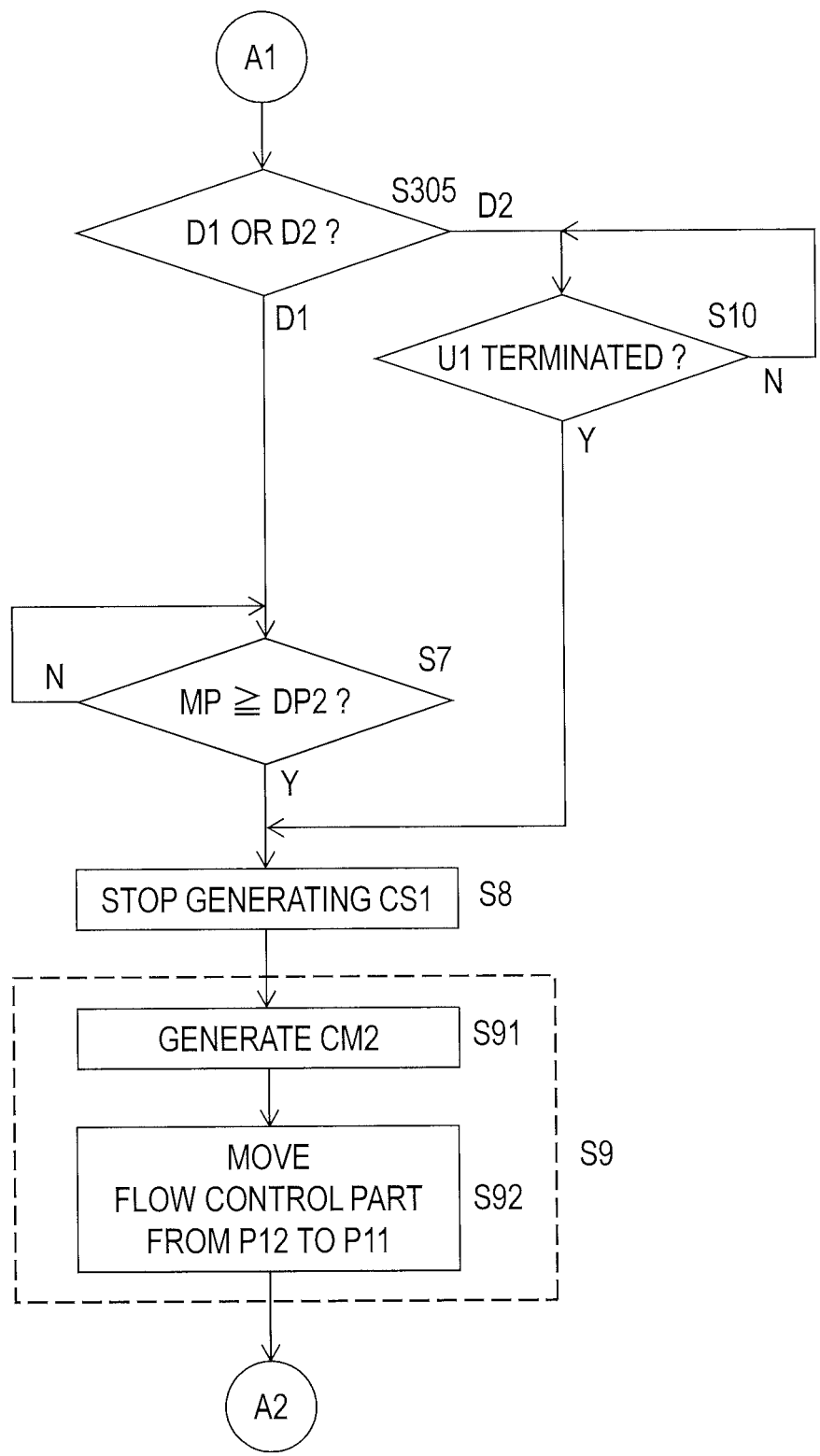
FIG. 17 is a flow chart of operation of the bicycle seatpost system illustrated in FIG. 13.

As seen in FIG. 17, in the flow chart of the third embodiment, the step S5 of FIG. 6 is replaced with step S305, and the step S6 is omitted from the flow chart of FIG. 7. In this embodiment, the remote controller RC3 determines whether the first operating part SW31 is operated in the first operation direction D21 or the second operation direction D22 after the step S4 of FIG. 6 (step S305).

The remote controller RC3 compares the measured period MP with an additional determination period DP2 when the remote controller RC3 concludes that the first operating part SW31 is operated in the first operation direction D21 (steps S305 and S7). The remote controller RC3 stops generating the seatpost control signal CS1 to provide the first control signal CS11 having the constant signal length SL1 (FIG. 15) when the remote controller RC3 concludes that the measured period MP is equal to or longer than the additional determination period DP2 (steps S7 and S8).

The remote controller RC3 determines whether the first user input U1 is terminated when the remote controller RC3 concludes that the first operating part SW31 is operated in the second operation direction D22 (steps S305 and S10). The remote controller RC3 stops generating the seatpost control signal CS1 to provide the second control signal CS12 having the variable signal length SL2 (FIG. 16) when the remote controller RC3 detects the termination of the first user input U1 (steps S8 and S10).

The seatpost controller 40 controls the electric actuator 14 to return the state of the bicycle seatpost assembly 212 from the adjustable state to the lock state when the seatpost controller 40 detects termination of the seatpost control signal CS1 (one of the first control signal CS11 and the second control signal CS22) (step S9). Thus, the process returns to the step S1 of FIG. 6.

Fourth Embodiment

A bicycle seatpost system 411 in accordance with a fourth embodiment will be described below referring to FIGS. 18 to 22. The bicycle seatpost system 411 has the same structure and/or configuration as that of the bicycle seatpost system 311 except for the remote controller RC3. Thus, elements having substantially the same function as those in the above embodiments will be numbered the same here, and will not be described and/or illustrated again in detail here for the sake of brevity.

Figure 18:
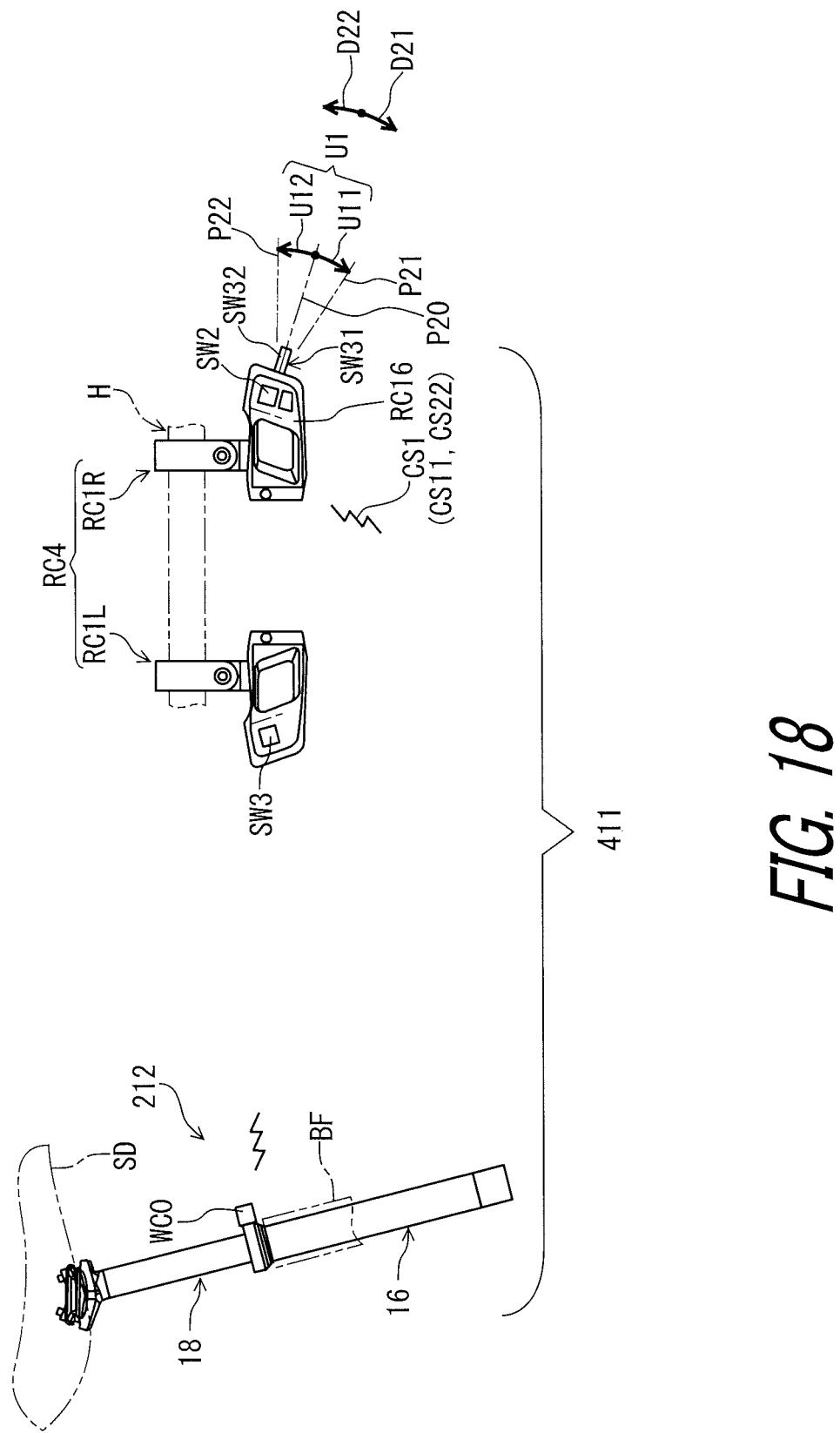
FIG. 18 is a schematic diagram of a bicycle seatpost system in accordance with a fourth embodiment.
Figure 19:
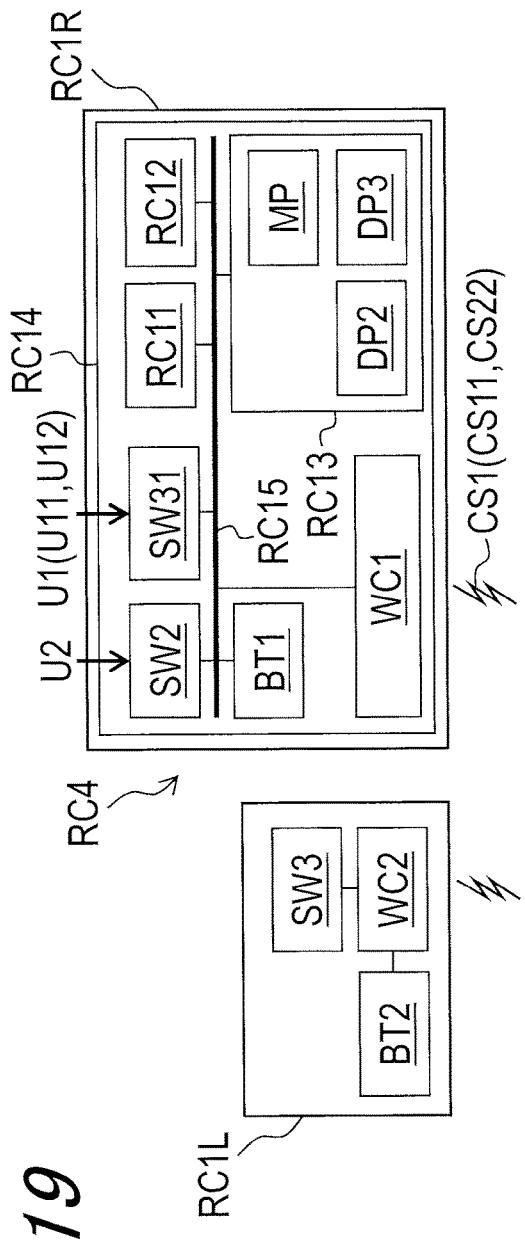
FIG. 19 is a block diagram of the bicycle seatpost system illustrated in FIG. 18.
Figure 19:
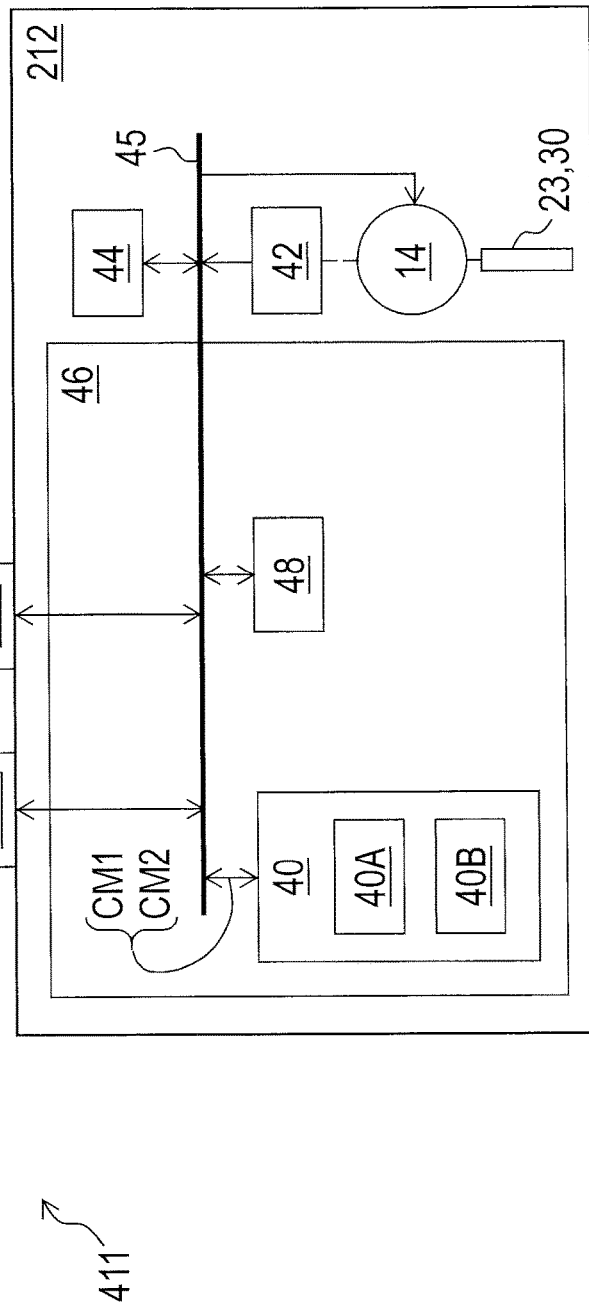

As seen in FIGS. 18 and 19, the bicycle seatpost system 411 comprises the electric actuator 14, a remote controller RC4, and the seatpost controller 40. The remote controller RC4 has substantially the same structure and/or configuration as that of the remote controller RC3 of the third embodiment. The remote controller RC4 includes the first operating part SW31. The remote controller RC4 is configured to transmit the first control signal CS11 and the second control signal CS22 different from the first control signal CS11. The seatpost controller 40 is configured to control the electric actuator 14 to change the state of the bicycle seatpost assembly 212 to the adjustable state based on one of the first control signal CS11 and the second control signal CS22.

Figure 20:
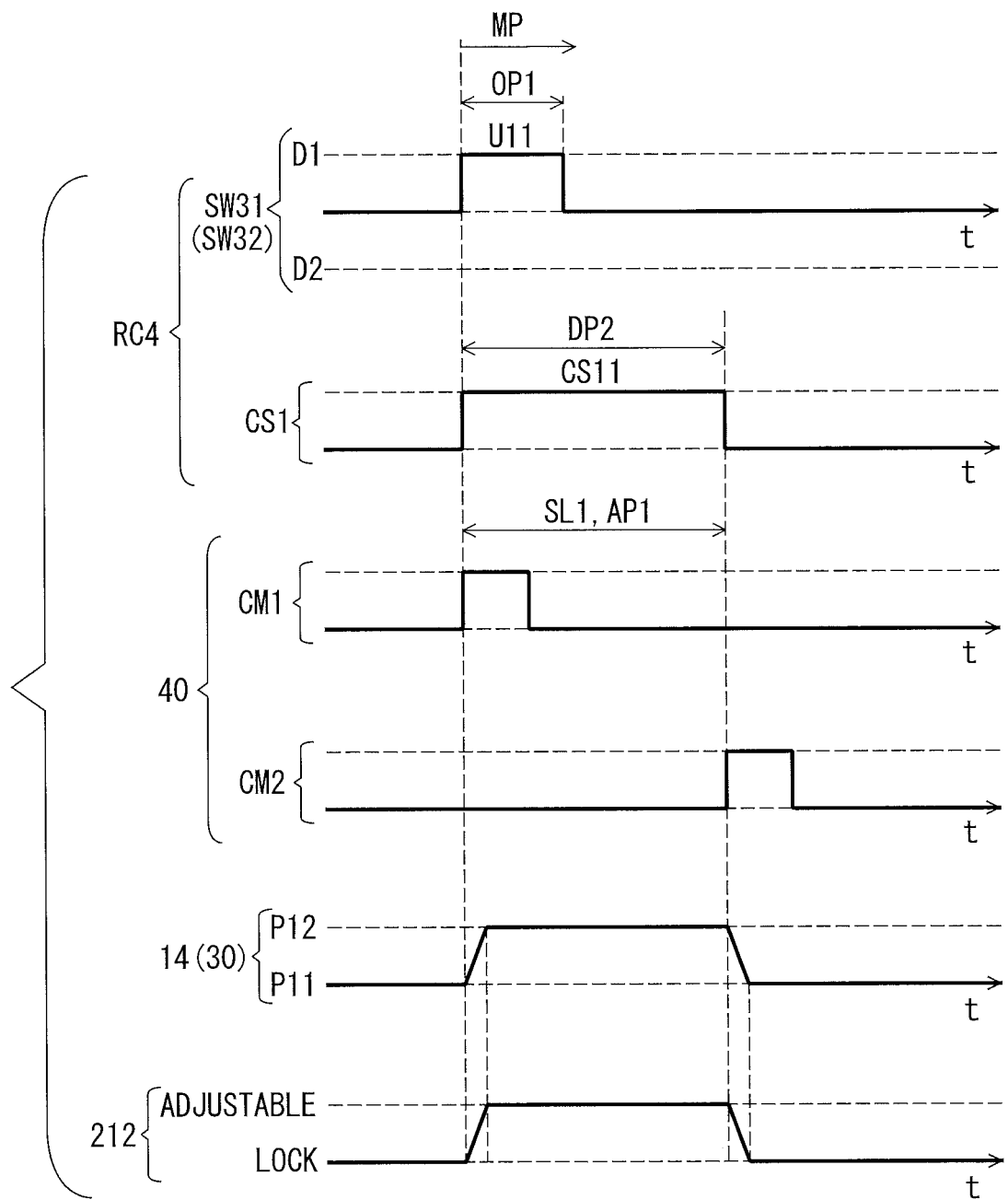
FIGS. 20 and 21 are timing charts of the bicycle seatpost system illustrated in FIG. 18.

As seen in FIG. 20, the remote controller RC4 is configured to generate the first control signal CS1 in response to the first user input U1 in a case where the first operating part SW31 is operated in the first operation direction D21. The seatpost controller 40 is configured to control the electric actuator 14 to maintain the adjustable state during the first adjustment period AP1 based on the first control signal CS11.

Figure 21:
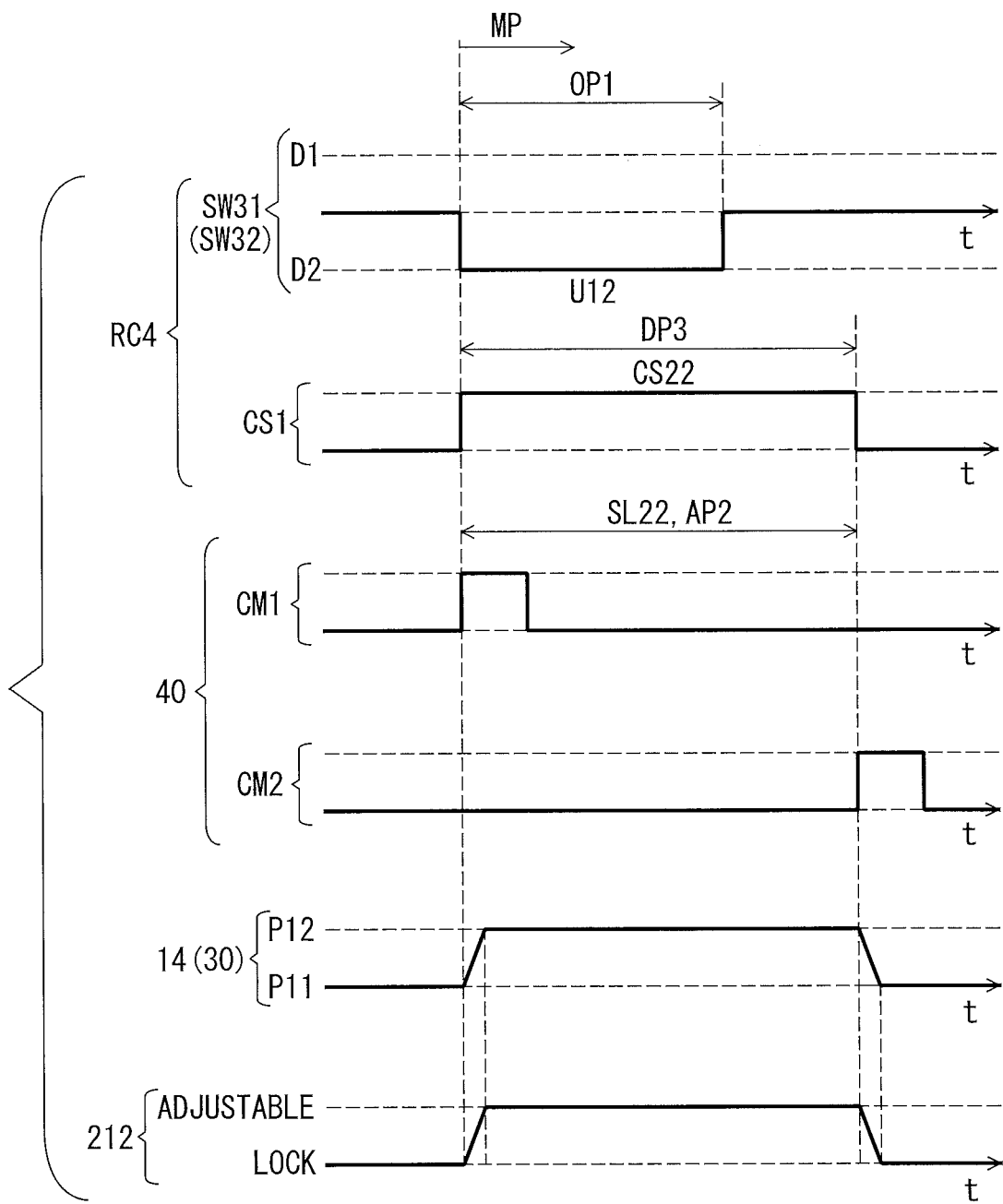

As seen in FIG. 21, the remote controller RC4 is configured to generate the second control signal CS22 in response to the first user input U1 in a case where the first operating part SW31 is operated in the second operation direction D22. The seatpost controller 40 is configured to control the electric actuator 14 to maintain the adjustable state during the second adjustment period AP2 that is longer than the first adjustment period AP1 based on the second control signal CS22.

Figure 22:
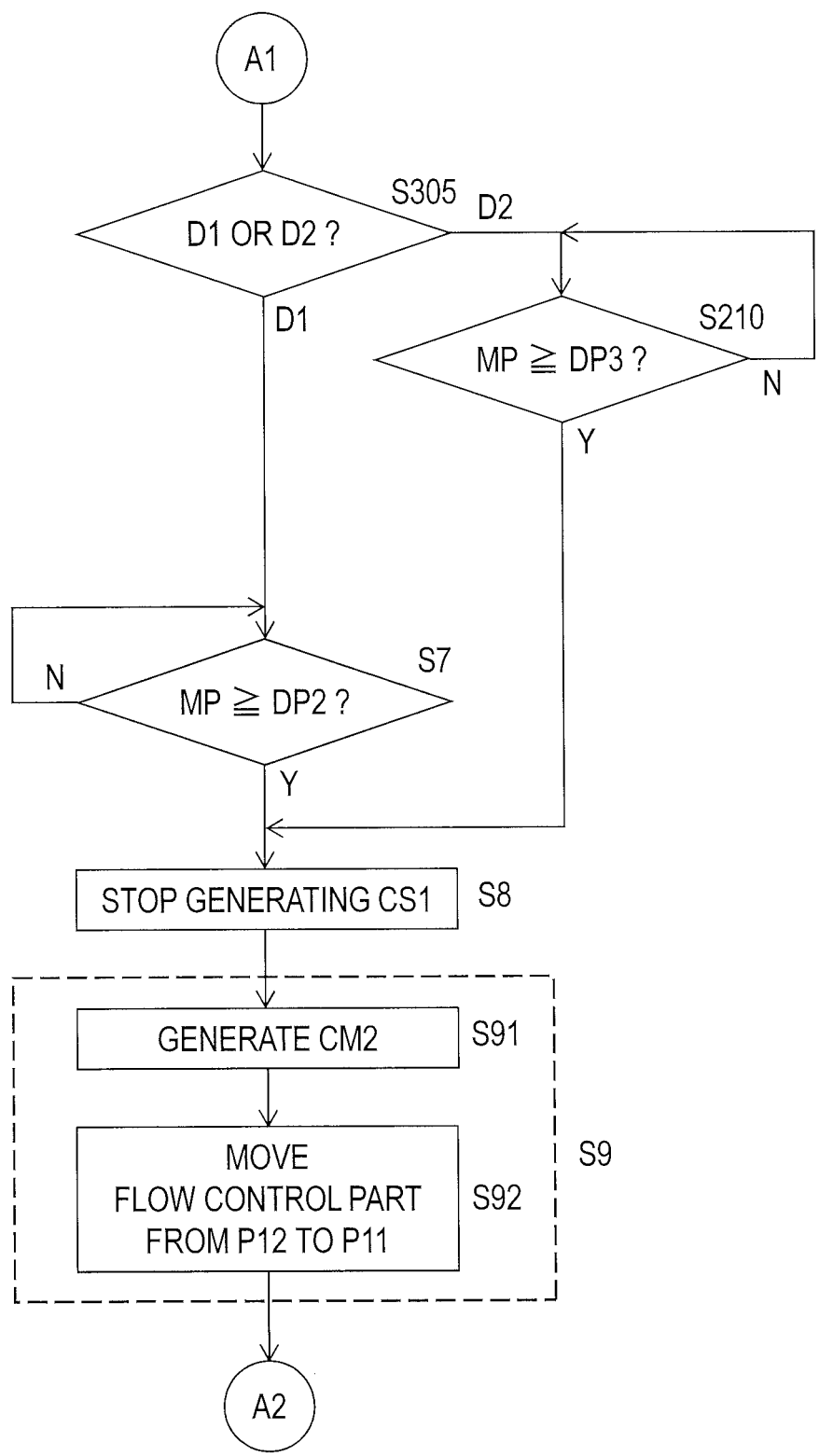
FIG. 22 is a flow chart of operation of the bicycle seatpost system illustrated in FIG. 18.

As seen in FIG. 22, in the flow chart of the fourth embodiment, the step S10 of FIG. 17 is replaced with the step S210 of FIG. 12. In this embodiment, the remote controller RC4 compares the measured period MP with the additional determination period DP3 when the remote controller RC4 concludes that the first operating part SW31 is operated in the second operation direction D22 (steps S305 and S210). The remote controller RC4 stops generating the seatpost control signal CS1 to provide the second control signal CS22 having the constant signal length SL22 (FIG. 21) when the remote controller RC4 concludes that the measured period MP is equal to or longer than the additional determination period DP3 (steps S8 and S210).

The seatpost controller 40 controls the electric actuator 14 to return the state of the bicycle seatpost assembly 12 from the adjustable state to the lock state when the seatpost controller 40 detects termination of the seatpost control signal CS1 (one of the first control signal CS11 and the second control signal CS22) (step S9). Thus, the process returns to the step S of FIG. 6.

Fifth Embodiment

A bicycle seatpost system 511 in accordance with a fifth embodiment will be described below referring to FIGS. 23 to 27. The bicycle seatpost system 511 has the same structure and/or configuration as that of the bicycle seatpost system 311 except for the remote controller RC3. Thus, elements having substantially the same function as those in the above embodiments will be numbered the same here, and will not be described and/or illustrated again in detail here for the sake of brevity.

Figure 23:
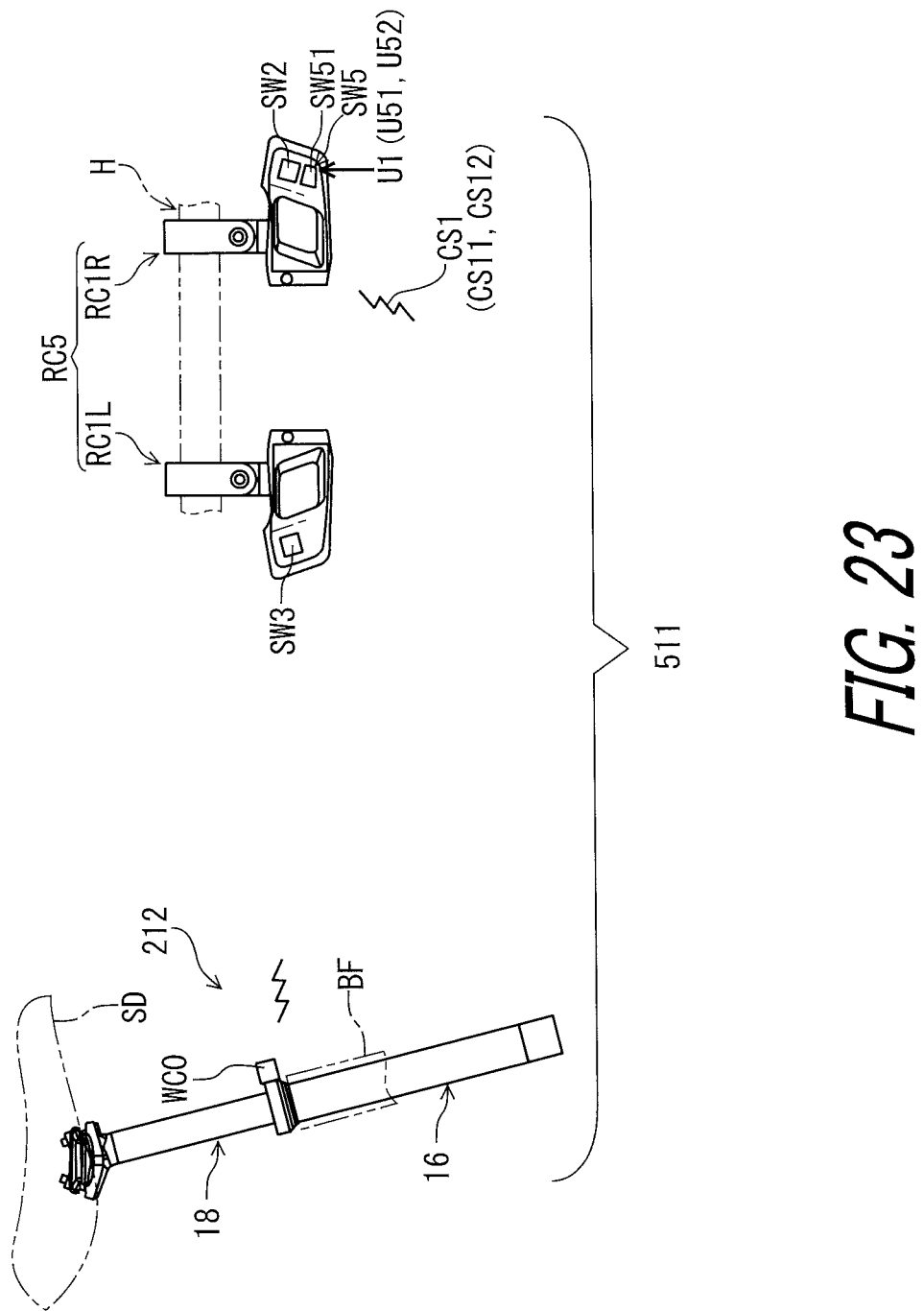
FIG. 23 is a schematic diagram of a bicycle seatpost system in accordance with a fifth embodiment.
Figure 24:
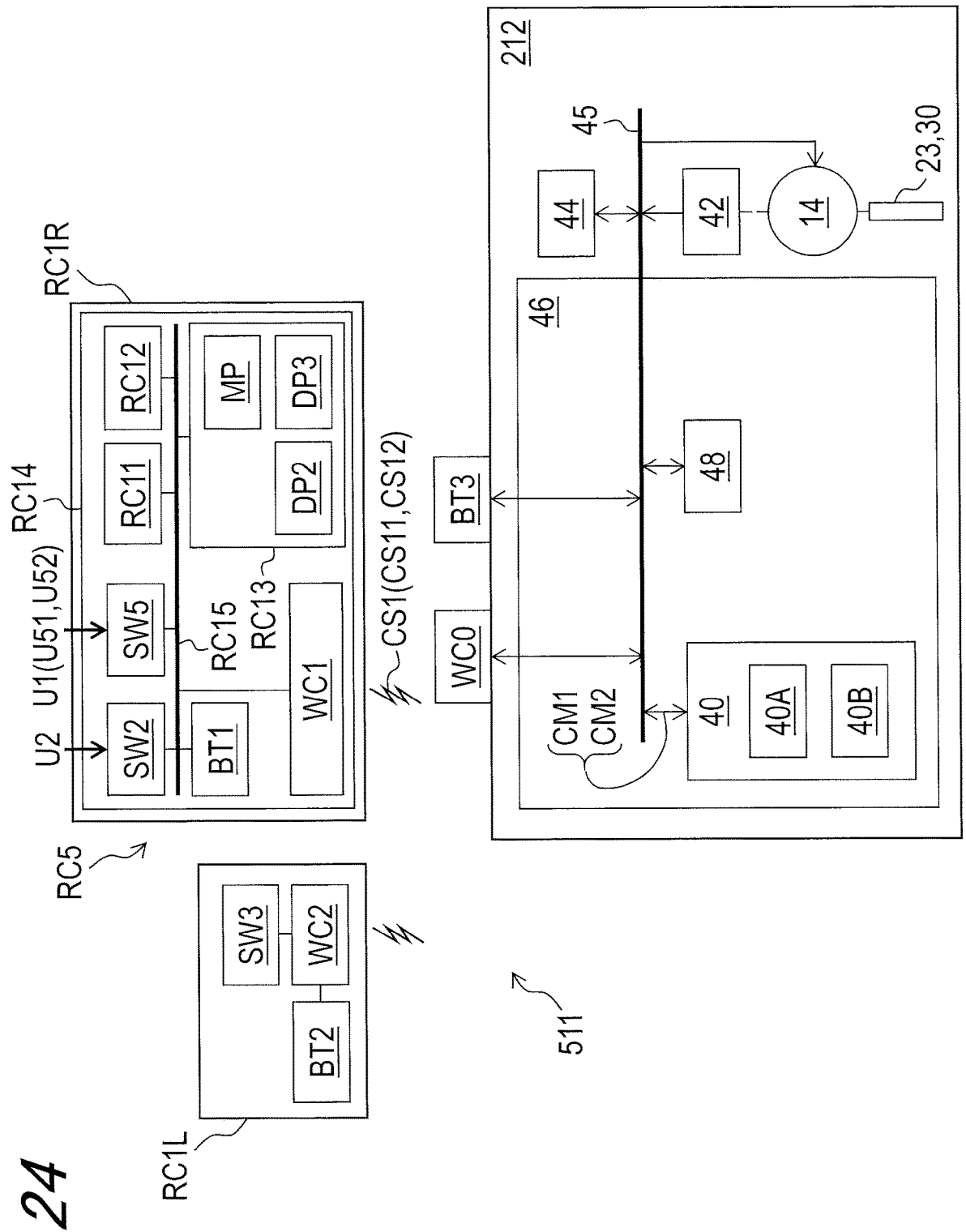
FIG. 24 is a block diagram of the bicycle seatpost system illustrated in FIG. 23.

As seen in FIGS. 23 and 24, the bicycle seatpost system 511 comprises the electric actuator 14, a remote controller RC5, and the seatpost controller 40. The remote controller RC5 is configured to transmit the first control signal CS11 and the second control signal CS12 different from the first control signal CS11. The seatpost controller 40 is configured to control the electric actuator 14 to change the state of the bicycle seatpost assembly 212 to the adjustable state based on one of the first control signal CS11 and the second control signal CS12. However, the remote controller RC5 can be configured to transmit the first control signal CS11 and the second control signal CS22 which has the constant signal length SL22 as well as the remote controller RC4 of the fourth embodiment.

The remote controller RC5 has substantially the same structure and/or configuration as that of the remote controller RC3 of the third embodiment. In this embodiment, the remote controller RC5 includes a first operating part SW5 configured to receive the first user input U1. The first user input U1 includes a first seatpost input U51 and a second seatpost input U521. For example, the first operating part SW5 includes a multi-stage operation switch. The first operating part SW5 includes a button SW51. The button SW51 of the first operating part SW5 has a rest position, a first position, and a second position. The first seatpost input U51 corresponds to a movement of the button SW51 from the rest position to the first position. The first seatpost input U51 corresponds to a movement of the button SW51 from the rest position to the second position different from the first position. The remote controller RC5 is configured to detect the first seatpost input U51 and the second seatpost input U52 which is input to the first operating part SW5.

Figure 25:
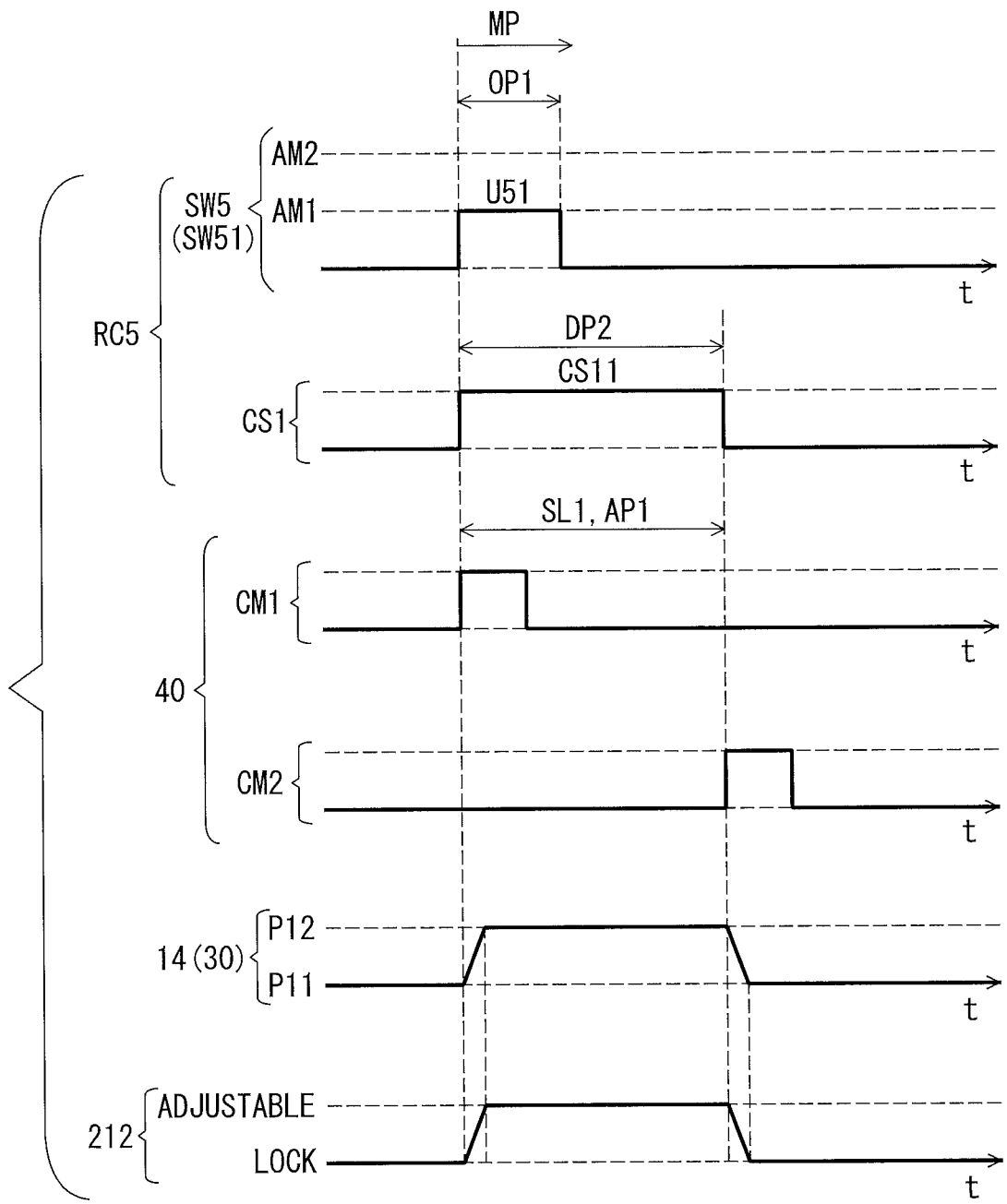
FIGS. 25 and 26 are timing charts of the bicycle seatpost system illustrated in FIG. 23.
Figure 26:
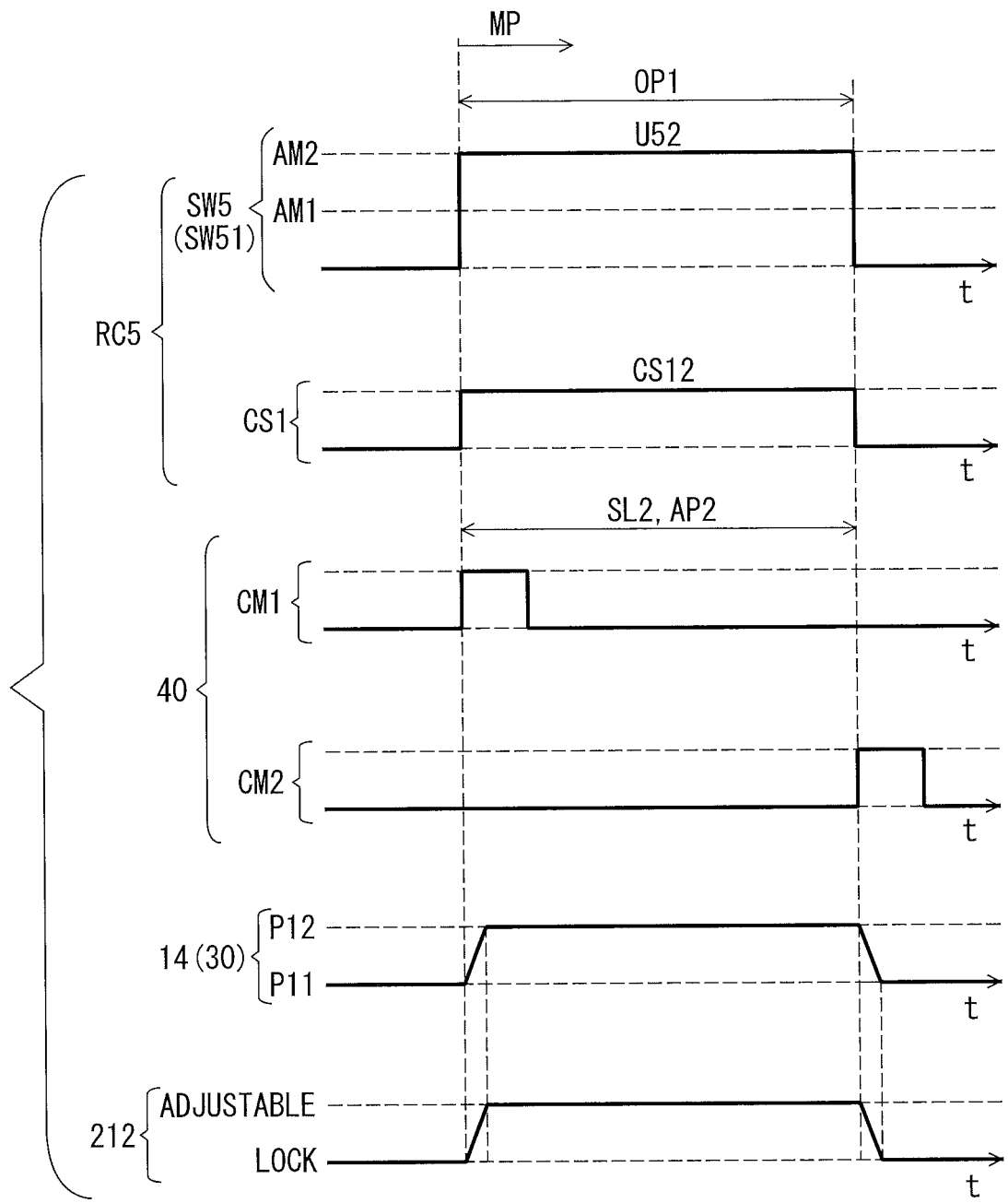

As seen in FIGS. 25 and 26, the first seatpost input U51 has a first operation amount AM1. The second seatpost input U52 has a second operation amount AM2 different from the first operation amount AM1. For example, each of the first operation amount AM1 and the second operation amount AM2 includes a physical change of the first operating part SW5 such as an amount of movement of the button SW51. In this embodiment, the second operation amount AM2 is greater than the first operation amount AM1. However, the second operation amount AM2 can be smaller than the first operation amount AM1.

As seen in FIG. 25, the remote controller RC5 is configured to generate the first control signal CS11 in response to the first user input U1 in a case where the first operating part SW5 is operated by the first operation amount AM1. In this embodiment, the remote controller RC5 is configured to generate the first control signal CS11 having the constant signal length SL in response to the first seatpost input U51 having the first operation amount AM1.

As seen in FIG. 26, the remote controller RC5 is configured to generate the second control signal CS12 in response to the first user input U1 in a case where the first operating part SW5 is operated by the second operation amount AM2 different from the first operation amount AM1. In this embodiment, the remote controller RC5 is configured to generate the second control signal CS12 having the variable signal length SL2 in response to the second seatpost input U52 having the second operation amount AM2. The first operation amount AM1 and the second operation amount AM2 are different movement amount of the first operating part SW5 that moves linearly, slidably, pivotally or rotationally by the first user input U1.

Figure 27:
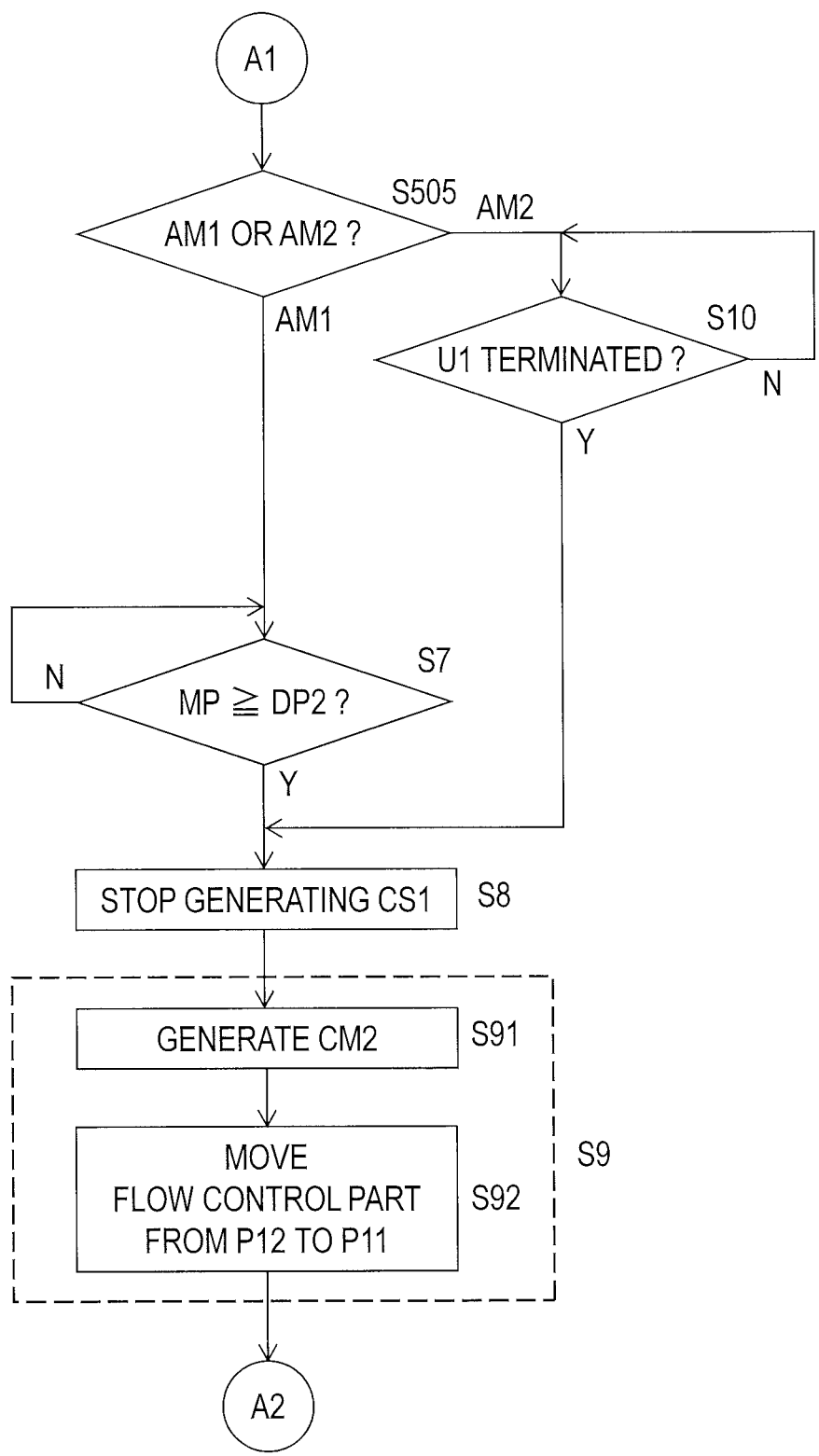
FIG. 27 is a flow chart of operation of the bicycle seatpost system illustrated in FIG. 23.

As seen in FIG. 27, in the flow chart of the fifth embodiment, the step S305 of FIG. 17 is replaced with step S505. In this embodiment, the remote controller RC5 compares the measured period MP with the additional determination period DP2 when the remote controller RC5 concludes that the first operating part SW5 is operated by the first operation amount AM1 (steps S505 and S7). The remote controller RC5 stops generating the seatpost control signal CS1 to provide the first control signal CS11 having the constant signal length SL1 (FIG. 25) when the remote controller RC5 concludes that the measured period MP is equal to or longer than the additional determination period DP2 (steps S7 and S8).

The remote controller RC5 compares the measured period MP with the additional determination period DP3 when the remote controller RC5 concludes that the first operating part SW5 is operated by the second operation amount AM2 (steps S505 and S210). The remote controller RC5 stops generating the seatpost control signal CS1 to provide the second control signal CS12 corresponding to operation period of the first user input U1 when the remote controller RC5 detects the termination of the first user input U1 (the second seatpost input U52) (steps S8 and S10).

The seatpost controller 40 controls the electric actuator 14 to return the state of the bicycle seatpost assembly 212 from the adjustable state to the lock state when the seatpost controller 40 detects termination of the seatpost control signal CS1 (one of the first control signal CS11 and the second control signal CS22) (step S9). Thus, the process returns to the step S1 of FIG. 6.

Sixth Embodiment

A bicycle seatpost system 611 in accordance with a sixth embodiment will be described below referring to FIGS. 28 to 32. The bicycle seatpost system 611 has the same structure and/or configuration as that of the bicycle seatpost system 411 except for the remote controller RC4. Thus, elements having substantially the same function as those in the above embodiments will be numbered the same here, and will not be described and/or illustrated again in detail here for the sake of brevity.

Figure 28:
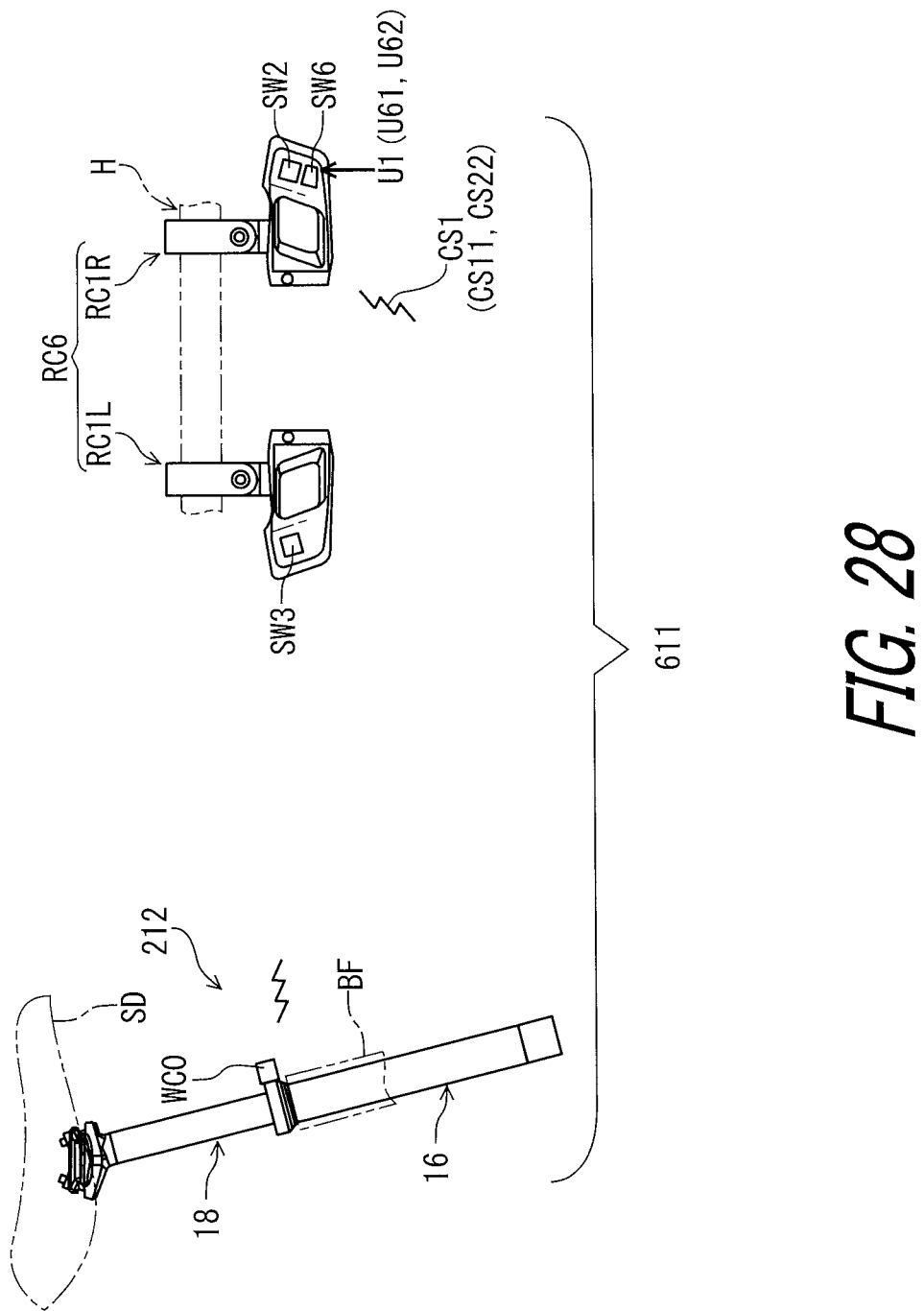
FIG. 28 is a schematic diagram of a bicycle seatpost system in accordance with a sixth embodiment.
Figure 29:
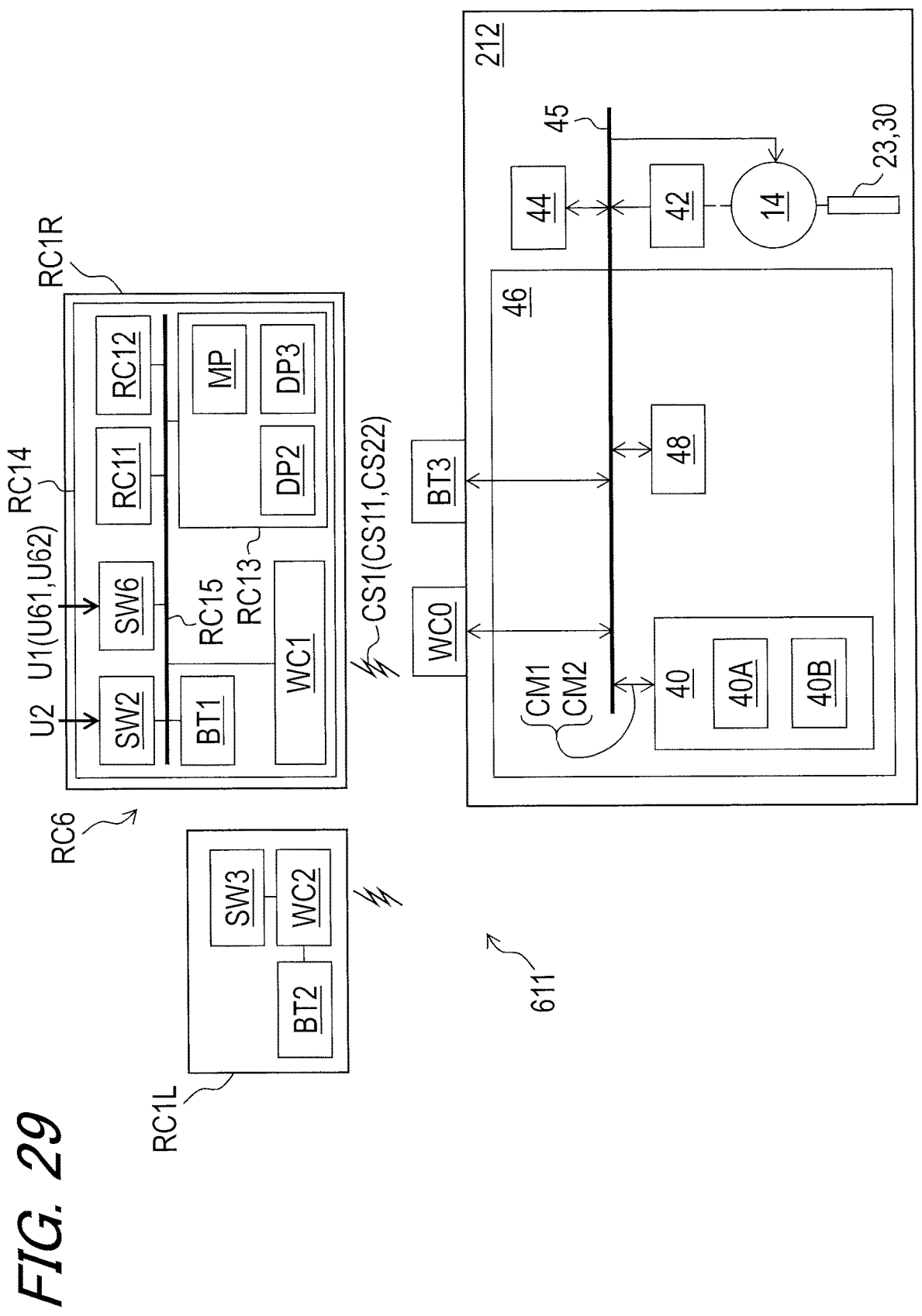
FIG. 29 is a block diagram of the bicycle seatpost system illustrated in FIG. 28.

As seen in FIGS. 28 and 29, the bicycle seatpost system 611 comprises the electric actuator 14, a remote controller RC6, and the seatpost controller 40. The remote controller RC6 is configured to transmit the first control signal CS11 and the second control signal CS22 different from the first control signal CS11. The seatpost controller 40 is configured to control the electric actuator 14 to change the state of the bicycle seatpost assembly 212 to the adjustable state based on one of the first control signal CS11 and the second control signal CS22.

The remote controller RC6 has substantially the same structure and/or configuration as that of the remote controller RC4 of the fourth embodiment. In this embodiment, the remote controller RC6 includes a first operating part SW6 configured to receive the first user input U1. The first user input U1 includes a first seatpost input U61 and a second seatpost input U621. The first seatpost input U61 has a first number of operation times TM1. The second seatpost input U62 has a second number of operation times TM2. The second number of operation times TM2 is different from the first number of operation times TM1. In this embodiment, the first number of operation times TM1 is one, and the second number of operation times TM2 is two. Namely, the first seatpost input U61 is a single click of the first operating part SW61. The second seatpost input U62 is a double click of the first operating part SW61. However, the first number of operation times TM1 and the second number of operation times TM2 are not limited to this embodiment.

Figure 30:
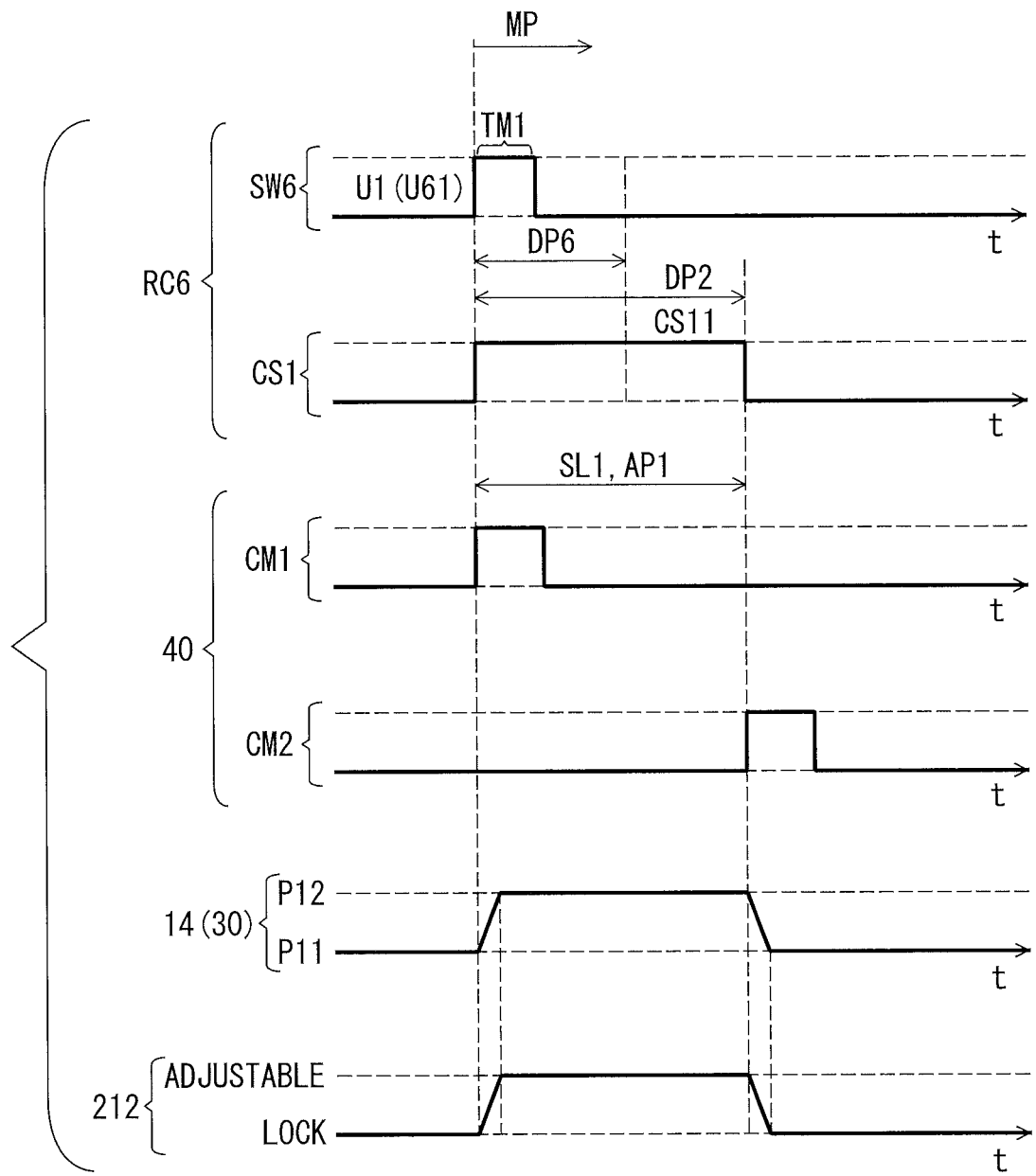
FIGS. 30 and 31 are timing charts of the bicycle seatpost system illustrated in FIG. 28.

As seen in FIG. 30, the remote controller RC6 is configured to generate the first control signal CS11 in response to the first user input U1 in a case where the first operating part SW6 is operated by the first number of operation times TM1 within a predetermined period DP6. In this embodiment, the remote controller RC6 is configured to generate the first control signal CS11 having the constant signal length SL1 in response to the first seatpost input U61 having the first number of operation times TM1.

Figure 31:
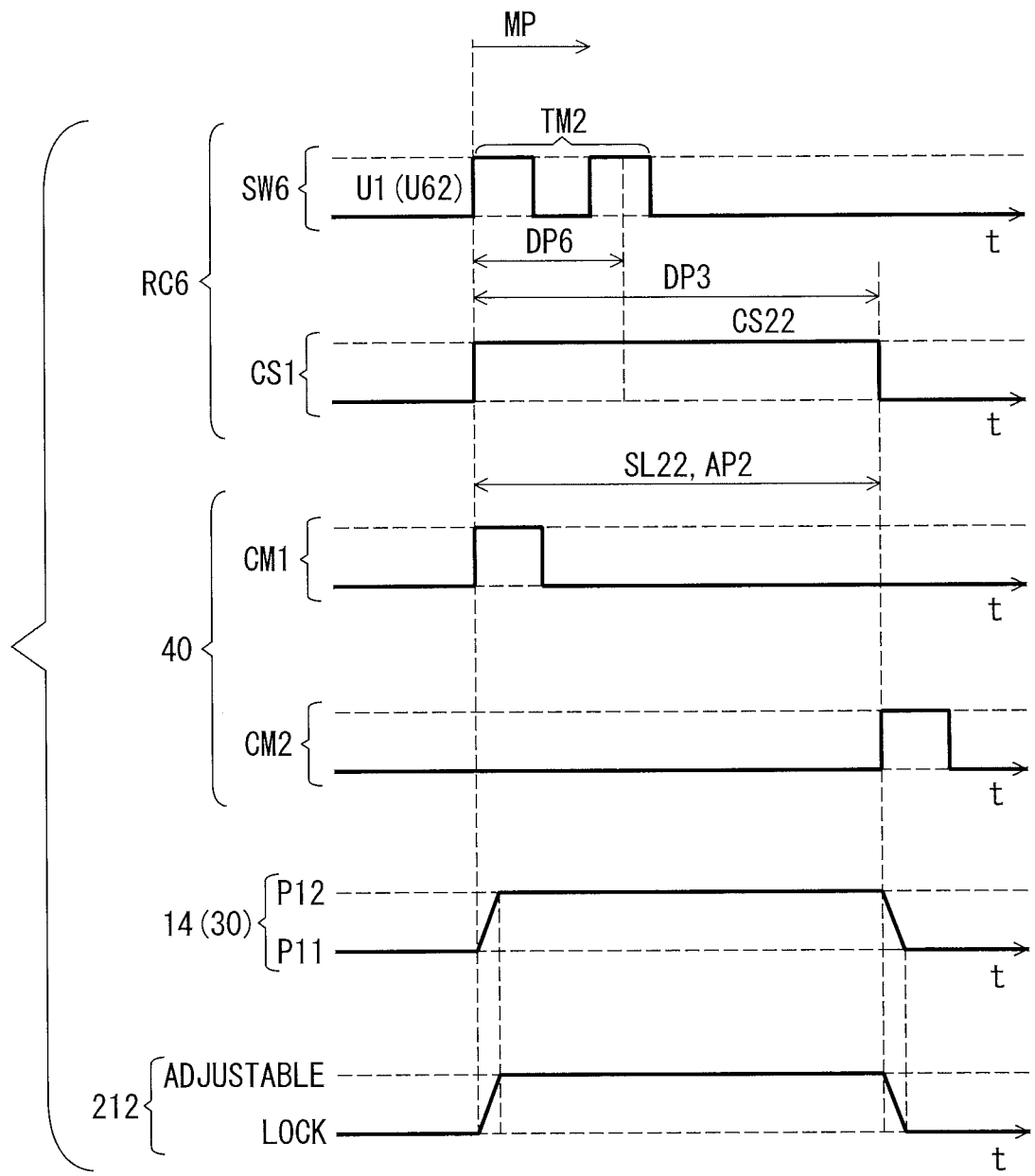

As seen in FIG. 31, the remote controller RC6 is configured to generate the second control signal CS22 in response to the first user input U1 in a case where the first operating part SW6 is operated by the second number of operation times TM2 within the predetermined period DP6. In this embodiment, the remote controller RC6 is configured to generate the second control signal CS22 having the constant signal length SL22 in response to the second seatpost input U62 having the second number of operation times TM2.

Figure 32:
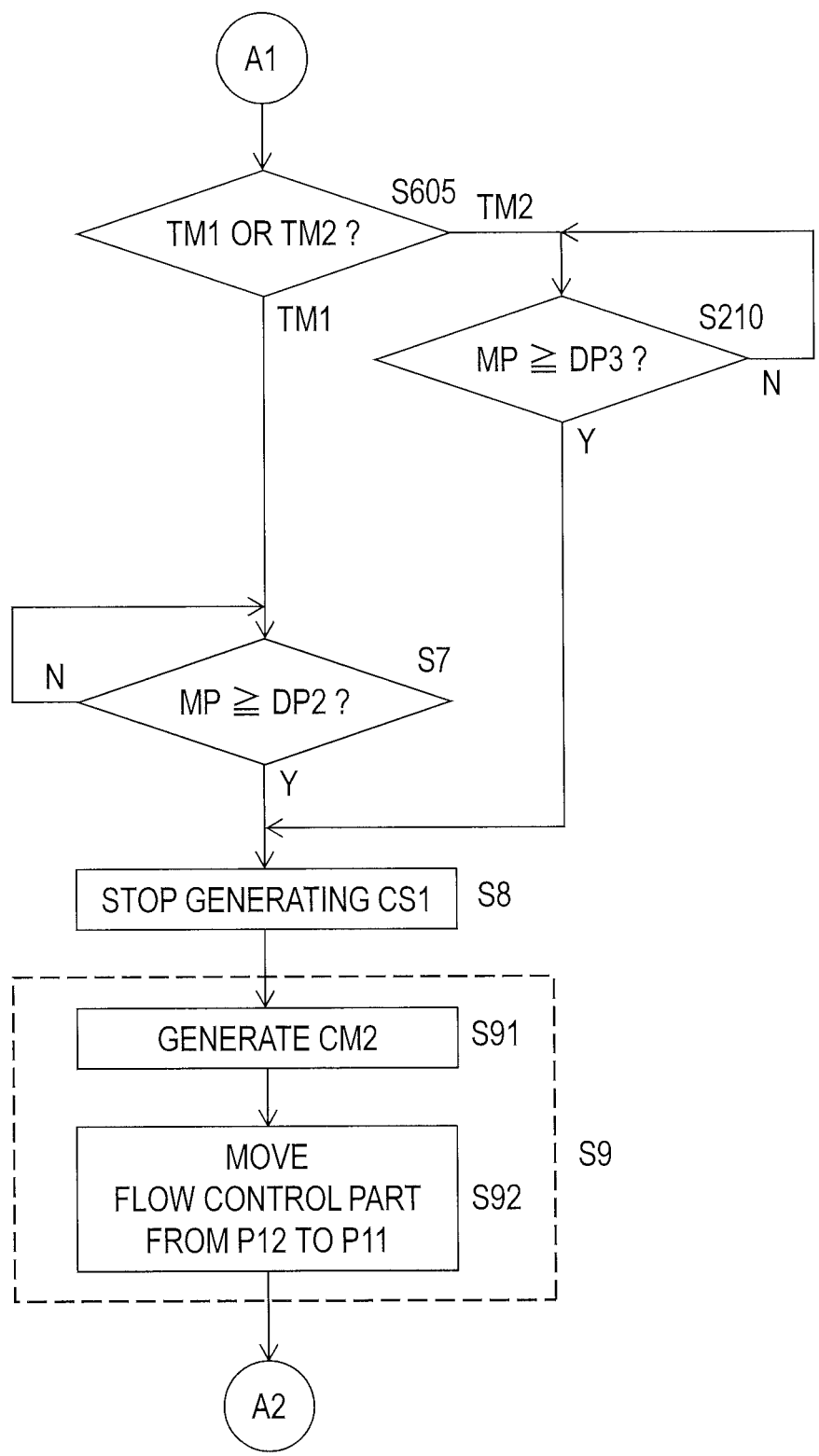
FIG. 32 is a flow chart of operation of the bicycle seatpost system illustrated in FIG. 28.

As seen in FIG. 32, in the flow chart of the sixth embodiment, the step S305 of FIG. 22 is replaced with step S605. In this embodiment, the remote controller RC6 compares the measured period MP with the additional determination period DP2 when the remote controller RC6 concludes that the first operating part SW6 is operated by the first number of operation times TM1 during the predetermined period DP6 (steps S605 and S7). The remote controller RC6 stops generating the seatpost control signal CS1 to provide the first control signal CS11 having the constant signal length SL1 (FIG. 30) when the remote controller RC6 concludes that the measured period MP is equal to or longer than the additional determination period DP2 (steps S7 and S8).

The remote controller RC6 compares the measured period MP with the additional determination period DP3 when the remote controller RC6 concludes that the first operating part SW6 is operated by the second number of operation times TM2 during the predetermined period DP6 (steps S605 and S210). The remote controller RC6 stops generating the seatpost control signal CS1 to provide the second control signal CS22 having the constant signal length SL2 (FIG. 31) when the remote controller RC6 concludes that the measured period MP is equal to or longer than the additional determination period DP3 (steps S8 and S210).

The seatpost controller 40 controls the electric actuator 14 to return the state of the bicycle seatpost assembly 212 from the adjustable state to the lock state when the seatpost controller 40 detects termination of the seatpost control signal CS1 (one of the first control signal CS11 and the second control signal CS22) (step S9). Thus, the process returns to the step S1 of FIG. 6.

Seventh Embodiment

A bicycle seatpost system 711 in accordance with a fifth embodiment will be described below referring to FIGS. 33 to 37. The bicycle seatpost system 711 has the same structure and/or configuration as that of the bicycle seatpost system 311 except for the remote controller RC3. Thus, elements having substantially the same function as those in the above embodiments will be numbered the same here, and will not be described and/or illustrated again in detail here for the sake of brevity.

Figure 33:
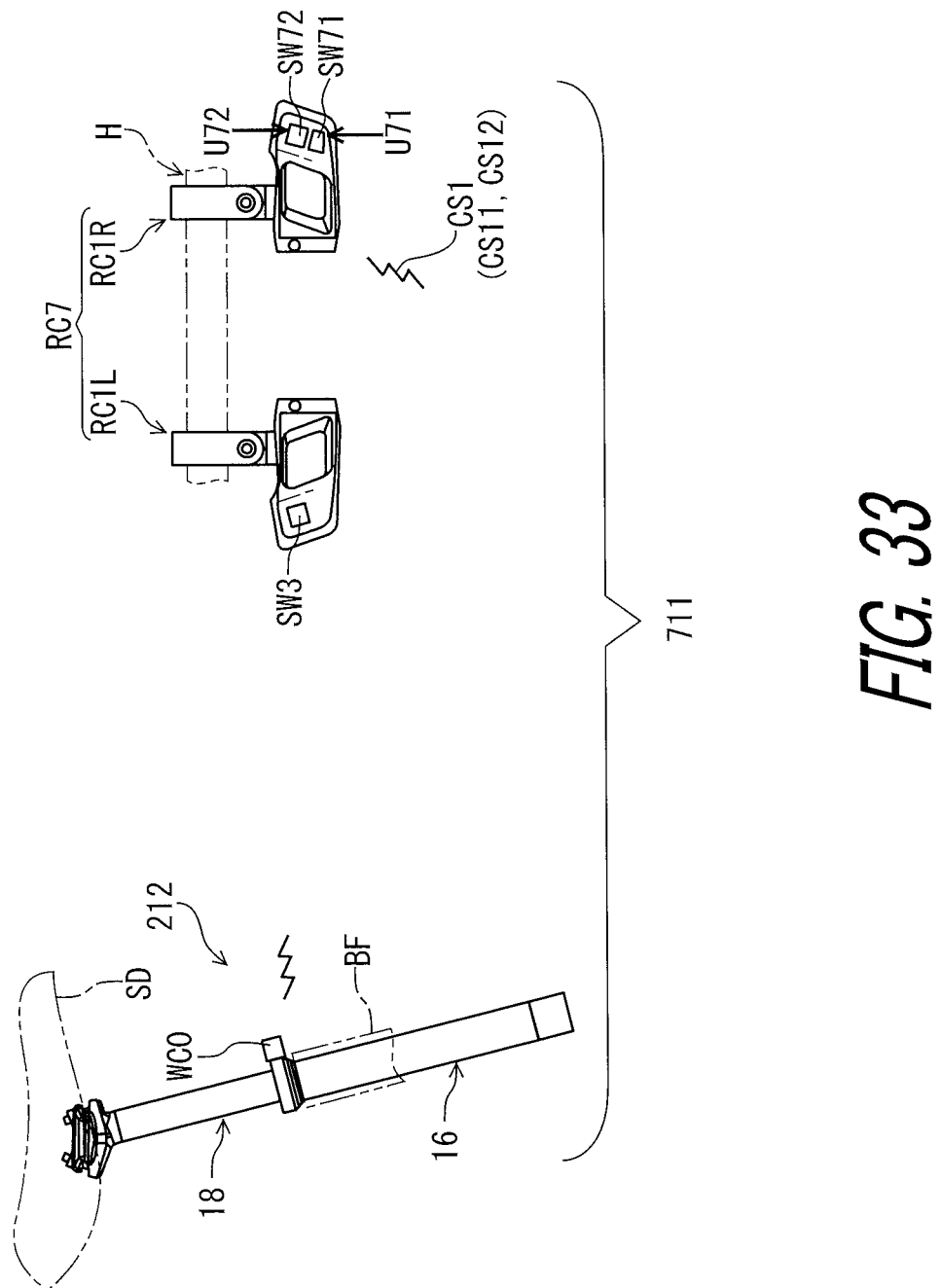
FIG. 33 is a schematic diagram of a bicycle seatpost system in accordance with a seventh embodiment.
Figure 34:
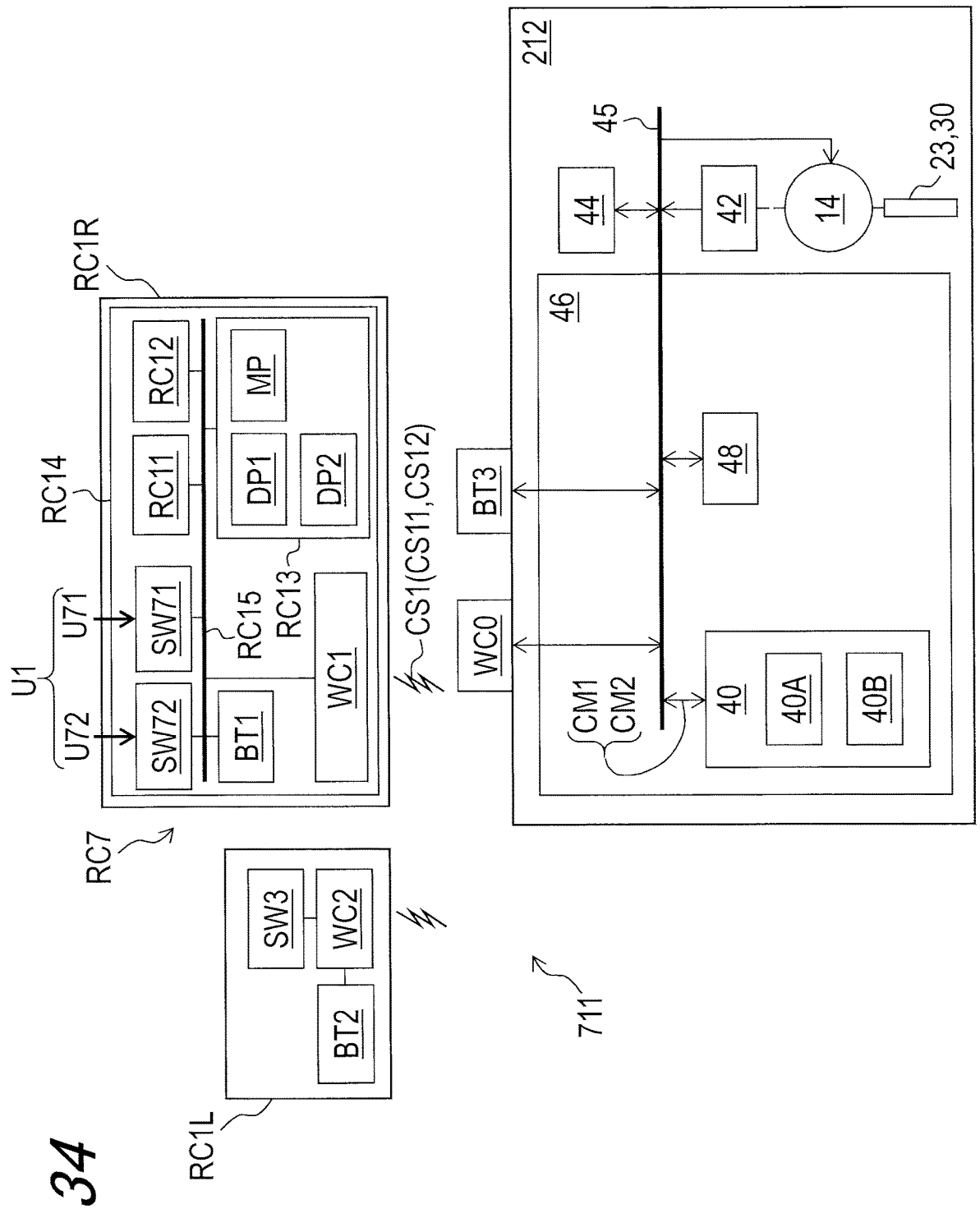
FIG. 34 is a block diagram of the bicycle seatpost system illustrated in FIG. 33.

As seen in FIGS. 33 and 34, the bicycle seatpost system 711 comprises the electric actuator 14, a remote controller RC7, and the seatpost controller 40. The remote controller RC7 is configured to transmit the first control signal CS11 and the second control signal CS12 different from the first control signal CS11. The bicycle seatpost system comprises a seatpost controller 40 configured to control the electric actuator 14 to change the state of the bicycle seatpost assembly 212 to the adjustable state based on one of the first control signal CS11 and the second control signal CS12.

The remote controller RC7 has substantially the same structure and/or configuration as that of the remote controller RC3 of the third embodiment. In this embodiment, the remote controller includes a first operating part SW71 and a second operating part SW72. The first operating part SW71 is configured to receive a first user input U71. The second operating part SW72 is configured to receive a second user input U72. The remote controller RC7 is configured to generate the first control signal CS11 in response to the first user input U71. The remote controller RC7 is configured to generate the second control signal CS12 in response to the second user input U72. Each of the first operating part SW71 and the second operating part SW72 includes an electric switch.

As seen in FIG. 33, in this embodiment, the first operating part SW71 and the second operating part SW72 are provided on the first operating device RC1R provided as a single unit. However, the first operating part SW71 and the second operating part SW72 can be respectively provided on the first operating device RC1R and the second operating device RC1L which are provided as separate units.

Figure 35:
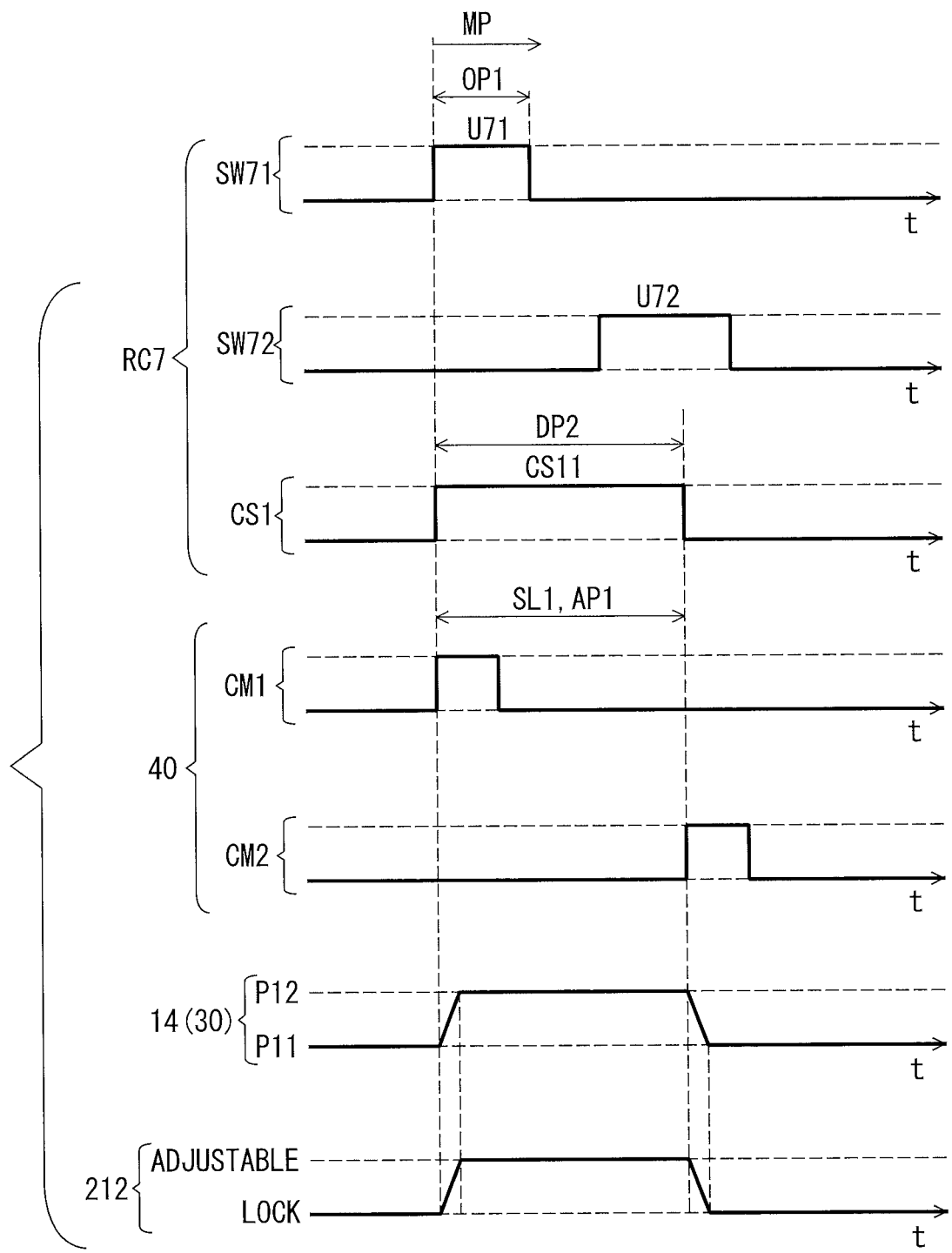
FIGS. 35 and 36 are timing charts of the bicycle seatpost system illustrated in FIG. 33.

As seen in FIG. 35, the seatpost controller 40 is configured to control the electric actuator 14 to maintain the adjustable state during the first adjustment period AP1 based on the first control signal CS11. In this embodiment, the first control signal CS11 has the constant signal length SL1 regardless of the operation period OP1 of the first user input U71.

Figure 36:
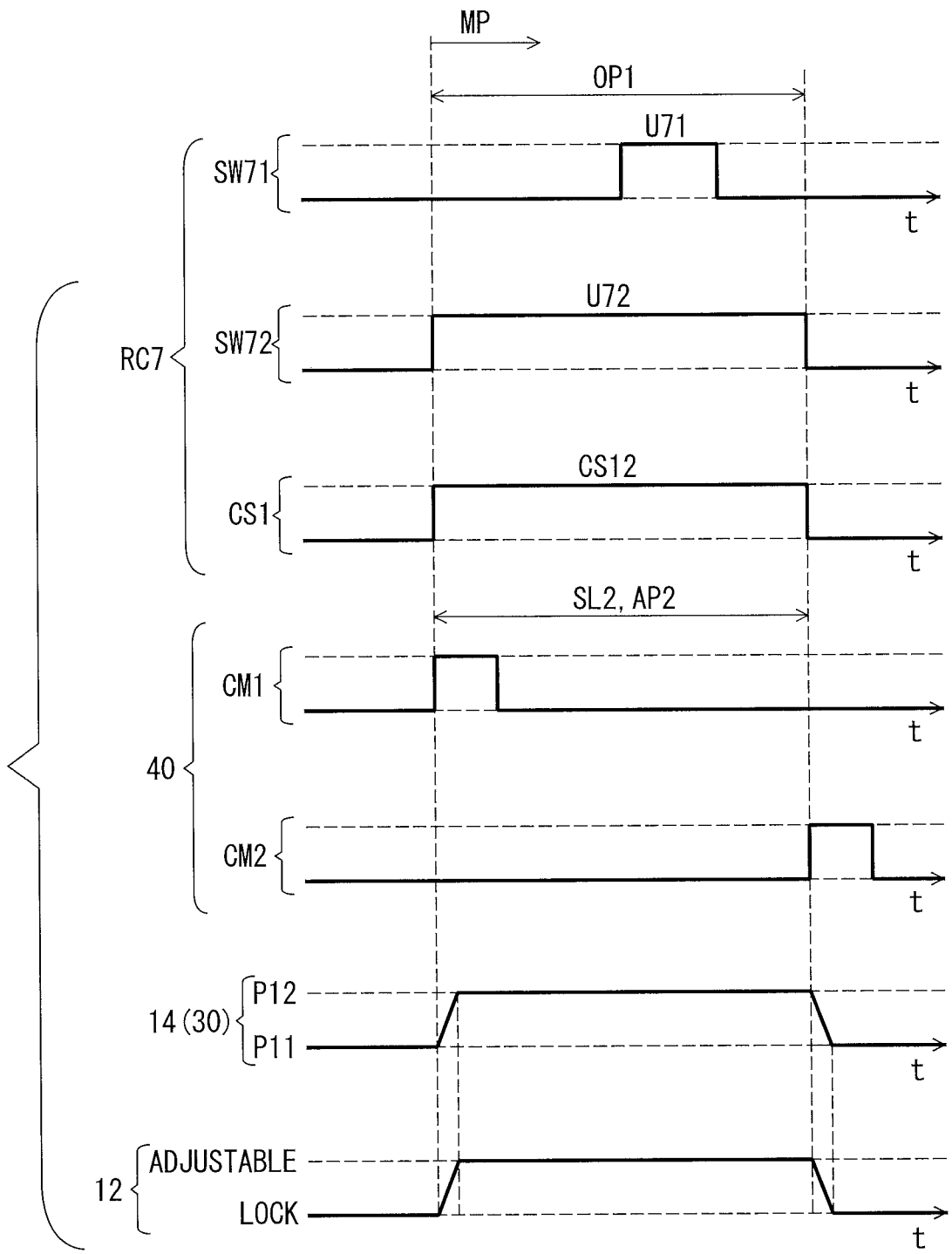

As seen in FIG. 36, the seatpost controller 40 is configured to control the electric actuator 14 to maintain the adjustable state during the second adjustment period AP2 based on the second control signal CS12. In this embodiment, the second control signal CS12 has the signal length SL2 corresponding to the operation period OP1.

Figure 37:
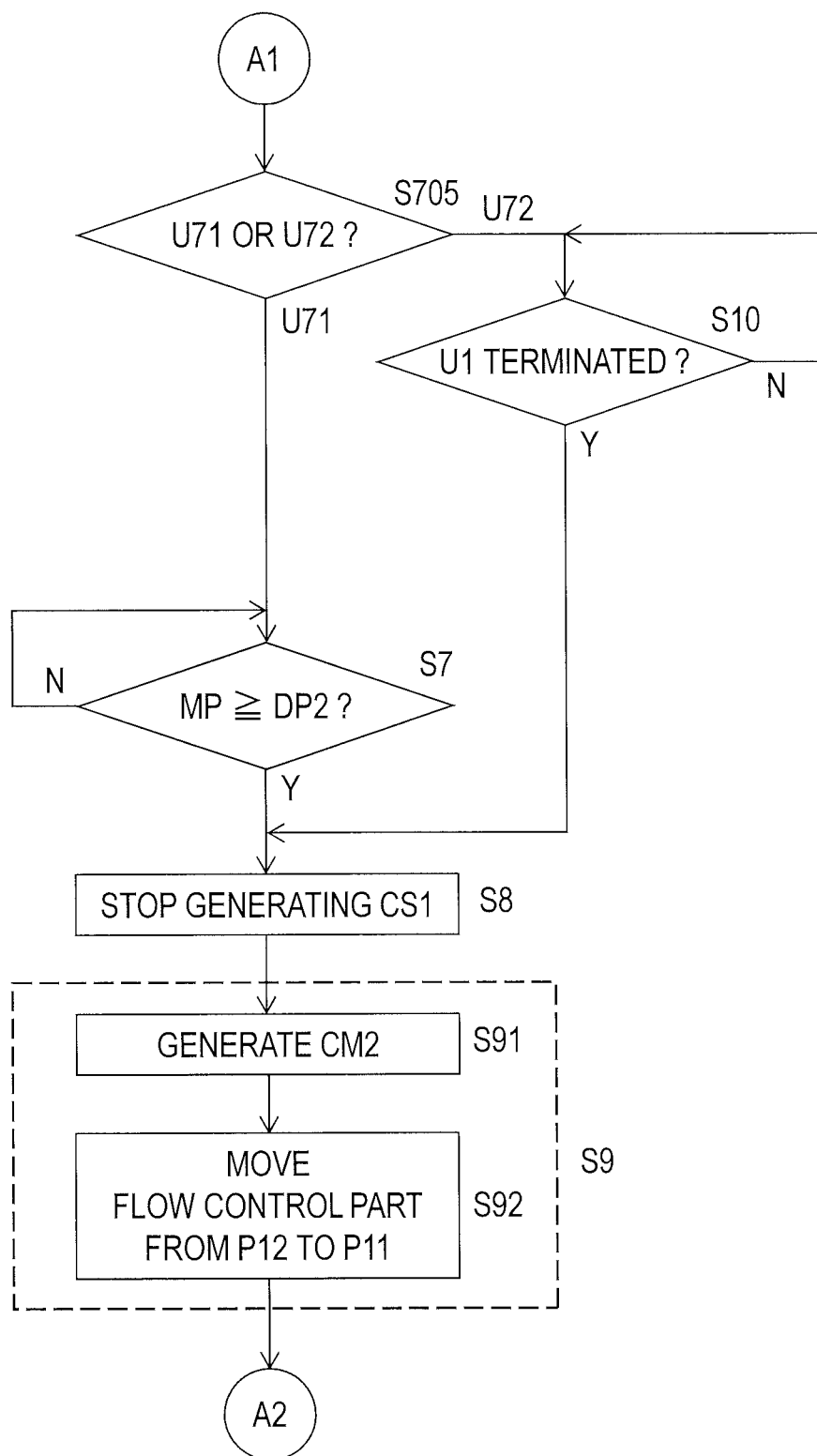
FIG. 37 is a flow chart of operation of the bicycle seatpost system illustrated in FIG. 33.

As seen in FIG. 37, in the flow chart of the seventh embodiment, the step S305 of FIG. 17 is replaced with step S705. In this embodiment, the remote controller RC7 compares the measured period MP with the additional determination period DP2 when the remote controller RC7 concludes that the first operating part SW71 is operated (steps S705 and S7). As seen in FIG. 35, the remote controller RC7 ignores the second user input U72 of the second operating part SW72 after the step S705. As seen in FIG. 37, the remote controller RC7 stops generating the seatpost control signal CS1 to provide the first control signal CS11 having the constant signal length SL1 (FIG. 35) when the remote controller RC7 concludes that the measured period MP is equal to or longer than the additional determination period DP2 (steps S7 and S8).

The remote controller RC7 determines termination of the second user input U72 when the remote controller RC7 concludes that the second operating part SW72 is operated (steps S705 and S10). As seen in FIG. 36, the remote controller RC7 ignores the first user input U71 of the first operating part SW71 after the step S705. As seen in FIG. 37, the remote controller RC7 stops generating the seatpost control signal CS1 to provide the second control signal CS12 having the variable signal length SL2 (FIG. 36) when the remote controller RC7 concludes that the measured period MP is equal to or longer than the additional determination period DP3 (steps S8 and S10).

The seatpost controller 40 controls the electric actuator 14 to return the state of the bicycle seatpost assembly 212 from the adjustable state to the lock state when the seatpost controller 40 detects termination of the seatpost control signal CS1 (one of the first control signal CS11 and the second control signal CS12) (step S9). Thus, the process returns to the step S1 of FIG. 6.

Eighth Embodiment

A bicycle seatpost system 811 in accordance with an eighth embodiment will be described below referring to FIGS. 38 to 42. The bicycle seatpost system 811 has the same structures and/or configurations as those of the bicycle seatpost system 711 except for the remote controller RC7. Thus, elements having substantially the same function as those in the above embodiments will be numbered the same here, and will not be described and/or illustrated again in detail here for the sake of brevity.

Figure 38:
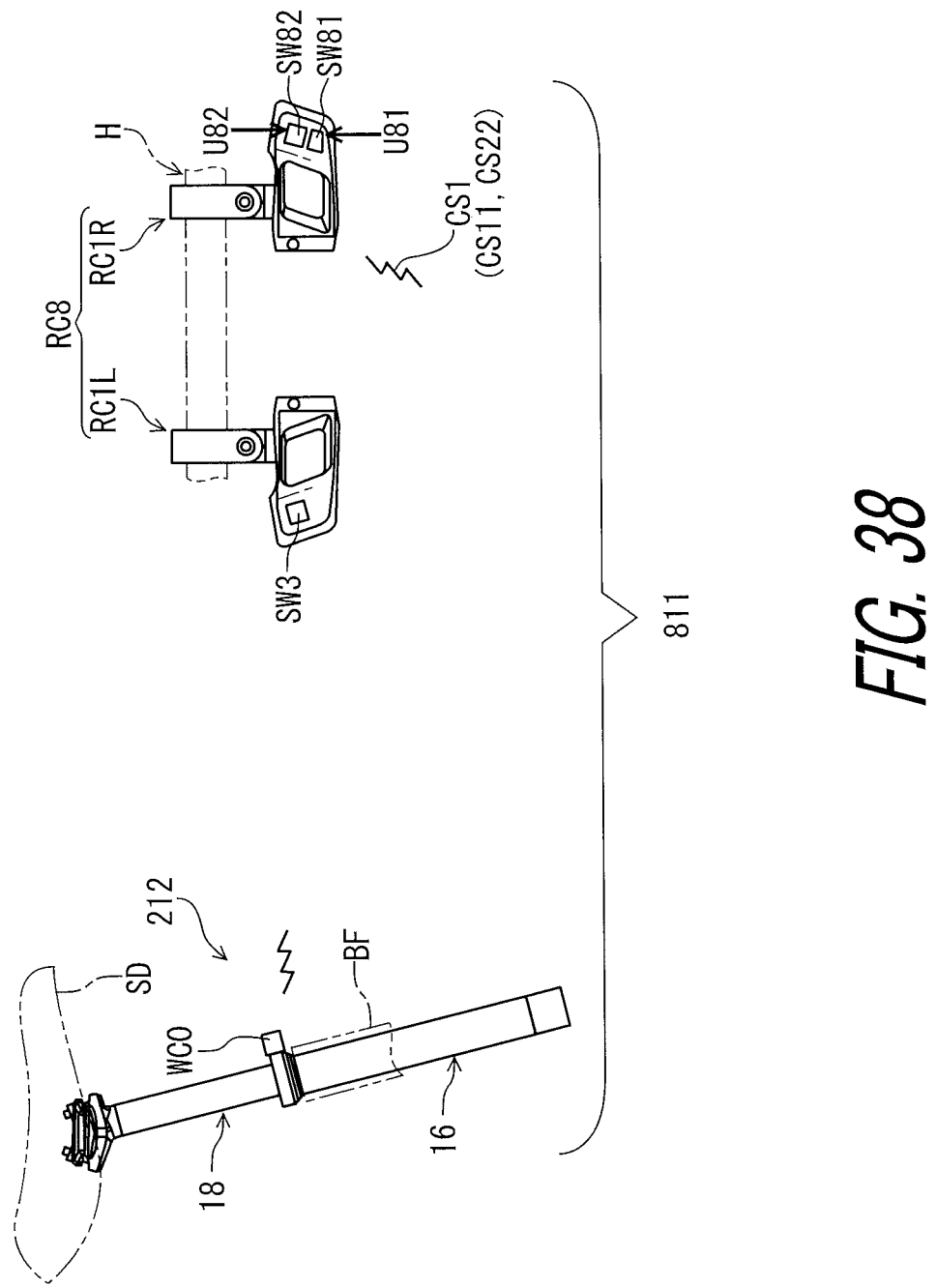
FIG. 38 is a schematic diagram of a bicycle seatpost system in accordance with an eighth embodiment.
Figure 39:
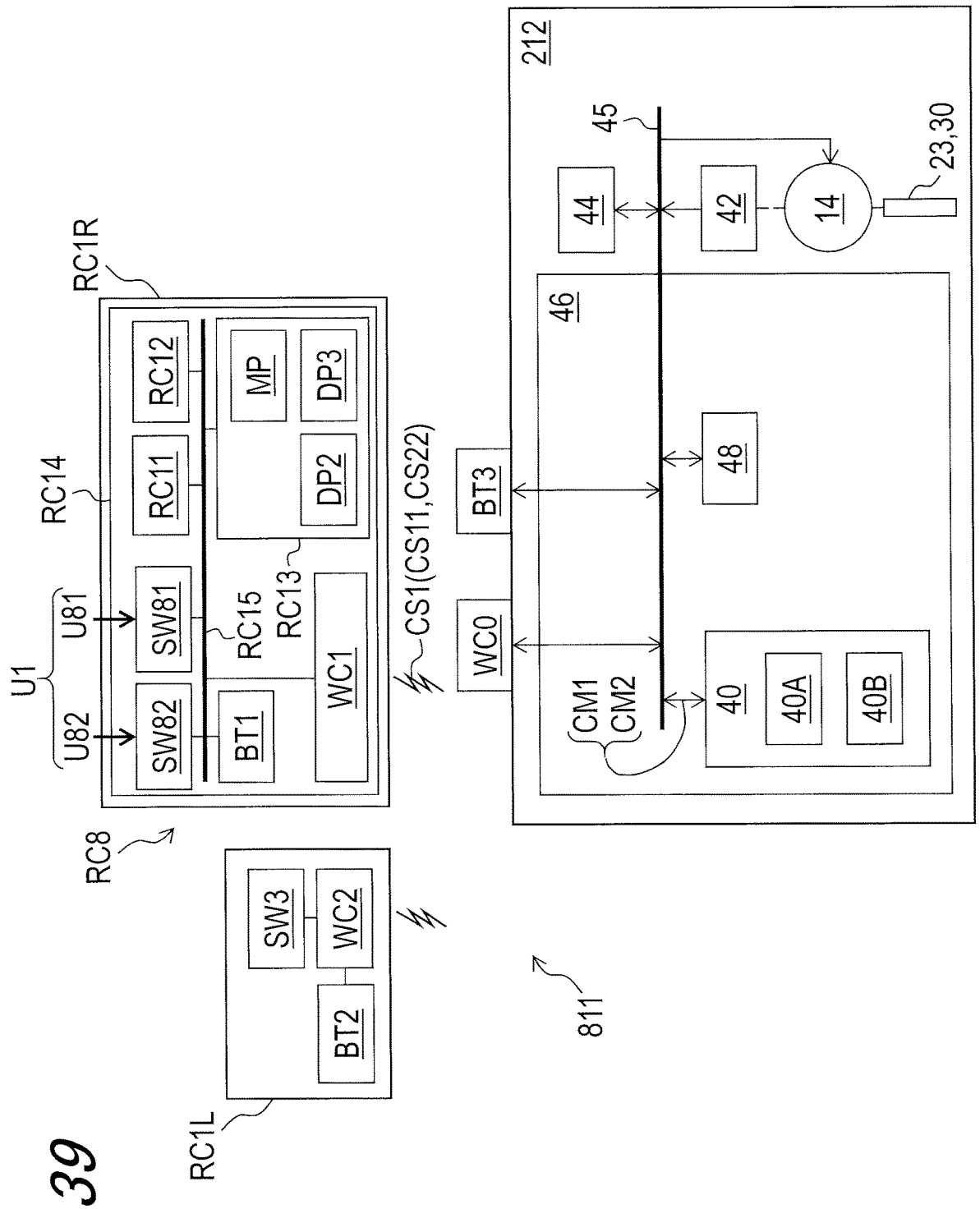
FIG. 39 is a block diagram of the bicycle seatpost system illustrated in FIG. 38.

As seen in FIGS. 38 and 39, the bicycle seatpost system 811 comprises the electric actuator 14, a remote controller RC8, and the seatpost controller 40. The remote controller is configured to transmit the first control signal CS11 and the second control signal CS22 different from the first control signal CS11. The seatpost controller 40 is configured to control the electric actuator 14 to change the state of the bicycle seatpost assembly to the adjustable state based on one of the first control signal CS11 and the second control signal CS22.

The remote controller RC8 has substantially the same structure and/or configuration as that of the remote controller RC7 of the seventh embodiment. In this embodiment, the remote controller RC8 includes a first operating part SW81 and a second operating part SW82. The first operating part SW81 is configured to receive a first user input U81. The second operating part SW82 is configured to receive a second user input U82. The remote controller RC8 is configured to generate the first control signal CS11 in response to the first user input U81. The remote controller RC8 is configured to generate the second control signal CS22 in response to the second user input U82. Each of the first operating part SW81 and the second operating part SW82 includes an electric switch.

As seen in FIG. 38, in this embodiment, the first operating part SW81 and the second operating part SW82 are provided on the first operating device RC1R provided as a single unit. However, the first operating part SW81 and the second operating part SW82 can be respectively provided on the first operating device RC1R and the second operating device RC1L which are provided as separate units.

Figure 40:
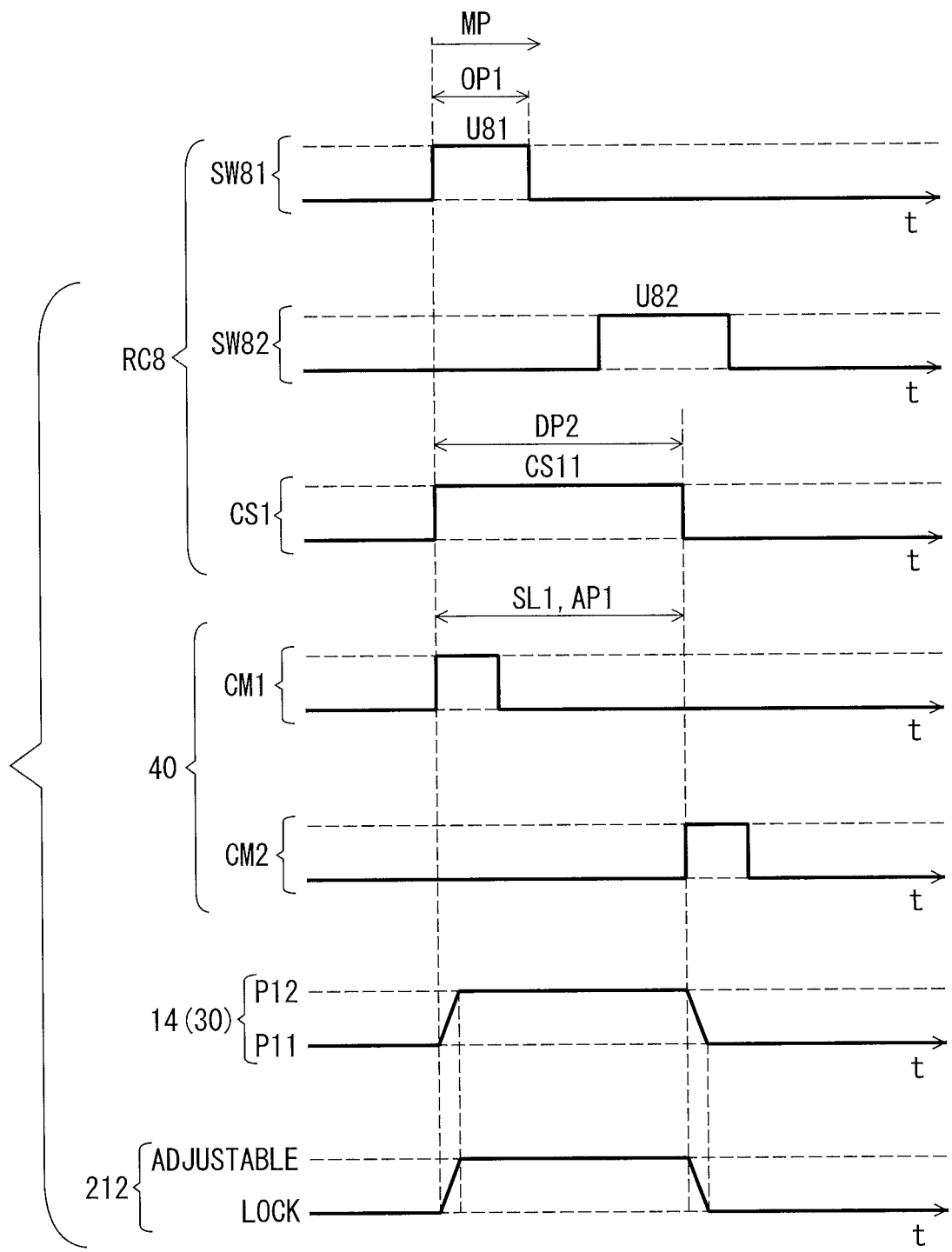
FIGS. 40 and 41 are timing charts of the bicycle seatpost system illustrated in FIG. 38.
Figure 41:
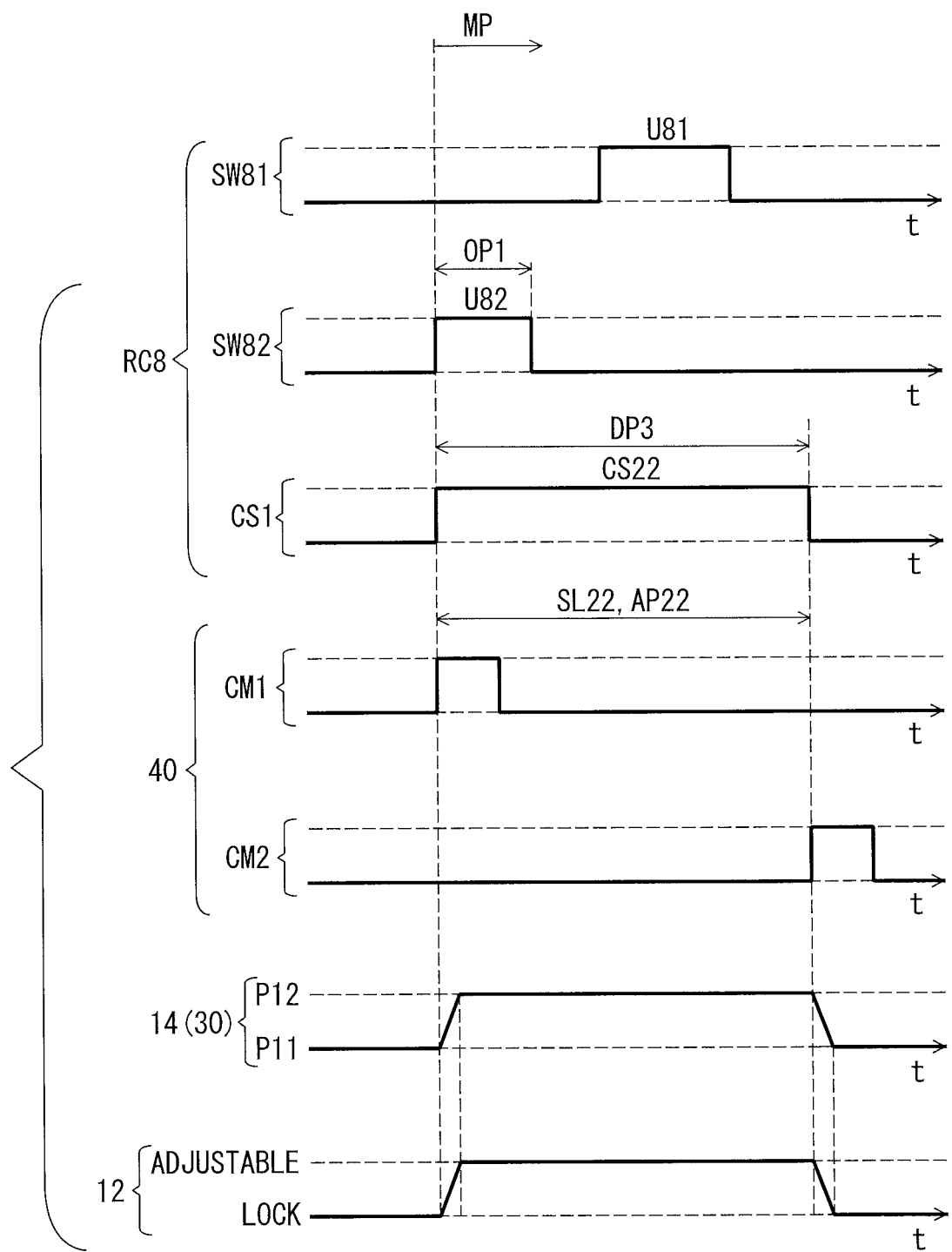

As seen in FIG. 40, the seatpost controller 40 is configured to control the electric actuator 14 to maintain the adjustable state during the first adjustment period AP1 based on the first control signal CS11. As seen in FIG. 41, the seatpost controller 40 is configured to control the electric actuator 14 to maintain the adjustable state during the second adjustment period AP22 that is longer than the first adjustment period AP1 based on the second control signal CS22. The second adjustment period AP22 is a constant period corresponding to the constant signal length SL22 of the second control signal CS22 regardless of the operation period OP1.

Figure 42:
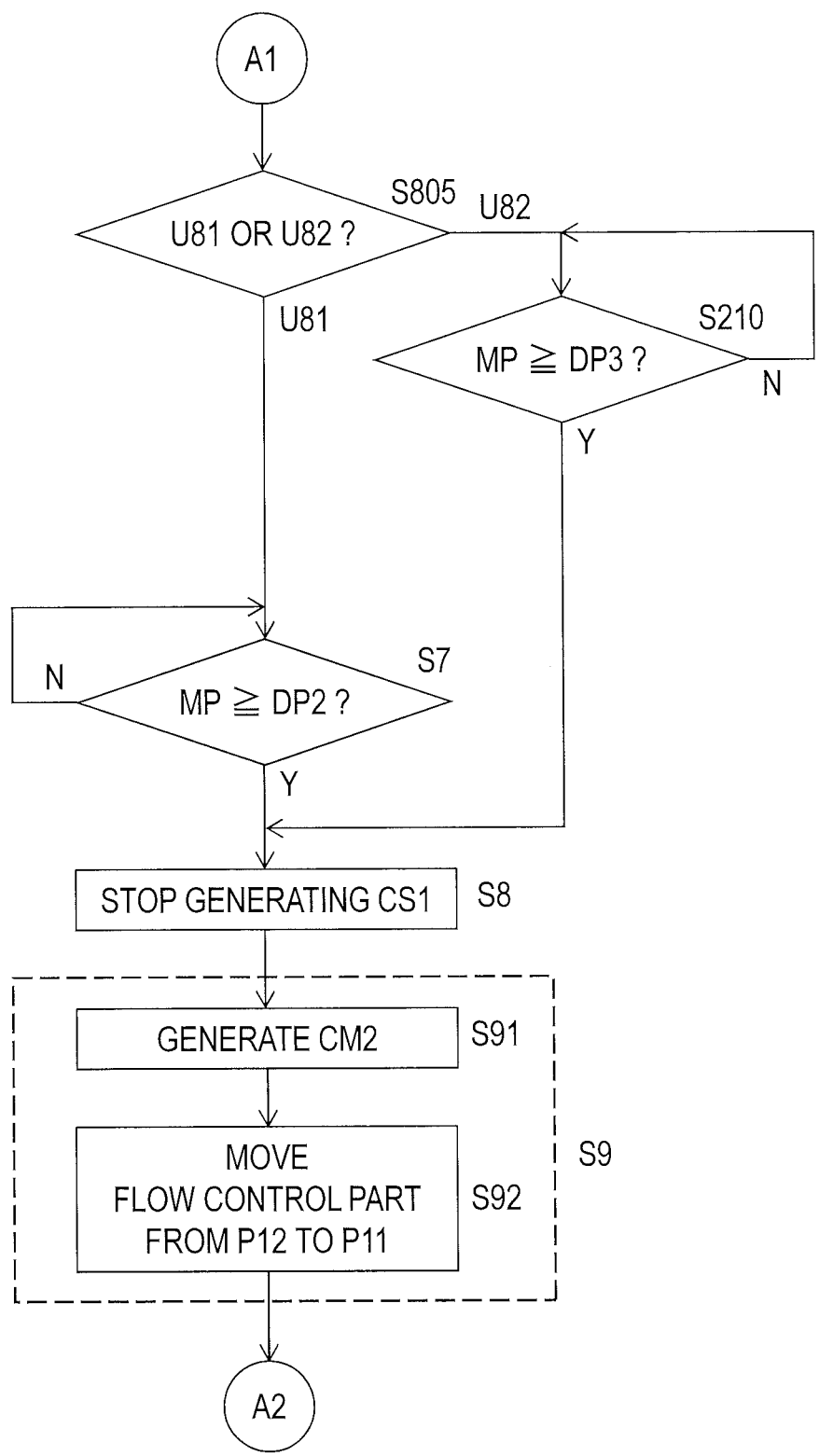
FIG. 42 is a flow chart of operation of the bicycle seatpost system illustrated in FIG. 38.

As seen in FIG. 42, in the flow chart of the eighth embodiment, the step S305 of FIG. 22 is replaced with step S805. In this embodiment, the remote controller RC8 compares the measured period MP with the additional determination period DP2 when the remote controller RC8 concludes that the first operating part SW81 is operated (steps S805 and S7). The remote controller RC8 stops generating the seatpost control signal CS1 to provide the first control signal CS11 having the constant signal length SL1 (FIG. 40) when the remote controller RC8 concludes that the measured period MP is equal to or longer than the additional determination period DP2 (steps S7 and S8).

The remote controller RC8 determines termination of the second seatpost input U82 when the remote controller RC8 concludes that the second operating part SW82 is operated (steps S805 and S210). The remote controller RC8 stops generating the seatpost control signal CS1 to provide the second control signal CS22 having the constant signal length SL22 (FIG. 41) when the remote controller RC8 concludes that the measured period MP is equal to or longer than the additional determination period DP3 (steps S8 and S210).

The seatpost controller 40 controls the electric actuator 14 to return the state of the bicycle seatpost assembly 212 from the adjustable state to the lock state when the seatpost controller 40 detects termination of the seatpost control signal CS1 (one of the first control signal CS11 and the second control signal CS22) (step S9). Thus, the process returns to the step S1 of FIG. 6.

Ninth Embodiment

A bicycle seatpost system 911 in accordance with a ninth embodiment will be described below referring to FIGS. 43 to 47. The bicycle seatpost system 911 has the same structures and/or configurations as those of the bicycle seatpost system 211 except for the remote controller RC2. Thus, elements having substantially the same function as those in the above embodiments will be numbered the same here, and will not be described and/or illustrated again in detail here for the sake of brevity.

Figure 43:
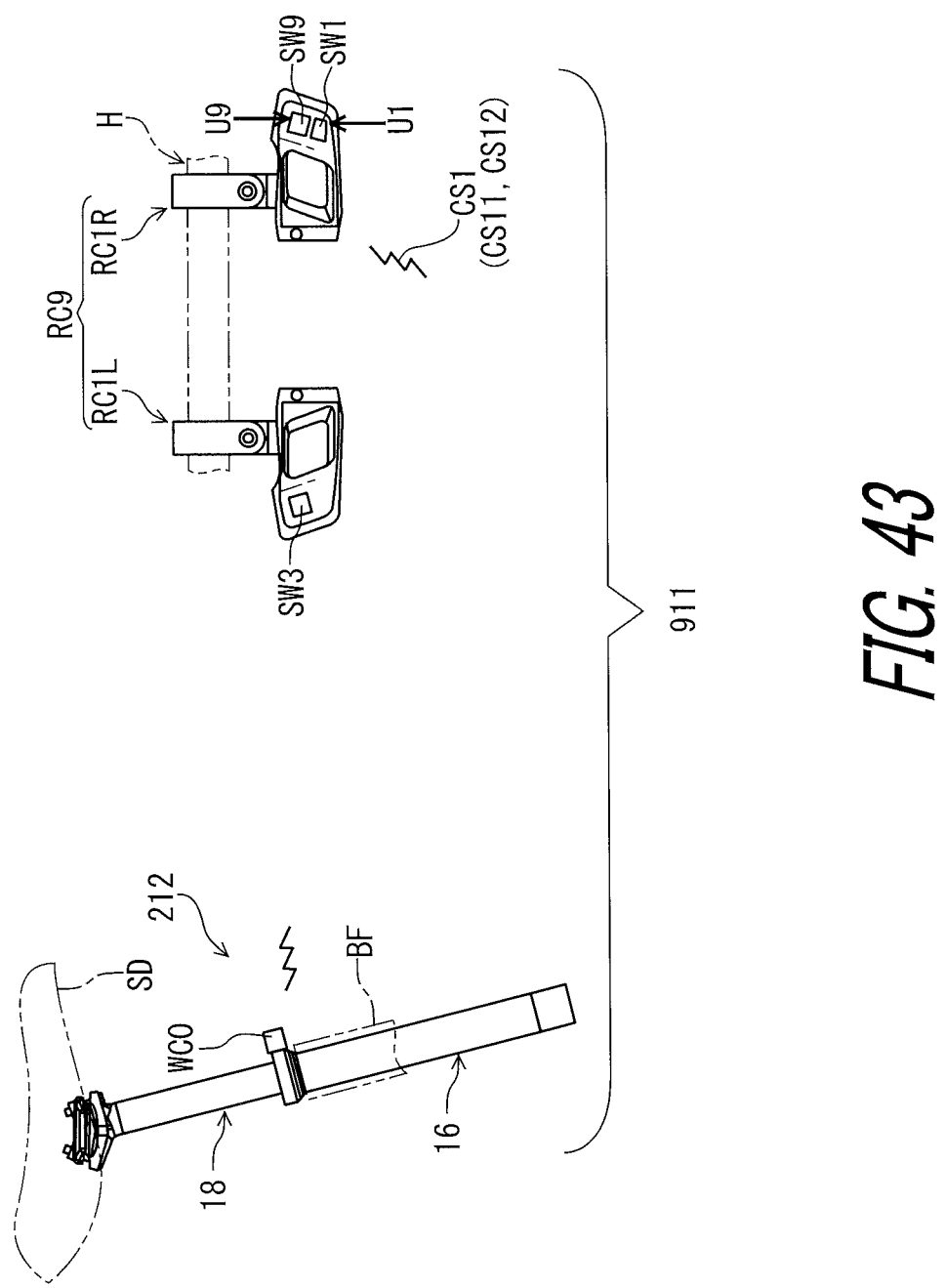
FIG. 43 is a schematic diagram of a bicycle seatpost system in accordance with a ninth embodiment.
Figure 44:
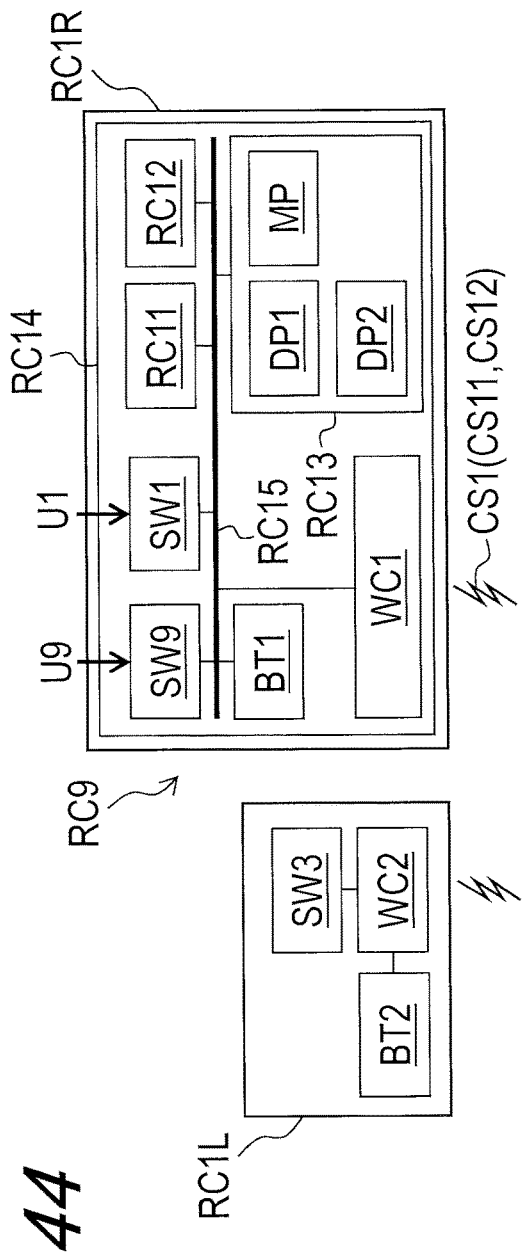
FIG. 44 is a block diagram of the bicycle seatpost system illustrated in FIG. 43.
Figure 44:
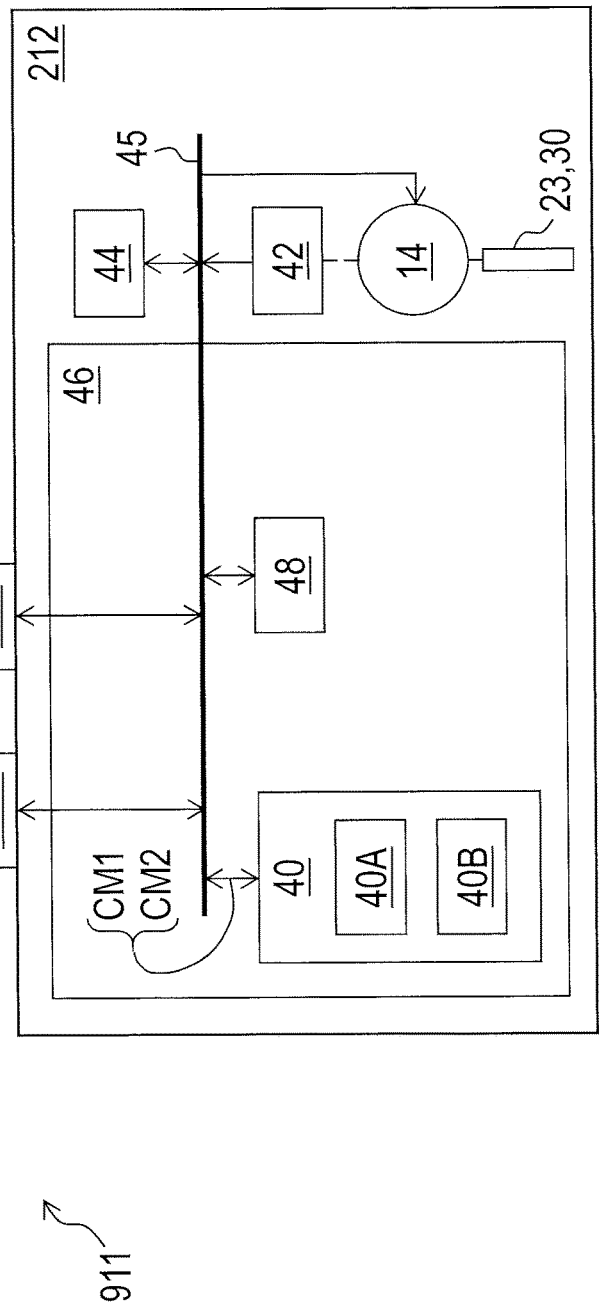

As seen in FIGS. 43 and 44, the bicycle seatpost system 911 comprises the electric actuator 14, a remote controller RC9, and the seatpost controller 40. The remote controller RC9 is configured to transmit the first control signal CS11 and the second control signal CS12 different from the first control signal CS11. The seatpost controller 40 is configured to control the electric actuator 14 to change the state of the bicycle seatpost assembly 212 to the adjustable state based on one of the first control signal CS11 and the second control signal CS12.

Figure 45:
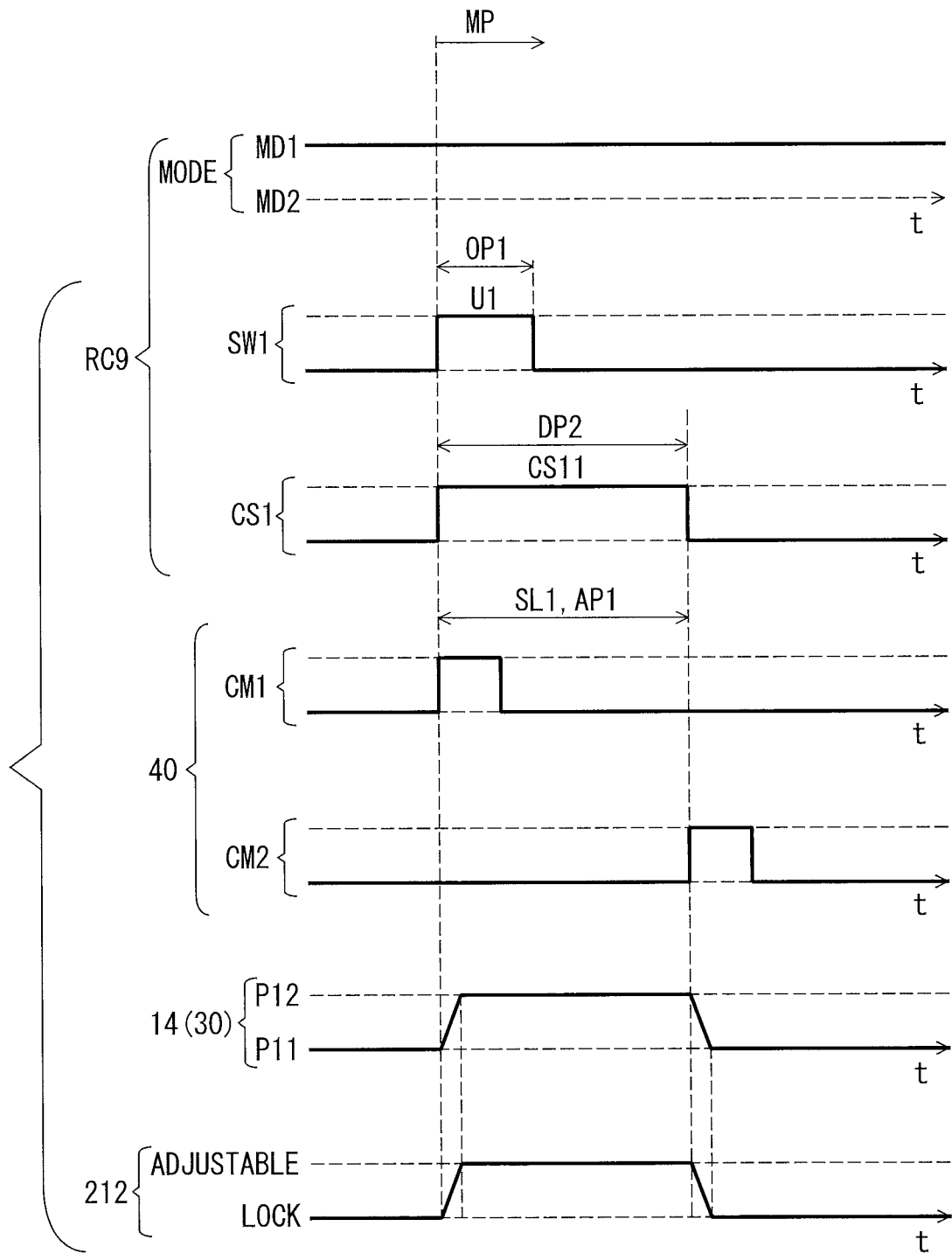
FIGS. 45 and 46 are timing charts of the bicycle seatpost system illustrated in FIG. 43.
Figure 46:
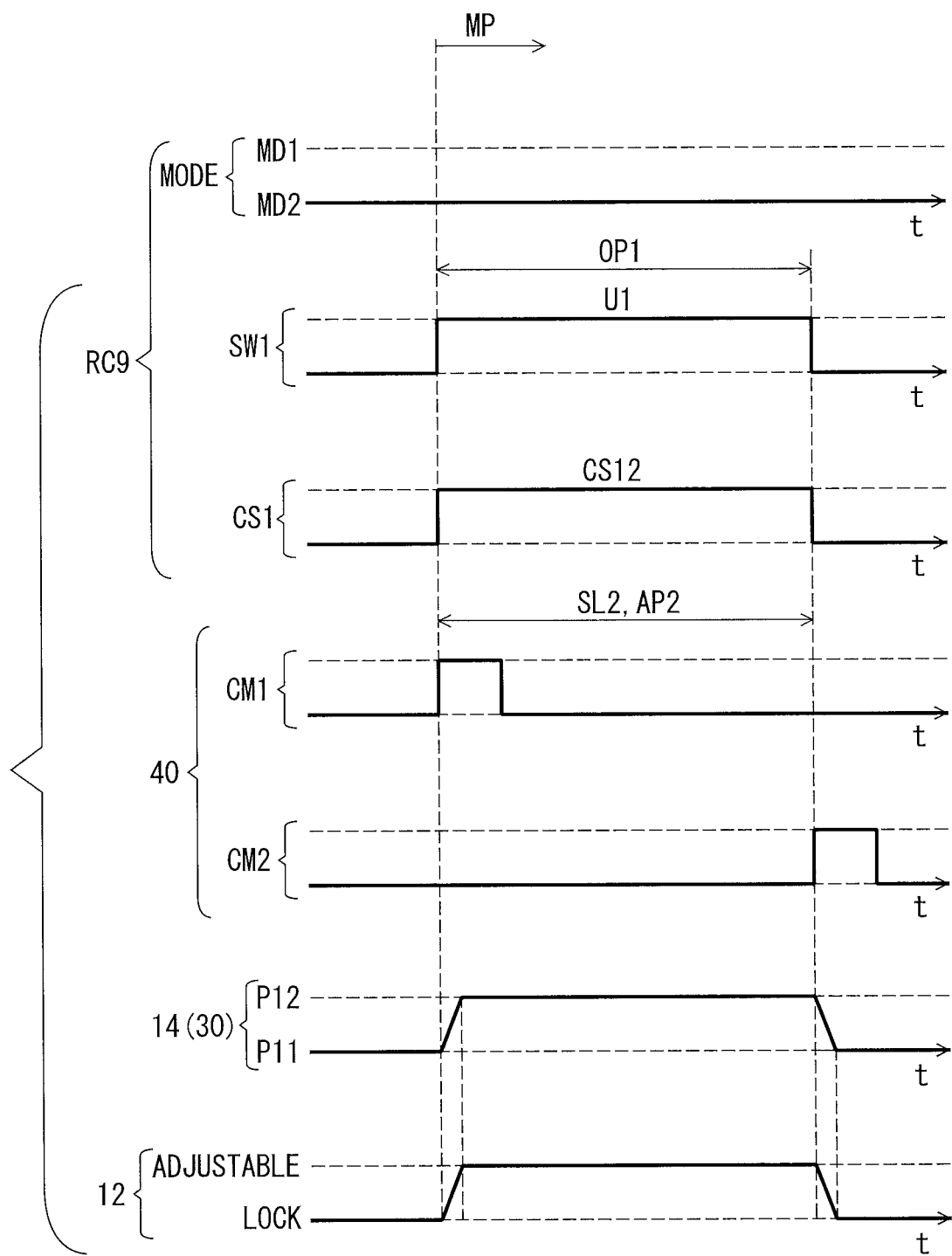

The remote controller RC9 has substantially the same structure and/or configuration as that of the remote controller RC2 of the second embodiment. The remote controller RC9 includes the first operating part SW1 configured to receive the first user input U1 having the operation period OP1. As seen in FIG. 45, the first control signal CS11 has the constant signal length SL1 regardless of the operation period OP1 of the first user input U1. As seen in FIG. 46, the second control signal CS12 has the signal length SL2 corresponding to the operation period OP of the first user input U1.

As seen in FIGS. 45 and 46, in this embodiment, the remote controller RC9 has a first mode MD1 (FIG. 45) in which the first control signal CS11 is transmitted and a second mode MD2 (FIG. 46) in which the second control signal CS12 is transmitted. As seen in FIG. 45, in the first mode, the remote controller RC9 is configured to transmit the first control signal CS11 without transmitting the second control signal CS12. As seen in FIG. 46, in the second mode, the remote controller RC9 is configured to transmit the second control signal CS12 without transmitting the first control signal CS11.

As seen in FIGS. 43 and 44, the remote controller RC9 is configured to change a mode of the remote controller RC9 between the first mode MD1 and the second mode MD2. The remote controller RC9 includes a mode switch SW9 to receive a mode user input U9. The remote controller RC9 is configured to change the mode of the remote controller RC9 between the first mode MD1 and the second mode MD2 based on the mode user input U9. In this embodiment, the mode switch SW9 includes an electric switch. The remote controller RC9 changes the mode of the remote controller RC9 from the second mode MD2 to the first mode MD1 in response to the mode user input U9 in the first mode MD1. The remote controller RC9 changes the mode of the remote controller RC9 from the first mode MD1 to the second mode MD2 in response to the mode user input U9 in the second mode MD2. However, the mode switch SW9 is not limited to this embodiment. The mode switch SW9 is a separate unit from the first operating part SW. However, the mode switch SW9 can be integrally provided with the first operating part SW1 as a single unit.

As seen in FIG. 45, the remote controller RC9 is configured to generate the first control signal CS11 to maintain the adjustable state during the first adjustment period AP1 regardless of the operation period OP1 of the first user input U1 in the first mode MD1. The first adjustment period AP1 is constant and predetermined period. However, it is possible to change or select the first adjustment period AP1 among a plurality of adjustment periods using user setting mode via the remote controller RC9 or an external device (described in the other embodiment). The seatpost controller 40 is configured to control the electric actuator 14 to maintain the adjustable state during the first adjustment period AP1 based on the first control signal CS11.

As seen in FIG. 46, the remote controller RC9 is configured to generate the second control signal CS12 to maintain the adjustable state during the second adjustment period AP2 corresponding to the operation period OP1 of the first user input U1 in the second mode MD2. For example, the second adjustment period AP2 is proportional to the operation period OP. The seatpost controller 40 is configured to control the electric actuator 14 to maintain the adjustment state during the second adjustment period AP2 based on the second control signal C12.

Figure 47:
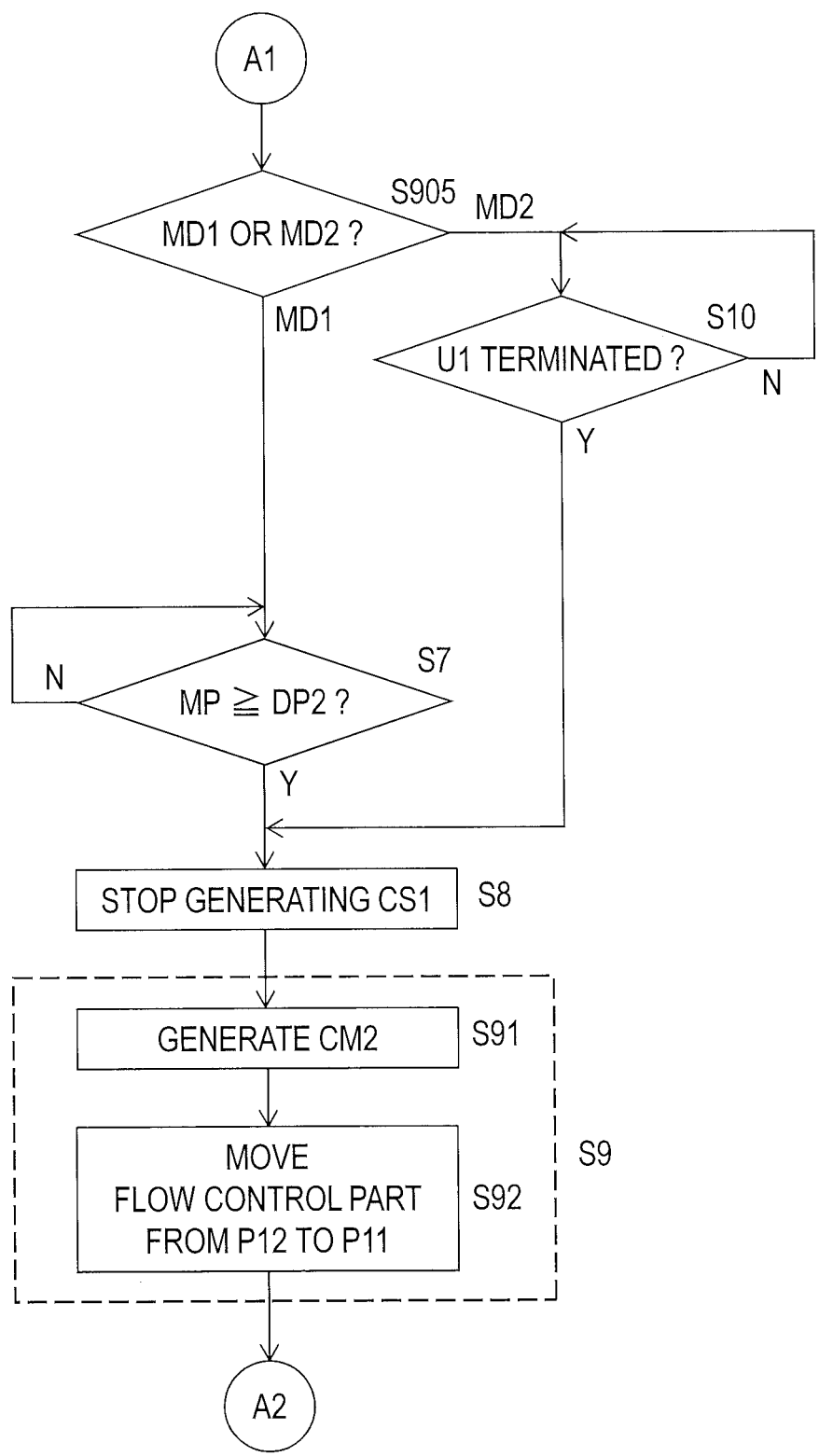
FIG. 47 is a flow chart of operation of the bicycle seatpost system illustrated in FIG. 43.

As seen in FIG. 47, in the flow chart of the ninth embodiment, the step S305 of FIG. 17 is replaced with step S905. In this embodiment, the remote controller RC9 determines whether the mode of the remote controller RC9 is the first mode MD1 or the second mode MD2 after the step S4 of FIG. 6 (step S905).

The remote controller RC9 compares the measured period MP with the additional determination period DP2 when the remote controller RC9 concludes that the mode of the remote controller RC9 is the first mode MD1 (steps S905 and S7). The remote controller RC9 stops generating the seatpost control signal CS1 to provide the first control signal CS11 having the constant signal length SL1 (FIG. 45) when the remote controller RC9 concludes that the measured period MP is equal to or longer than the additional determination period DP2 (steps S7 and S8).

The remote controller RC9 determines whether the first user input U1 is terminated when the remote controller RC9 concludes that the mode of the remote controller RC9 is the second mode MD2 (steps S905 and S10). The remote controller RC9 stops generating the seatpost control signal CS1 to provide the second control signal CS12 having the variable signal length SL2 (FIG. 46) when the remote controller RC9 detects the termination of the first user input U1 (steps S8 and S10).

The seatpost controller 40 controls the electric actuator 14 to return the state of the bicycle seatpost assembly 212 from the adjustable state to the lock state when the seatpost controller 40 detects termination of the seatpost control signal CS1 (one of the first control signal CS11 and the second control signal CS12) (step S9). Thus, the process returns to the step S1 of FIG. 6.

Tenth Embodiment

A bicycle seatpost system 1011 in accordance with a tenth embodiment will be described below referring to FIGS. 48 to 52. The bicycle seatpost system 1011 has the same structures and/or configurations as those of the bicycle seatpost system 911 except for the remote controller RC9. Thus, elements having substantially the same function as those in the above embodiments will be numbered the same here, and will not be described and/or illustrated again in detail here for the sake of brevity.

Figure 48:
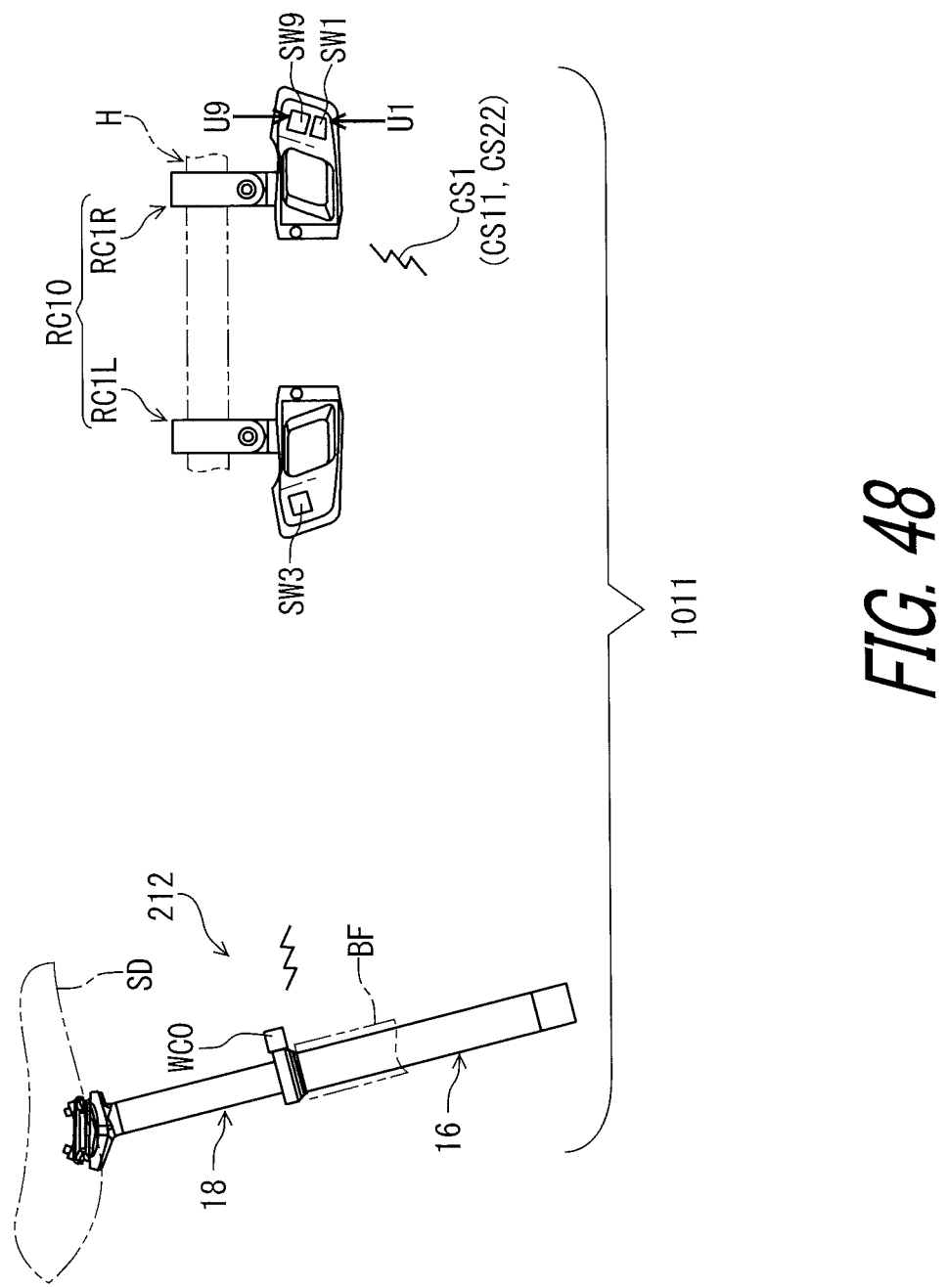
FIG. 48 is a schematic diagram of a bicycle seatpost system in accordance with a tenth embodiment.
Figure 49:
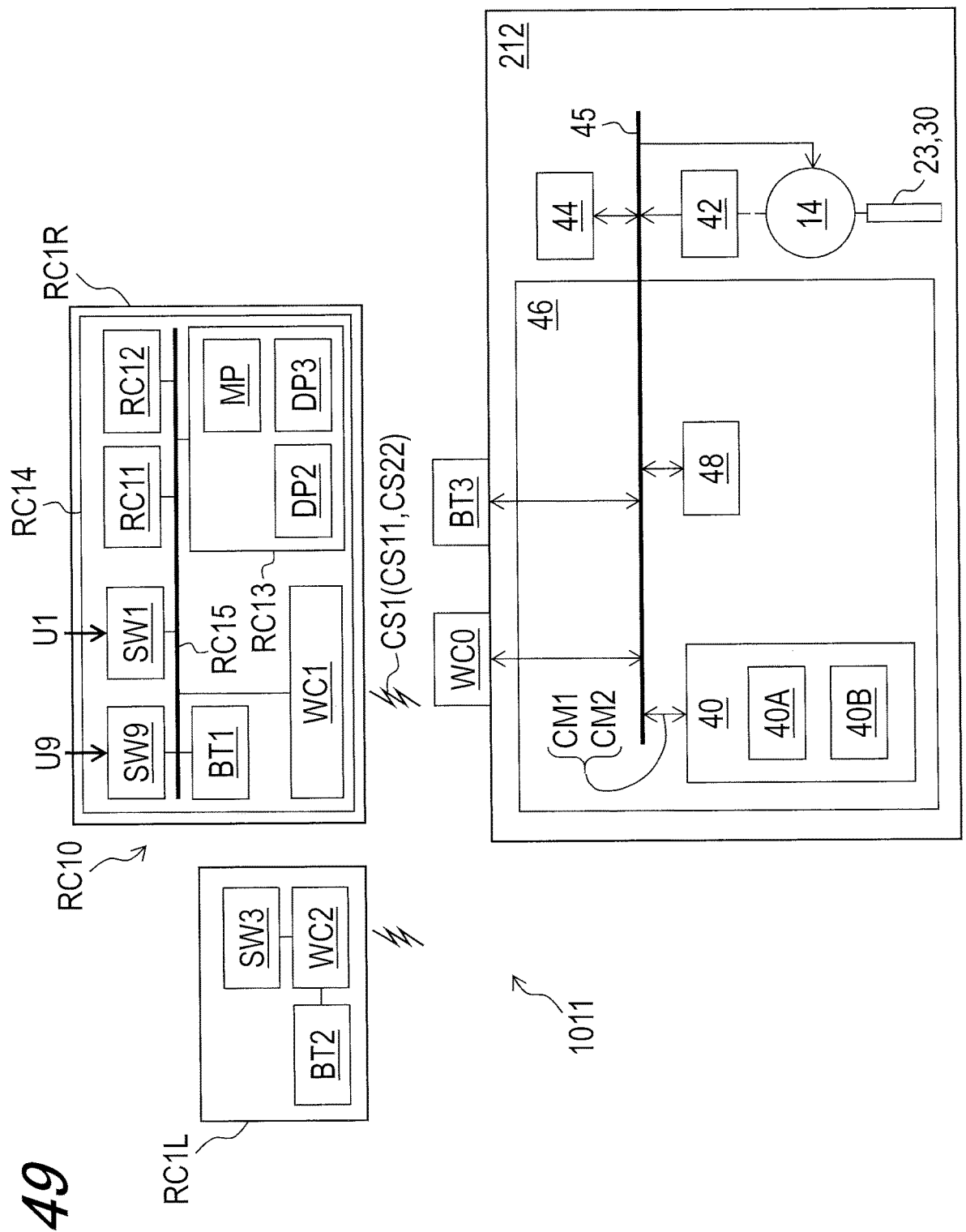
FIG. 49 is a block diagram of the bicycle seatpost system illustrated in FIG. 48.

As seen in FIGS. 48 and 49, the bicycle seatpost system 1011 comprises the electric actuator 14, a remote controller RC10, and the seatpost controller 40. The remote controller RC10 is configured to transmit the first control signal CS11 and the second control signal CS22 different from the first control signal CS11. The seatpost controller 40 is configured to control the electric actuator 14 to change the state of the bicycle seatpost assembly 212 to the adjustable state based on one of the first control signal CS11 and the second control signal CS22.

Figure 50:
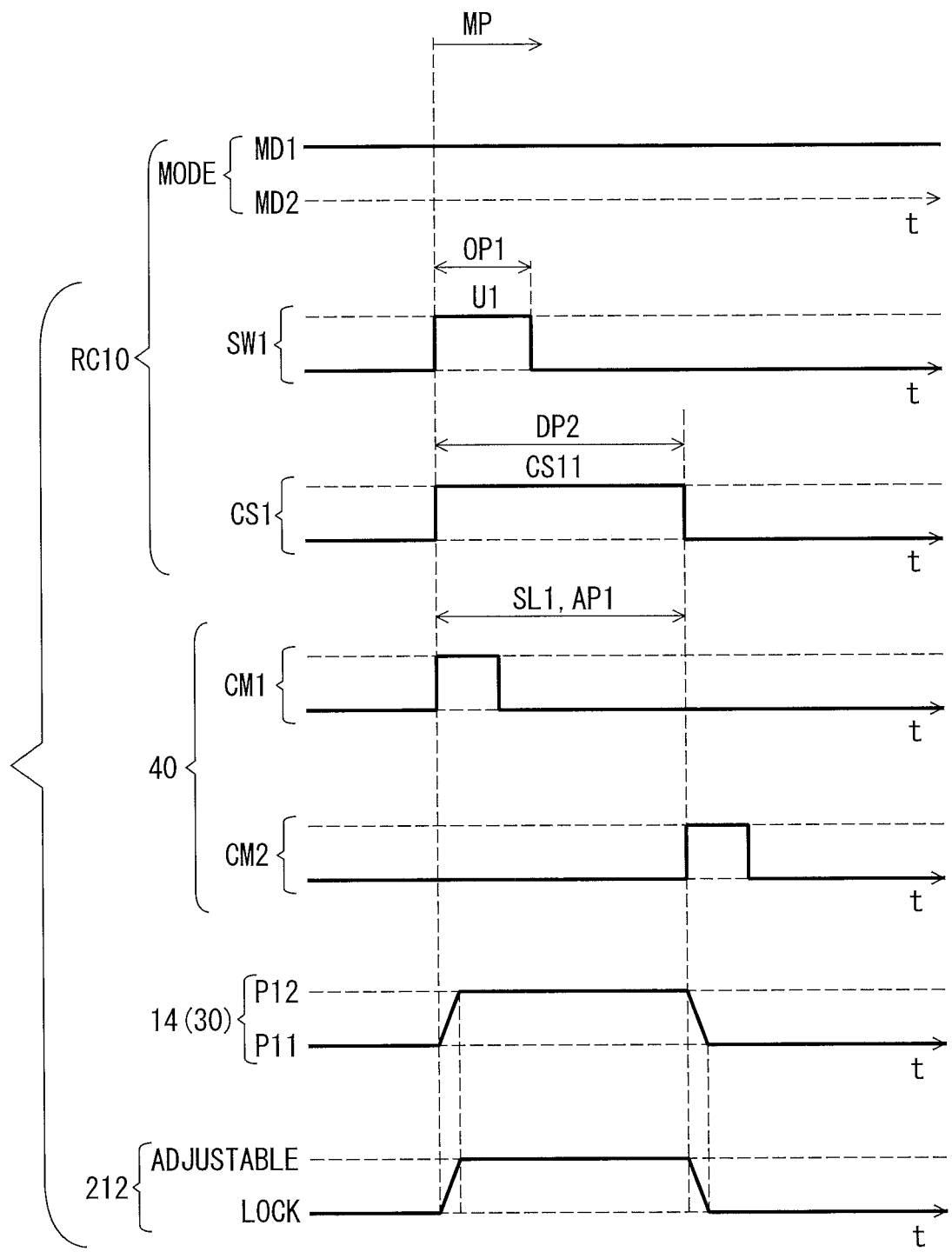
FIGS. 50 and 51 are timing charts of the bicycle seatpost system illustrated in FIG. 48.
Figure 51:
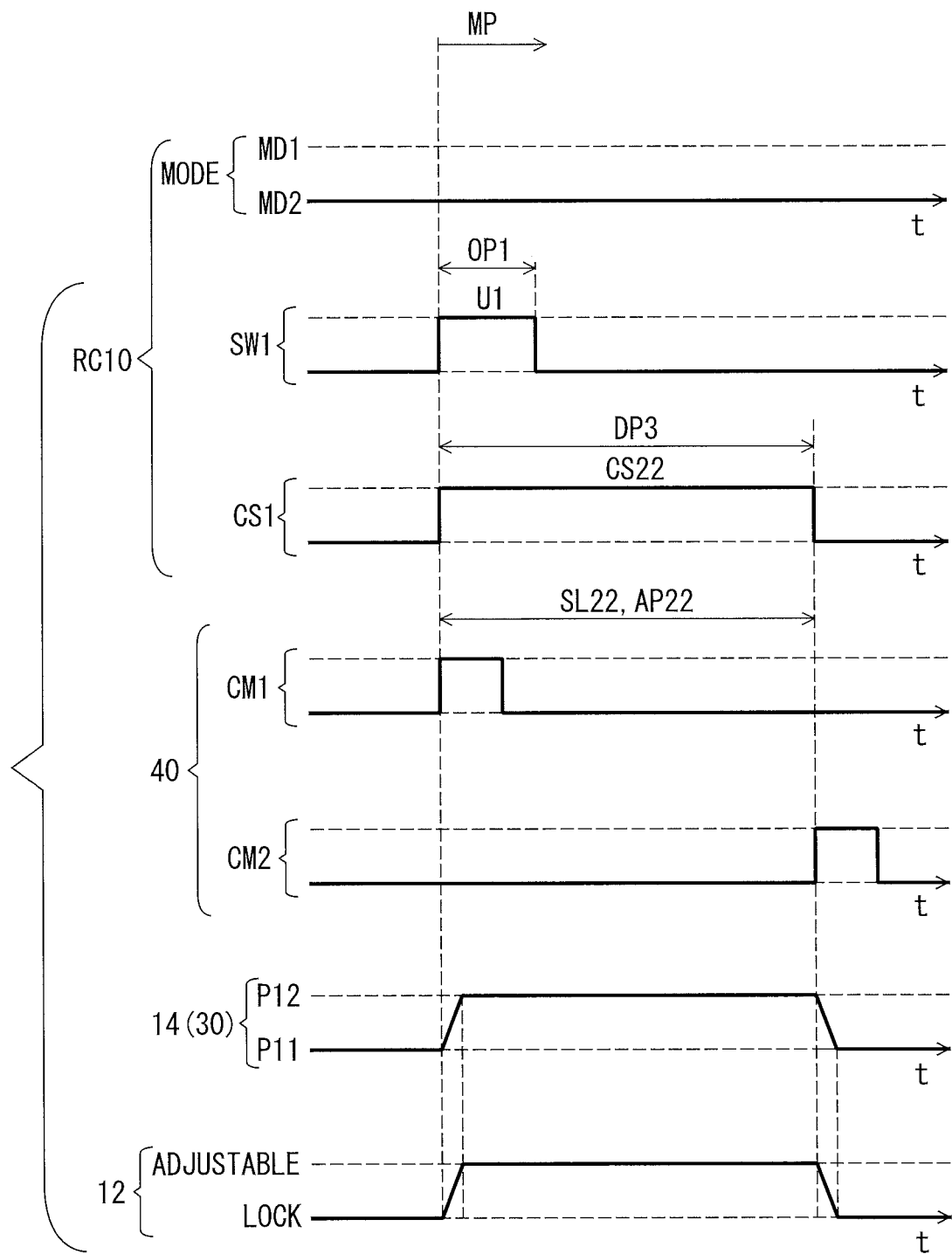
Figure 52:
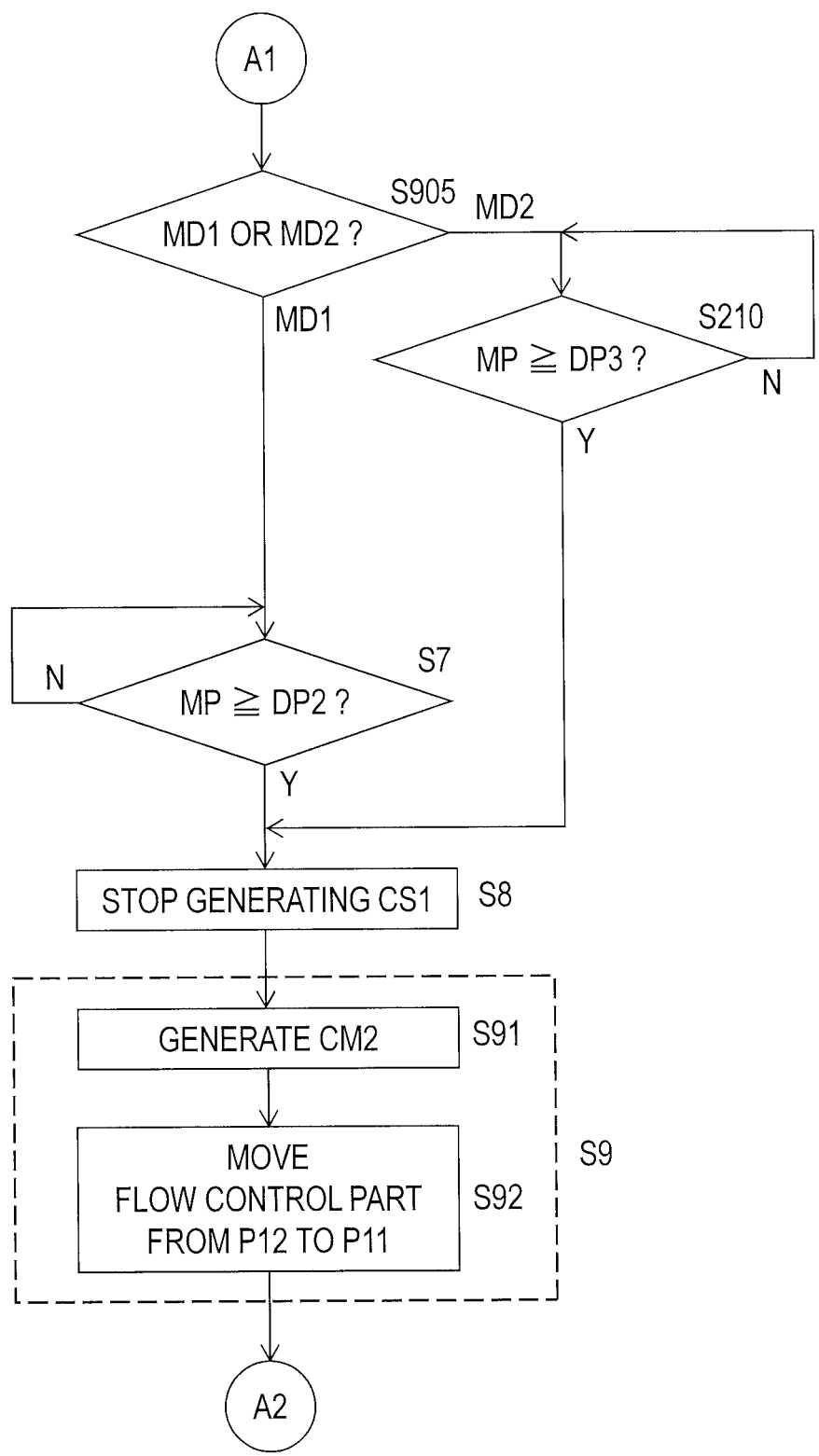
FIG. 52 is a flow chart of operation of the bicycle seatpost system illustrated in FIG. 48.

The remote controller RC10 has substantially the same structure and/or configuration as that of the remote controller RC9 of the ninth embodiment. In this embodiment, the remote controller RC10 includes the first operating part SW1 to receive the first user input U1 having the operation period OP1. As seen in FIG. 50, the first control signal CS11 has the constant signal length SL1 regardless of the operation period OP1 of the first user input U1. As seen in FIG. 51, the second control signal CS12 has the constant signal length SL22 regardless of the operation period OP1.

As seen in FIGS. 50 and 51, the remote controller RC10 has the first mode MD1 in which the first control signal CS11 is transmitted and a second mode MD22 in which the second control signal CS22 is transmitted. As seen in FIG. 50, in the first mode, the remote controller RC10 is configured to transmit the first control signal CS11 without transmitting the second control signal CS22. As seen in FIG. 51, in the second mode, the remote controller RC10 is configured to transmit the second control signal CS22 without transmitting the first control signal CS11.

As seen in FIGS. 48 and 49, the remote controller RC10 is configured to change the mode of the remote controller RC10 between the first mode MD1 and the second mode MD22. The remote controller RC10 includes the mode switch SW9 to receive the mode user input U9. The remote controller RC10 is configured to change the mode of the remote controller RC10 between the first mode MD1 and the second mode MD22 based on the mode user input U9. However, the remote controller RC10 can be configured to change the mode of the remote controller RC10 using structures other than the mode switch SW9. For example, the remote controller RC10 can be configured to change the mode of the remote controller RC10 using the long press of the first operating part SW1.

As seen in FIG. 50, the remote controller RC10 is configured to generate the first control signal CS11 in response to the first user input U1 regardless of the operation period OP1 of the first user input U1 in the first mode MD1. The seatpost controller 40 is configured to control the electric actuator 14 to maintain the adjustable state during the first adjustment period AP1 based on the first control signal CS11.

As seen in FIG. 51, the remote controller RC10 is configured to generate the second control signal CS12 in response to the first user input U1 regardless of the operation period of the first user input U1 in the second mode MD22. The seatpost controller 40 is configured to control the electric actuator 14 to maintain the adjustable state during the second adjustment period AP22 that is longer than the first adjustment period AP1 based on the second control signal CS22.

As seen in FIG. 47, in the flow chart of the tenth embodiment, the step S305 of FIG. 22 is replaced with step S905. In this embodiment, the remote controller RC10 determines whether the mode of the remote controller RC10 is the first mode MD1 or the second mode MD2 after the step S4 of FIG. 6 (step S905).

The remote controller RC10 compares the measured period MP with the additional determination period DP2 when the remote controller RC10 concludes that the mode of the remote controller RC10 is the first mode MD1 (steps S905 and S7). The remote controller RC10 stops generating the seatpost control signal CS1 to provide the first control signal CS11 having the constant signal length SL1 (FIG. 50) when the remote controller RC10 concludes that the measured period MP is equal to or longer than the additional determination period DP2 (steps S7 and S8).

The remote controller RC10 compares the measured period MP with the additional determination period DP3 when the remote controller RC10 concludes that the mode of the remote controller RC10 is the second mode MD2 (steps S905 and S210). The remote controller RC10 stops generating the seatpost control signal CS1 to provide the second control signal CS22 having the constant signal length SL22 (FIG. 51) when the remote controller RC10 concludes that the measured period MP is equal to or longer than the additional determination period DP3 (steps S8 and S210).

The seatpost controller 40 controls the electric actuator 14 to return the state of the bicycle seatpost assembly 212 from the adjustable state to the lock state when the seatpost controller 40 detects termination of the seatpost control signal CS1 (one of the first control signal CS11 and the second control signal CS22) (step S9). Thus, the process returns to the step S1 of FIG. 6.

Eleventh Embodiment

A bicycle seatpost system 1111 in accordance with an eleventh embodiment will be described below referring to FIGS. 53 to 58. The bicycle seatpost system 1111 has the same structures and/or configurations as those of the bicycle seatpost system 11 except for the remote controller RC1 and the seatpost controller 40. Thus, elements having substantially the same function as those in the above embodiments will be numbered the same here, and will not be described and/or illustrated again in detail here for the sake of brevity.

Figure 53:
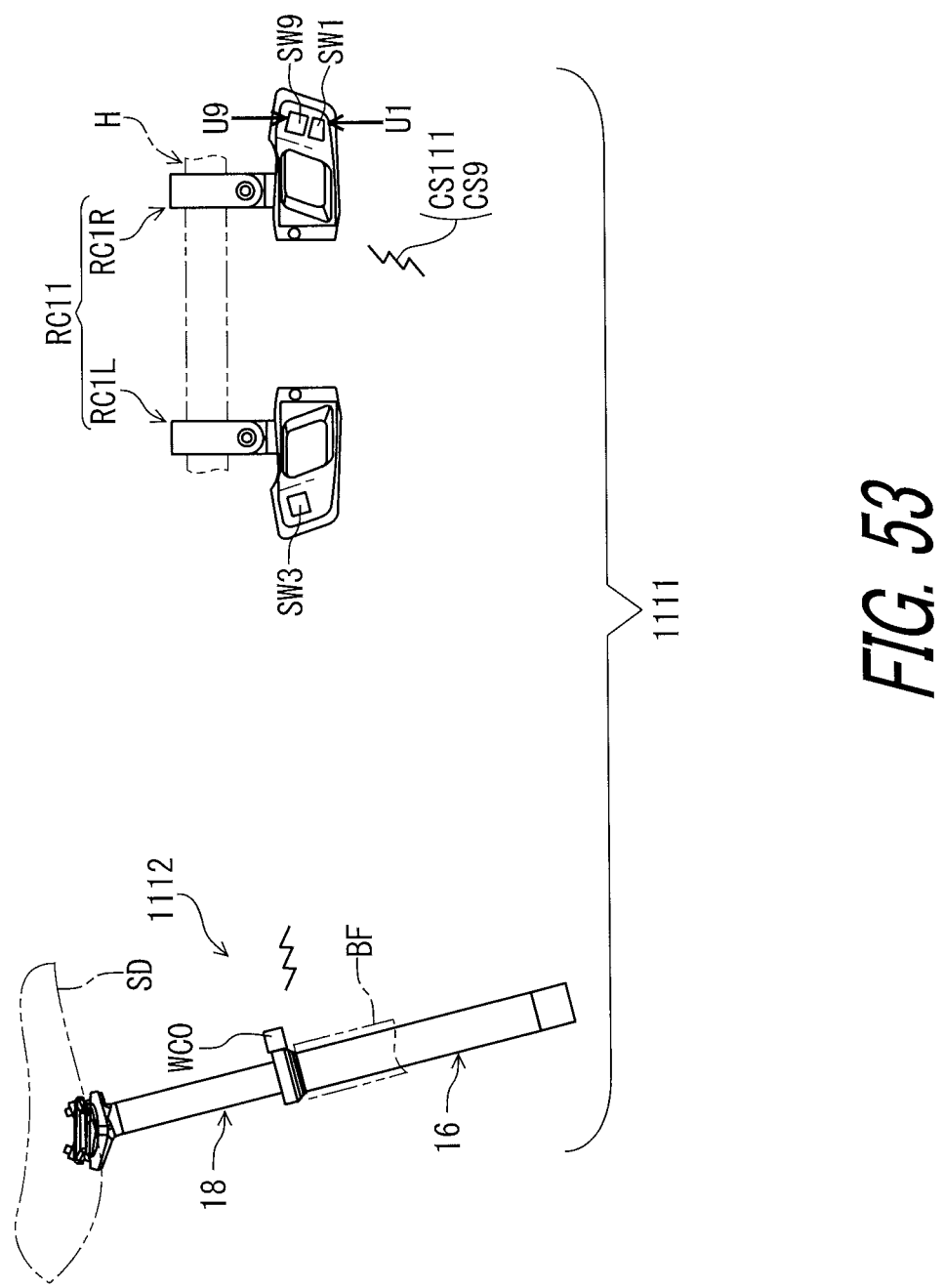
FIG. 53 is a schematic diagram of a bicycle seatpost system in accordance with an eleventh embodiment.
Figure 54:
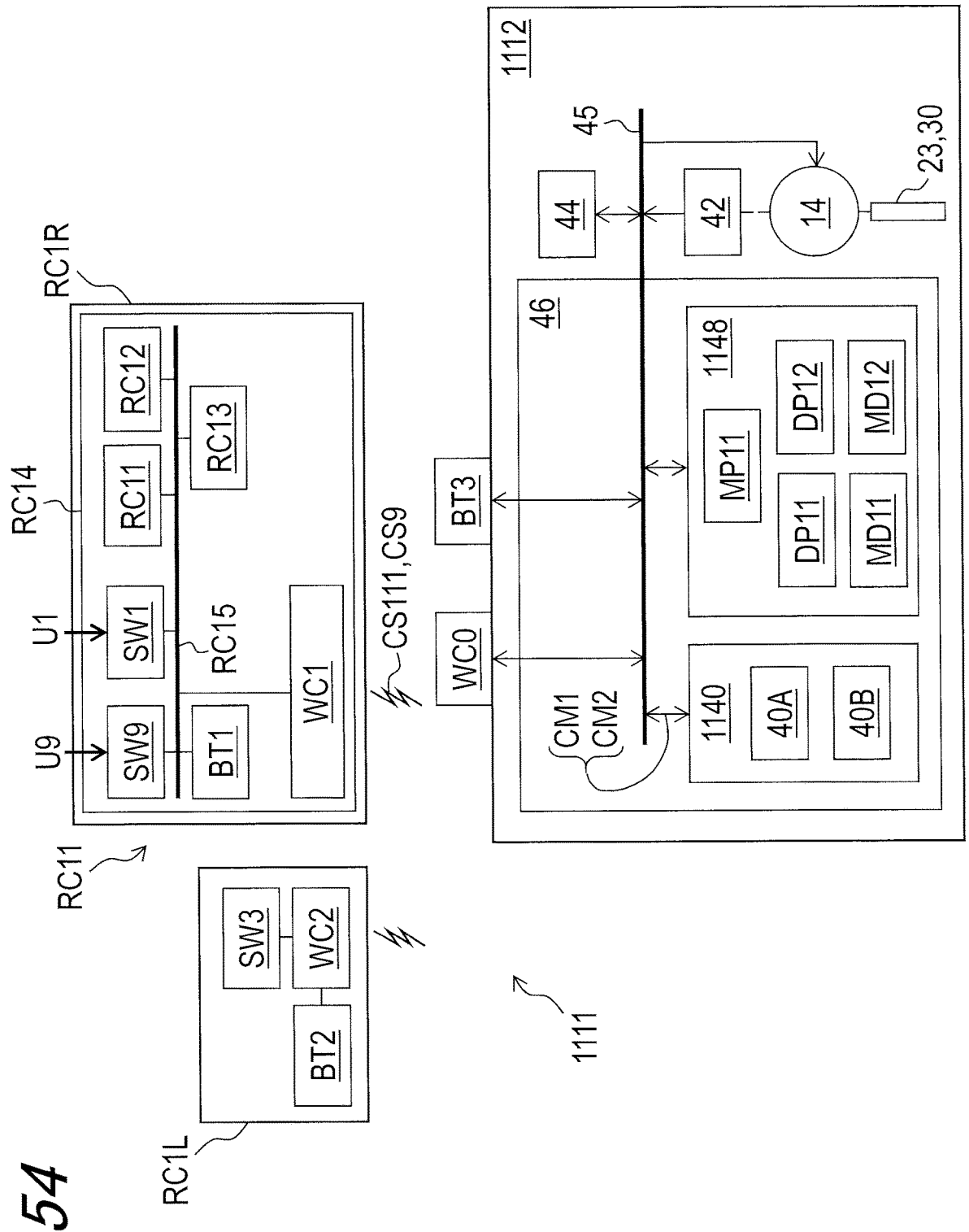
FIG. 54 is a block diagram of the bicycle seatpost system illustrated in FIG. 53.

As seen in FIGS. 53 and 54, the bicycle seatpost system 1111 comprises the electric actuator 14, a remote controller RC11, and a seatpost controller 1140. The bicycle seatpost system 1111 comprises a bicycle seatpost assembly 1112 including the seatpost controller 1140. The remote controller RC11 has substantially the same structure and/or configuration as that of the remote controller RC1 of the first embodiment. In this embodiment, the remote controller RC11 is configured to generate a seatpost control signal CS111 to control the electric actuator 14.

Figure 55:
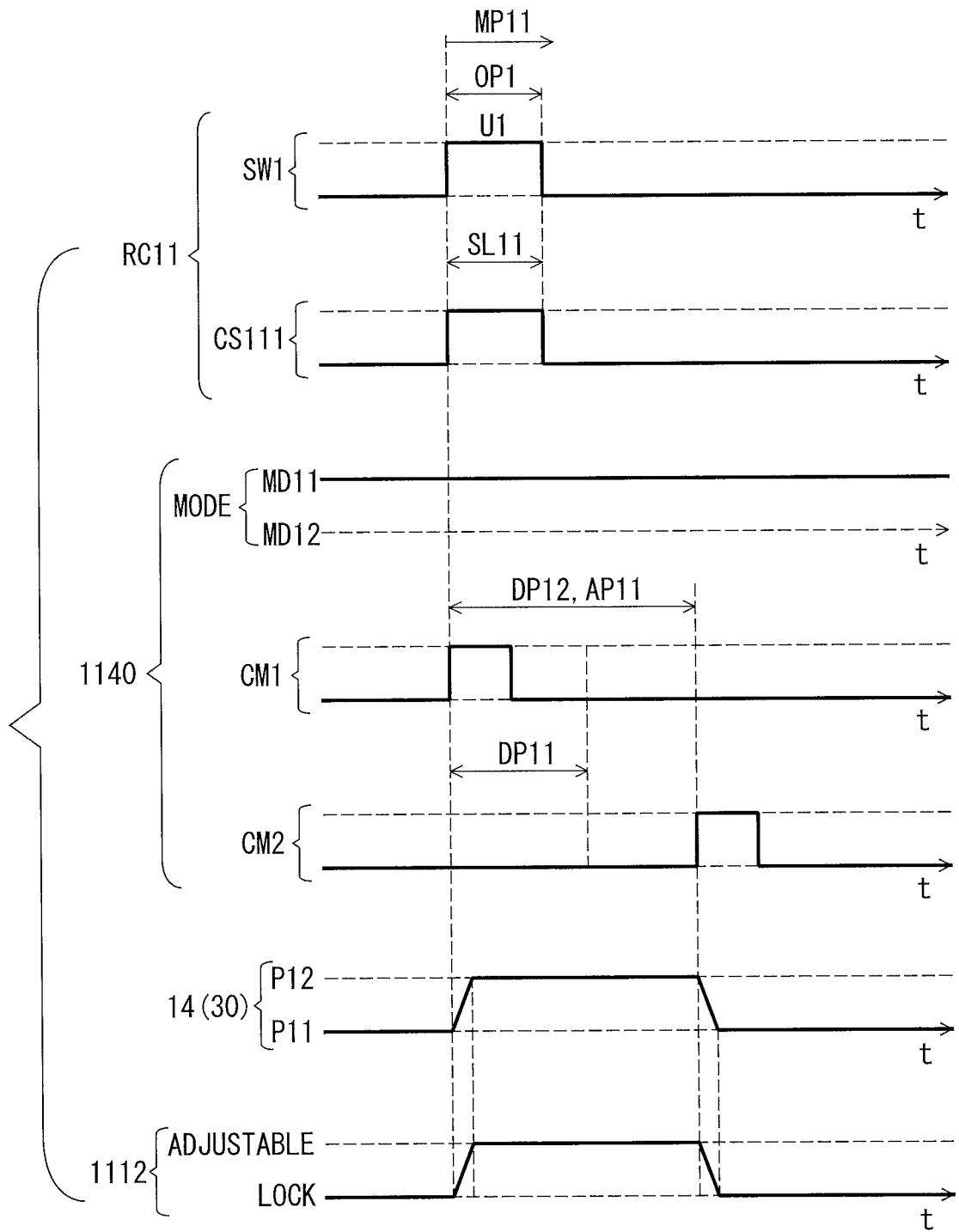
FIGS. 55 and 56 are timing charts of the bicycle seatpost system illustrated in FIG. 53.
Figure 56:
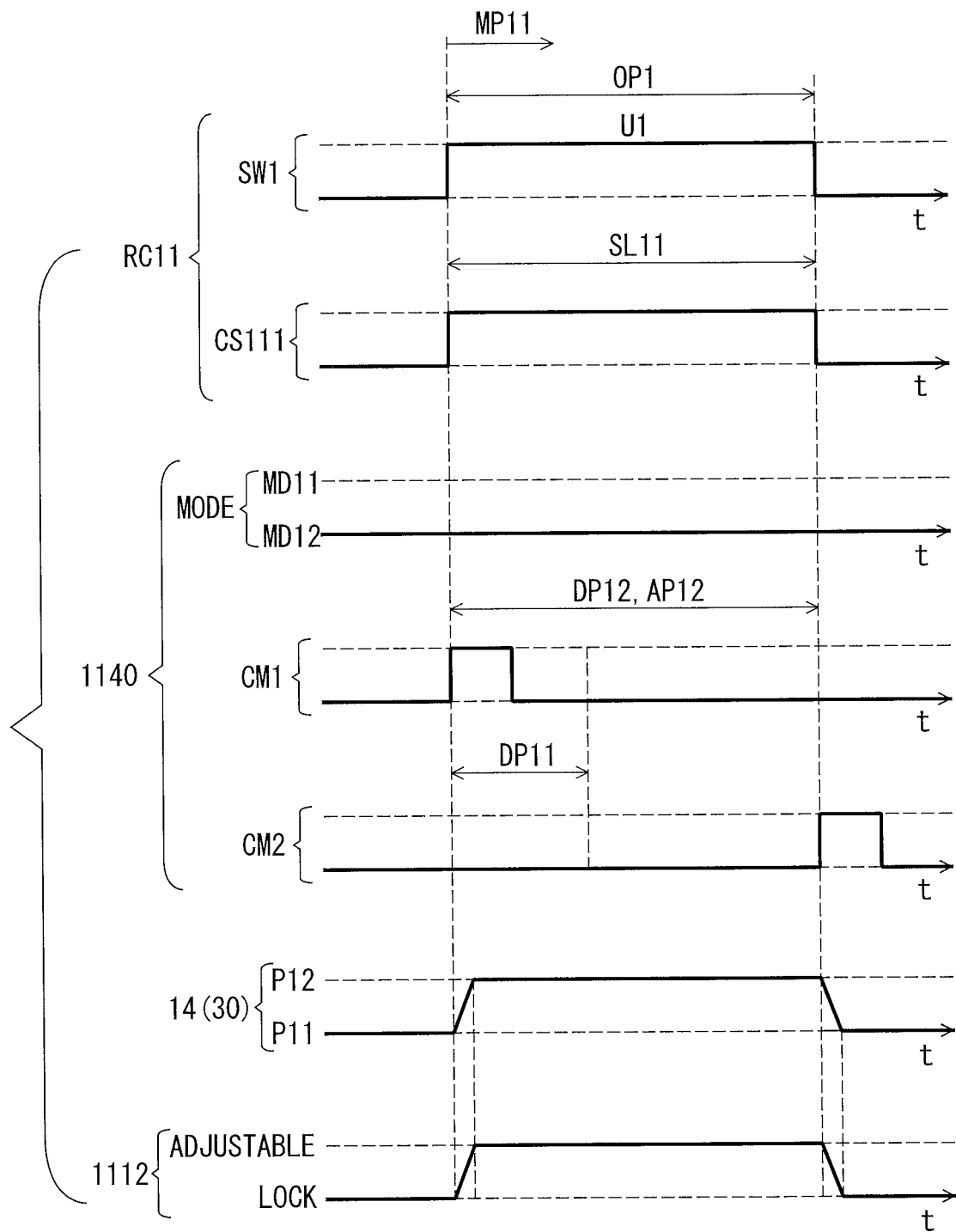

As seen in FIGS. 55 and 56, the remote controller RC11 is configured to generate the seatpost control signal CS111 having a signal length SL11 corresponding to the operation period OP1 of the first user input U1. The signal length SL11 is variable based on the operation period OP1 of the first user input U1.

The seatpost controller 1140 has substantially the same structure and/or configuration as that of the seatpost controller 40 of the first embodiment. In this embodiment, the seatpost controller 1140 has a first actuation mode MD11 in which the adjustable state is maintained during a first adjustment period AP11 regardless of the signal length SL11 of the seatpost control signal CS111 and a second actuation mode MD12 in which the adjustable state is maintained during a second adjustment period AP12 corresponding to the signal length SL11 of the seatpost control signal CS111.

As seen in FIGS. 53 and 54, the remote controller RC11 is configured to generate the mode signal CS9 in response to the mode user input U9. The seatpost controller 1140 is configured to change the mode of the seatpost controller 1140 between the first actuation mode MD11 and the second actuation mode MD12 based on the mode signal CS9 transmitted from the remote controller RC11.

The bicycle seatpost assembly 1112 includes a seatpost memory 1148. The seatpost memory 1148 has substantially the same as that of the seatpost memory 48. The seatpost memory 1148 is configured to store a measured period MP11, a determination period DP11, and an additional determination period DP12. The determination period DP11 corresponds to the determination period DP1 of the remote controller RC1 of the first embodiment. The additional determination period DP12 corresponds to the additional determination period DP2 of the remote controller RC1 of the first embodiment. The additional determination period DP12 is longer than the determination period DP11.

Figure 57:
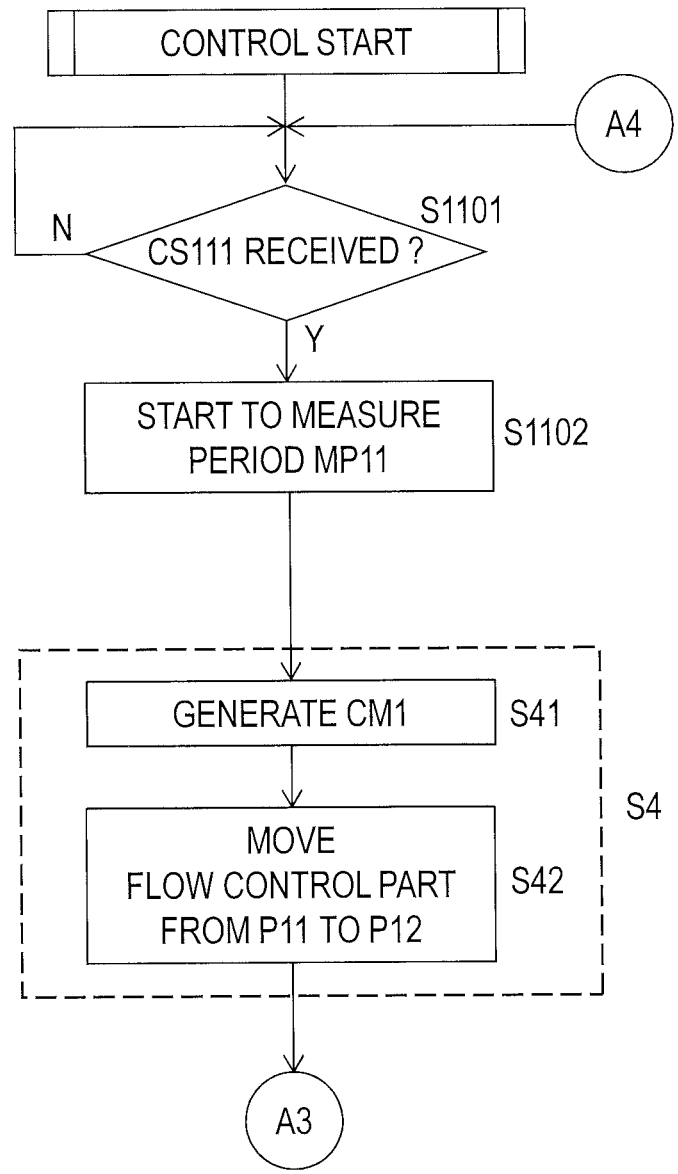
FIGS. 57 and 58 are flow charts of operation of the bicycle seatpost system illustrated in FIG. 53.

As seen in FIG. 57, the seatpost controller 1140 starts to measure a period MP11 when the seatpost controller 1140 receives the seatpost control signal CS111 (steps S1101 and S1102). The seatpost controller 1140 controls the electric actuator 14 to change the state of the bicycle seatpost assembly 12 from the lock state to the adjustable state when the seatpost controller 1140 receives the seatpost control signal CS111 (step S4). In this embodiment, the seatpost controller 1140 generates the adjustment command CM1 when the seatpost controller 1140 receives the seatpost control signal CS111 (step S41). The actuator driver 44 is configured to control the electric actuator 14 to move the hydraulic valve 23 from the closed position P11 to the open position P12 in response to the adjustment command CM1 (step S42). As seen in FIGS. 55 and 56, the seatpost controller 1140 controls the electric actuator 14 to maintain the adjustable state until the seatpost controller 1140 detects termination of the seatpost control signal CS111.

Figure 58:
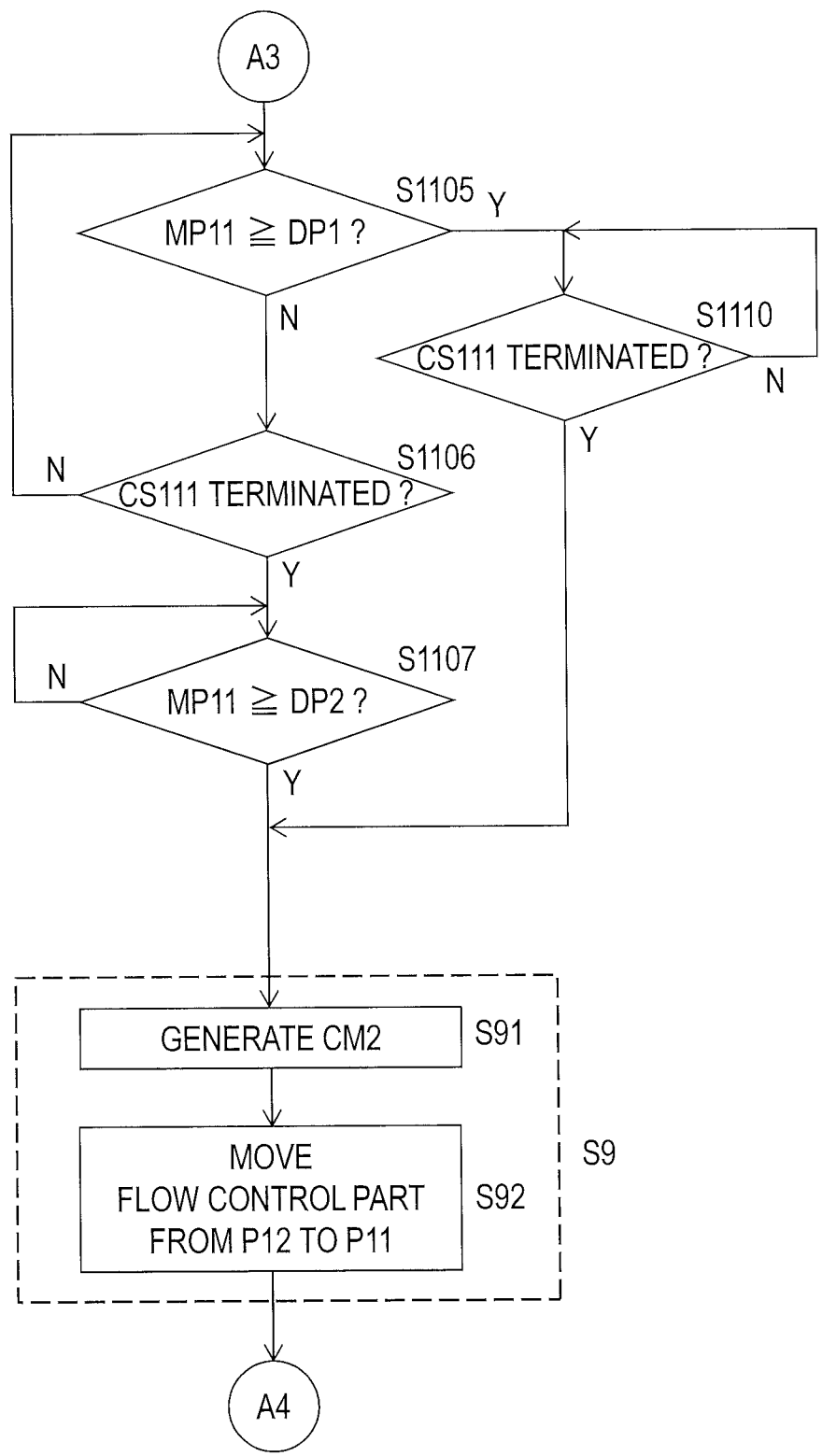

As seen in FIG. 58, the seatpost controller 1140 compares the measured period MP11 with the determination period DP11 (step S1105). The seatpost controller 1140 determines whether the first user input U1 is terminated when the seatpost controller 1140 concludes that the measured period MP11 is shorter than the determination period DP11 (steps S1105 and S1106). The seatpost controller 1140 repeatedly compares the measured period MP11 with the determination period DP11 until the seatpost controller 1140 detects the termination of the seatpost control signal CS111 (steps S1105 and S1106). The seatpost controller 1140 compares the measured period MP11 with the additional determination period DP12 when the seatpost controller 1140 detects the termination of the seatpost control signal C111 before concluding that the measured period MP11 reaches the determination period DP11 (steps S1105 to S1107).

As seen in FIG. 58, the seatpost controller 1140 keeps determining whether the seatpost control signal C111 is terminated when the seatpost controller 1140 concludes that the measured period MP11 is equal to or larger than the determination period DP11 (steps S1105 and S1110). The seatpost controller 1140 controls the electric actuator 14 to return the state of the bicycle seatpost assembly 1112 from the adjustable state to the lock state when the seatpost controller 1140 detects termination of the seatpost control signal CS111 (step S9). In this embodiment, the seatpost controller 1140 generates the lock command CM2 when the seatpost controller 1140 detects the termination of the seatpost control signal CS111 (step S91). The actuator driver 44 controls the electric actuator 14 to move the hydraulic valve 23 from the open position P12 to the closed position P11 in response to the lock command CM2 (step S92). Thus, the process returns to the step S1101 of FIG. 57.

Twelfth Embodiment

A bicycle seatpost system 1211 in accordance with a twelfth embodiment will be described below referring to FIGS. 59 and 60. The bicycle seatpost system 1211 has the same structures and/or configurations as those of the bicycle seatpost system 911 except for the remote controller RC9. Thus, elements having substantially the same function as those in the above embodiments will be numbered the same here, and will not be described and/or illustrated again in detail here for the sake of brevity.

Figure 59:
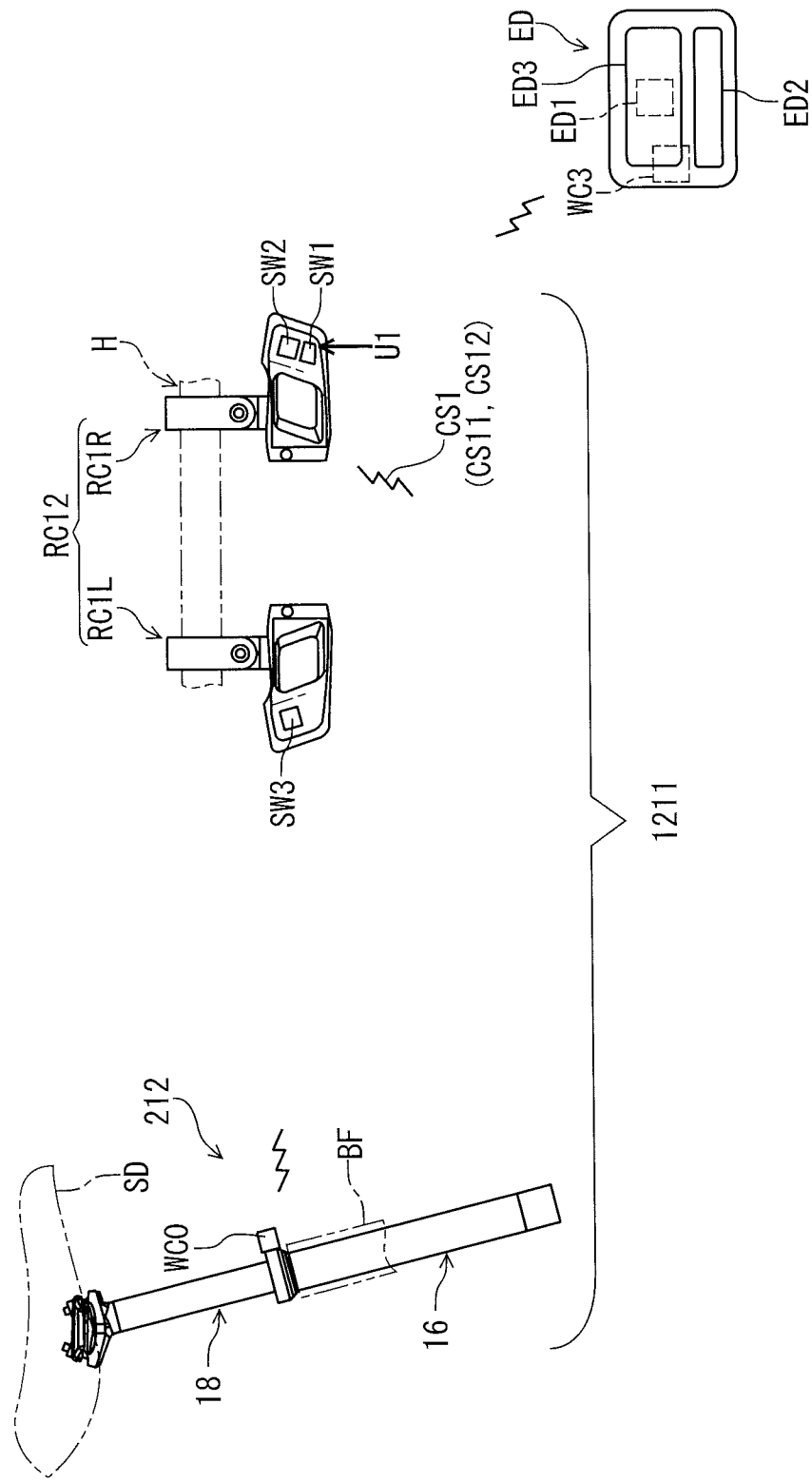
FIG. 59 is a schematic diagram of a bicycle seatpost system in accordance with a twelfth embodiment.
Figure 60:
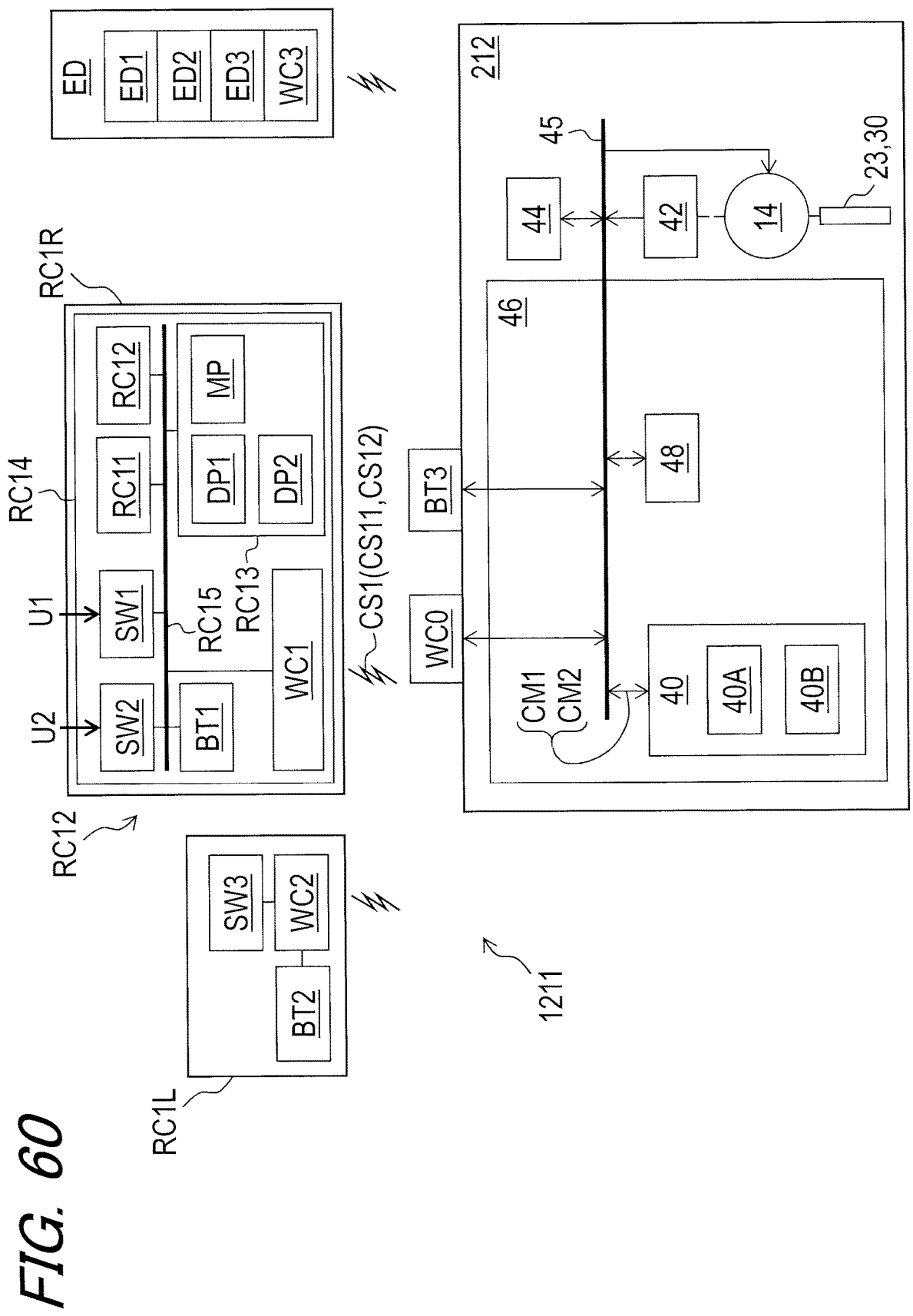
FIG. 60 is a block diagram of the bicycle seatpost system illustrated in FIG. 59.

As seen in FIGS. 59 and 60, the bicycle seatpost system 1211 comprises the electric actuator 14, a remote controller RC12, and the seatpost controller 40. The remote controller RC12 has substantially the same structure and/or configuration as that of the remote controller RC9 of the ninth embodiment. However, the mode switch SW9 is omitted from the remote controller RC12. Instead, the remote controller RC12 is configured to communicate with an external device ED so that the user can change the mode of the remote controller RC12 between the first mode MD1 and the second mode MD2. The remote controller RC12 is configured to change the mode of the remote controller RC12 between the first mode MD1 and the second mode MD2 based on an input from the external device ED. The external device ED is a separate device from the remote controller RC12.

In this embodiment, the remote controller RC12 is configured to communicate with the external device ED during setting of the bicycle seatpost system 1211. Examples of the external device ED include a personal computer, a smart phone, and a tablet computer. The external device ED is configured to be wirelessly connected to the remote controller RC12 during setting of the bicycle seatpost system 1211. More specifically, the external device ED is configured to be wirelessly connected to the wireless communicator WC1 of the remote controller RC12 during setting of the bicycle seatpost system 1211. However, the external device ED can be connected to the remote controller RC12 with an electric cable.

The external device ED includes a processor ED1, an input device ED2, a display ED3, and a wireless communicator WC3. The processor ED1 includes a CPU, a memory controller, and a memory. At least one program is stored in the memory of the processor ED1. The at least one program is read into the CPU of the processor ED1, and thereby the configuration and/or algorithm of the external device ED is performed. The input device ED2 is configured to receive a user input. The display ED3 is configured to display settings of the bicycle seatpost system 1211. For example, the display ED3 is configured to display the first mode MD1 and the second mode MD2 to allow the user to select one of the first mode MD1 and the second mode MD2. The wireless communicator WC3 has substantially the same structure and/or configuration as those of the wireless communicators WC0, WC1, and WC2. Thus, it will not be described in detail here for the sake of brevity. The above structure and/or configuration of the twelfth embodiment can apply to other embodiments such as the tenth embodiment.

Thirteenth Embodiment

A bicycle seatpost system 1311 in accordance with a thirteenth embodiment will be described below referring to FIGS. 61 and 62. The bicycle seatpost system 1311 has the same structures and/or configurations as those of the bicycle seatpost system 1111 except for the remote controller RC1 and the seatpost controller 40. Thus, elements having substantially the same function as those in the above embodiments will be numbered the same here, and will not be described and/or illustrated again in detail here for the sake of brevity.

Figure 61:
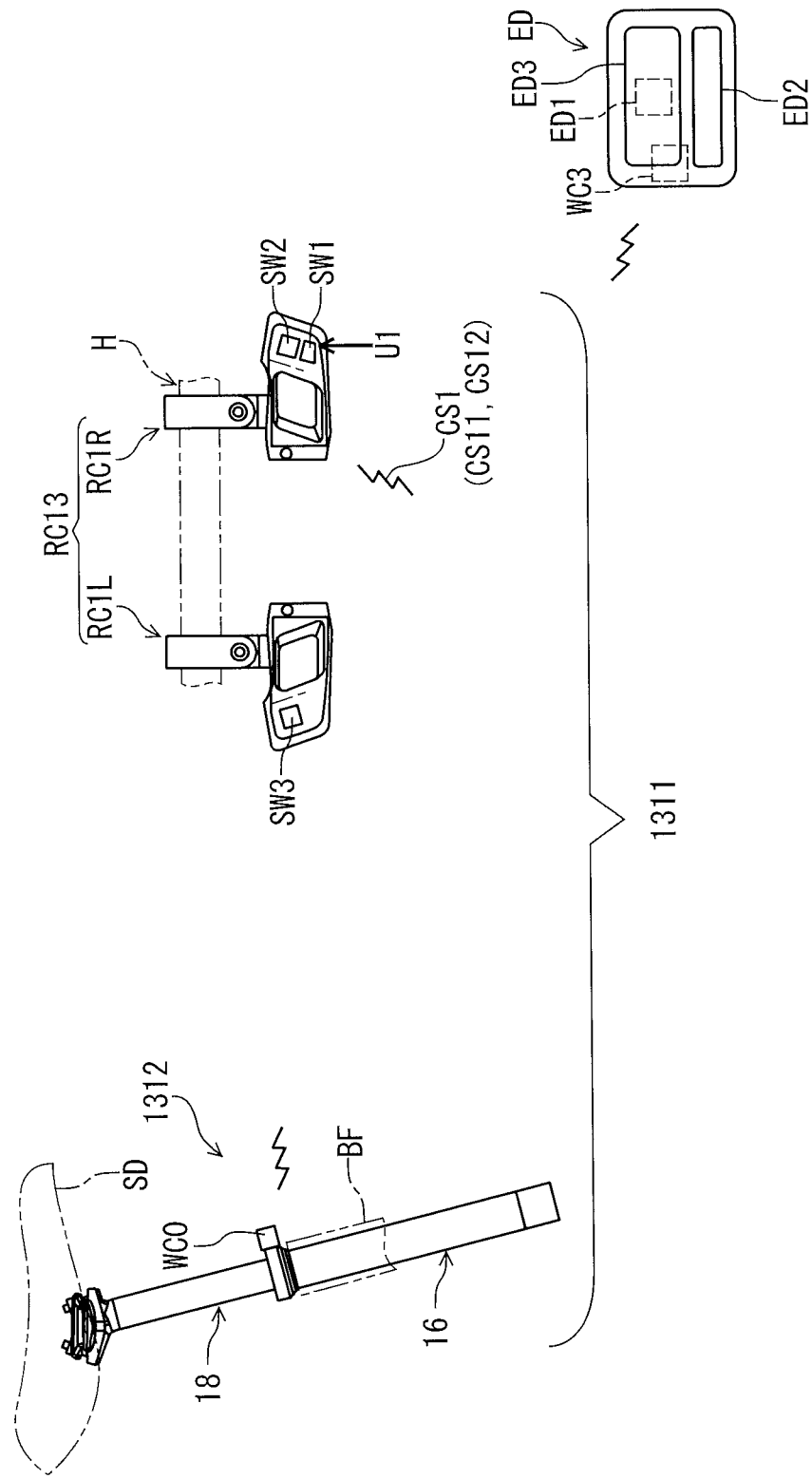
FIG. 61 is a schematic diagram of a bicycle seatpost system in accordance with a thirteenth embodiment.
Figure 62:
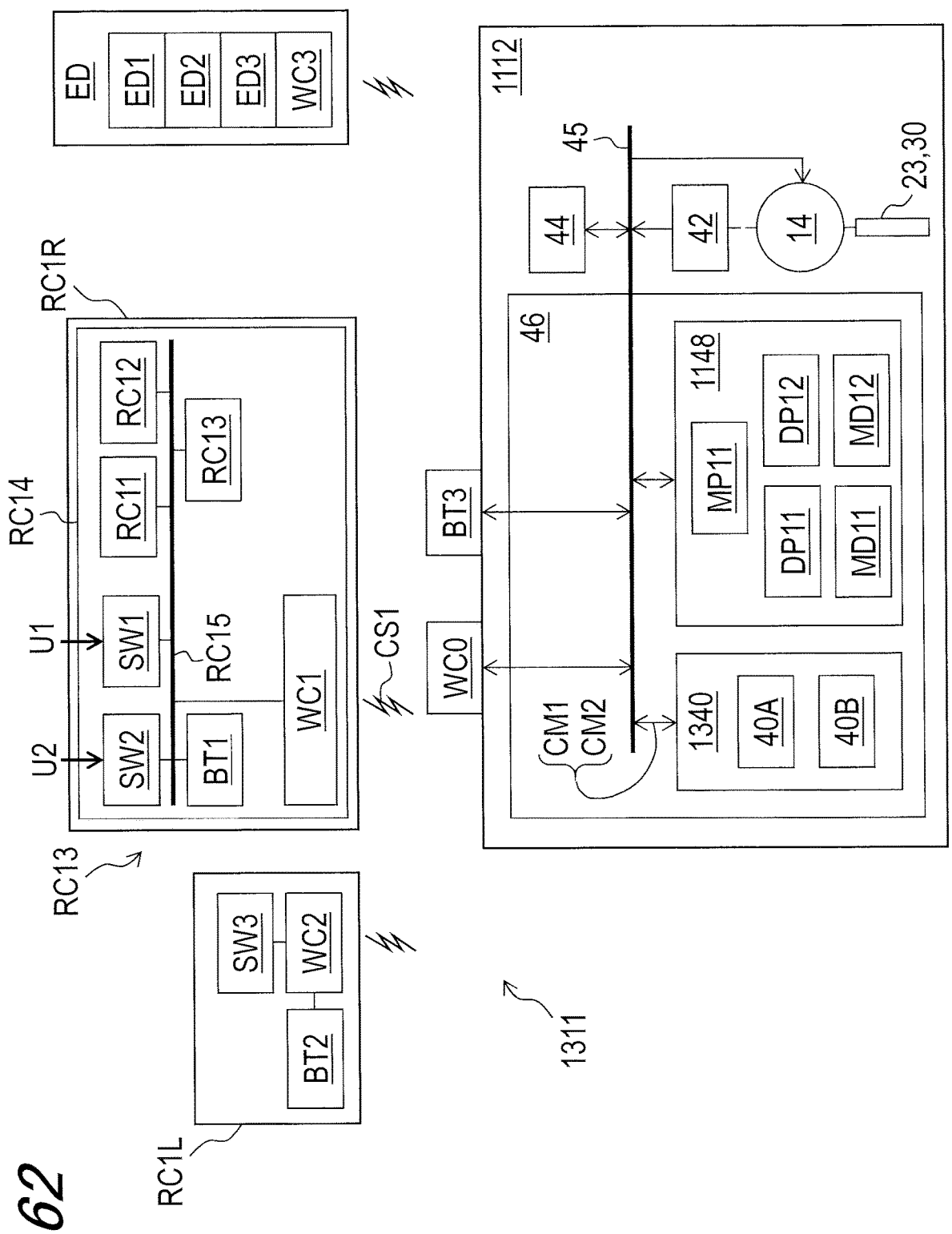
FIG. 62 is a block diagram of the bicycle seatpost system illustrated in FIG. 61.

As seen in FIGS. 61 and 62, the bicycle seatpost system 1311 comprises the electric actuator 14, a remote controller RC13, and a seatpost controller 1340. The remote controller RC13 has substantially the same structure and/or configuration as that of the remote controller RC11 of the eleventh embodiment. The seatpost controller 1340 has substantially the same structure and/or configuration as that of the seatpost controller 1140 of the eleventh embodiment. However, the mode switch SW9 is omitted from the remote controller RC11. Instead, the seatpost controller 1340 is configured to communicate with the external device ED so that the user can change the mode of the remote controller RC12 between the first mode MD1 and the second mode MD2. The seatpost controller 1340 is configured to change the mode of the seatpost controller 1340 between the first actuation mode MD11 and the second actuation mode MD12 based on an input from the external device ED. The external device ED is a separate device from the seatpost controller 1340.

In this embodiment, the seatpost controller 1340 is configured to communicate with the external device ED during setting of the bicycle seatpost system 1311. Examples of the external device ED include a personal computer, a smart phone, and a tablet computer. The external device ED is configured to be wirelessly connected to the remote controller RC12 during setting of the bicycle seatpost system 1311. More specifically, the external device ED is configured to be wirelessly connected to the wireless communicator WC0 of the seatpost controller 1340 during setting of the bicycle seatpost system 1311. However, the external device ED can be connected to the seatpost controller 1340 with an electric cable.

Modification

Each of the bicycle seatpost assemblies 12, 212, 1112, and 1312 can include another positioning structure such as a ratchet structure instead of or in addition to the positioning structure 20. In a case where the positioning structure includes a ratchet structure, the electric actuator 14 moves a ratchet of the ratchet structure between a lock position and a release position to change a state of the ratchet structure between a lock state and a release state. The lock state of the ratchet structure corresponds to the lock state of one of the bicycle seatpost assemblies 12, 212, 1112, and 1312. The release state of the ratchet structure corresponds to the adjustable state of one of the bicycle seatpost assemblies 12, 212, 1112, and 1312.

In the above embodiments, the wireless communicator WC0, the first wireless communicator WC1, and the second wireless communicator WC2 wirelessly connect the remote controller to the bicycle seatpost assembly. However, the PLC technology can be used instead of or in addition to the wireless technology. For example, the remote controller can be connected to the bicycle seatpost assembly with the electric communication path CP without the wireless communicators. In the first embodiment, the electric communication path CP connects the bicycle seatpost assembly 12, the rear derailleur RD, and the battery holder 60. However, the electric communication path CP can be at least partly replaced with the wireless technology. For example, the bicycle seatpost assembly can be connected to the rear derailleur RD using the wireless technology. In such an embodiment, the bicycle seatpost assembly and the rear derailleur RD each include a battery. Furthermore, the external device ED can be connected to the bicycle seatpost assembly, the remote controller, and the rear derailleur RD with wireless technology, the PLC technology, of a combination thereof.

Figure 63:
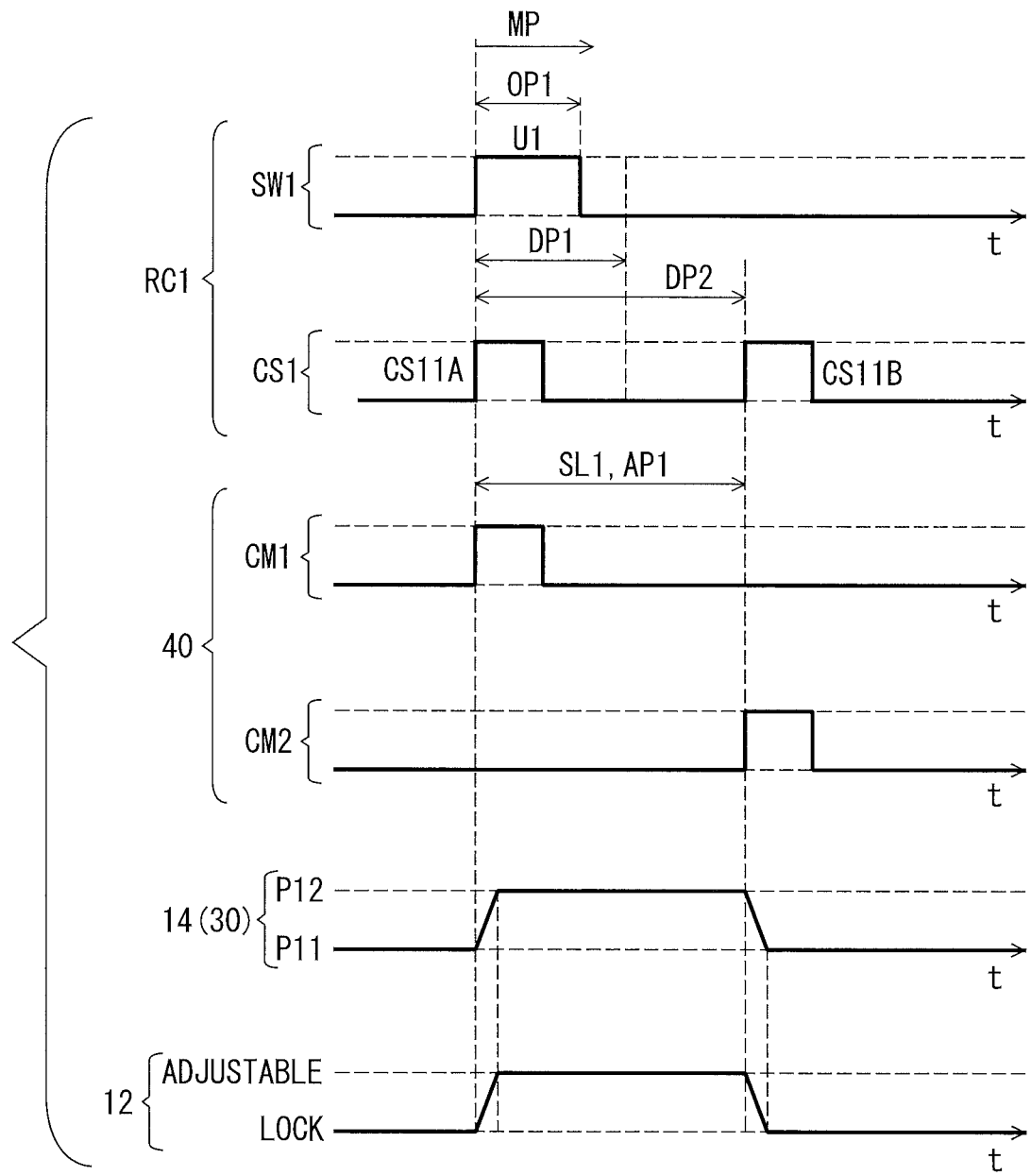
FIG. 63 is a timing chart of the bicycle seatpost system in accordance with a modification.

In the above embodiments, the seatpost controller is configured to sense the termination of the first control signal CS11 to generate the lock command CM2. As seen in FIG. 63, however, the remote controller can be configured to generate an adjustment control signal CS11A and a lock control signal CS11B as the first control signal CS1. The remote controller generates the lock control signal CS11B after the adjustment period AP1 elapsed from generation of the adjustment control signal CS11A. The seatpost controller generates the adjustment command CM1 in response to the adjustment control signal CS11A and generates the lock command CM2 in response to the lock control signal CS11B. The same configuration can apply to the second control signals CS12 and CS22.

While the rear derailleur RD is omitted from the bicycle control system in the second to seventh embodiments, the bicycle control systems of the second to seventh embodiments can include the rear derailleur RD and/or other components.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost system comprising:
   an electric actuator to change a state of a bicycle seatpost assembly between
      a lock state where a total length of the bicycle seatpost assembly is invariable, and
      an adjustable state where the total length of the bicycle seatpost assembly is variable;
   a remote controller configured to transmit
      a first control signal, and
      a second control signal different from the first control signal; and
   a seatpost controller configured to control the electric actuator to change the state of the bicycle seatpost assembly to the adjustable state based on one of the first control signal and the second control signal,
   the remote controller including
      a first operating part configured to receive a first user input, and
      a second operating part configured to receive a second user input,
   the remote controller being configured to generate the first control signal in response to the first user input,
   the remote controller being configured to generate the second control signal in response to the second user input,
   the remote controller being configured to generate the first control signal having a constant signal length regardless of an operation period of the first user input, and
   the remote controller being configured to generate the second control signal having a signal length corresponding to the operation period of the second user input.

2. A bicycle seatpost system comprising:
   an electric actuator to change a state of a bicycle seatpost assembly between
      a lock state where a total length of the bicycle seatpost assembly is invariable, and
      an adjustable state where the total length of the bicycle seatpost assembly is variable;
   a remote controller configured to transmit
      a first control signal, and
      a second control signal different from the first control signal; and
   a seatpost controller configured to control the electric actuator to change the state of the bicycle seatpost assembly to the adjustable state based on one of the first control signal and the second control signal,
   the remote controller including a first operating part configured to receive a first user input, the remote controller being configured to generate the first control signal in response to the first user input in a case where the first operating part is operated by a first number of operation times within a predetermined period, the remote controller being configured to generate the second control signal in response to the first user input in a case where the first operating part is operated by a second number of operation times within the predetermined period, the second number of operation times being different from the first number of operation times, and the remote controller being configured to generate the first control signal having a signal length different from a signal length of the second control signal.

* * * * *